United States Patent
Hayashi

(10) Patent No.: US 7,139,087 B2
(45) Date of Patent: Nov. 21, 2006

(54) IMAGE FORMATION SYSTEM, IMAGE FORMATION APPARATUS, IMAGE FORMATION METHOD AND COMPUTER PRODUCTS

(75) Inventor: Koji Hayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 979 days.

(21) Appl. No.: 09/895,986

(22) Filed: Jun. 29, 2001

(65) Prior Publication Data

US 2002/0149799 A1  Oct. 17, 2002

(30) Foreign Application Priority Data

Feb. 7, 2001  (JP) .............................. 2001-031569

(51) Int. Cl.
- *G06K 15/02* (2006.01)
- *G06F 3/12* (2006.01)
- *G06F 17/21* (2006.01)

(52) U.S. Cl. .................... 358/1.15; 358/1.18; 358/504; 358/406

(58) Field of Classification Search ............... 358/1.18, 358/1.9, 1.1, 1.15, 444, 450, 494, 501; 399/8, 399/11

See application file for complete search history.

(56) References Cited

U.S. PATENT DOCUMENTS 5,471,282 A  11/1995  Hayashi et al. ............... 399/64

6,185,007 B1  2/2001  Hayashi et al. ............... 358/1.9

FOREIGN PATENT DOCUMENTS

| JP | 06-266517 | 9/1994 |
|----|-----------|--------|
| JP | 08-207363 | 8/1996 |
| JP | 10-224547 | 8/1998 |
| JP | 10-224643 | 8/1998 |
| JP | 10-283132 | 10/1998 |
| JP | 11-053142 | 2/1999 |

OTHER PUBLICATIONS

U.S. Appl. No. 08/846, 211; filed Apr. 28, 1997.
U.S. Appl. No. 08/058,199; filed Apr. 10, 1998.
U.S. Appl. No. 09/357,335; filed Jul. 20, 1999.

*Primary Examiner*—Scott A. Rogers
(74) *Attorney, Agent, or Firm*—Knoble Yoshida & Dunleavy, LLC

(57) ABSTRACT

A color copying machine for outputting a draft image has a preparing unit for preparing calibration data containing its scanner's calibration patterns to be output from a printer of the color copying machine, and a correcting unit for correcting the draft image input from the scanner of the color copying machine based on the calibration data prepared by the preparing unit. When the color copying machine, which input an image, is needed to be different from the color copying machine that outputs the image, a plurality of the color copying machines of the present invention, which are connected together, may be used to improve the color reproducibility of printed materials.

50 Claims, 35 Drawing Sheets

FIG.24

AUTOMATIC GRADATION CORRECTION

A TEST PATTERN WILL BE PRINTED.
PLEASE CONFIRM PAPER, AND DEPRESS PRINT-START KEY.

START PRINTING    CANCEL

FIG.29

| | | RGB SIGNALS | | |
|---|---|---|---|---|
| | | RED | GREEN | BLUE |
| | WHITE | -16 | -28 | -27 |
| | BLACK | 7 | 7 | 7 |
| | YELLOW | 0 | 0 | 46 |
| HUE | RED | -5 | 0 | 0 |
| | MAGENTA | 0 | -26 | 0 |
| | BLUE | 0 | 0 | -46 |
| | CYAN | 5 | 0 | 0 |
| | GREEN | 0 | 26 | 0 |

SP MODE (MENU) — SCREEN SWITCHING — CONTENTS

4 — SP SPECIAL SPECIFICATION INFORMATION
INSTRUMENTAL ERROR CORRECTION VALUE k

PAGE 10

TO THE FRONT — TO THE NEXT

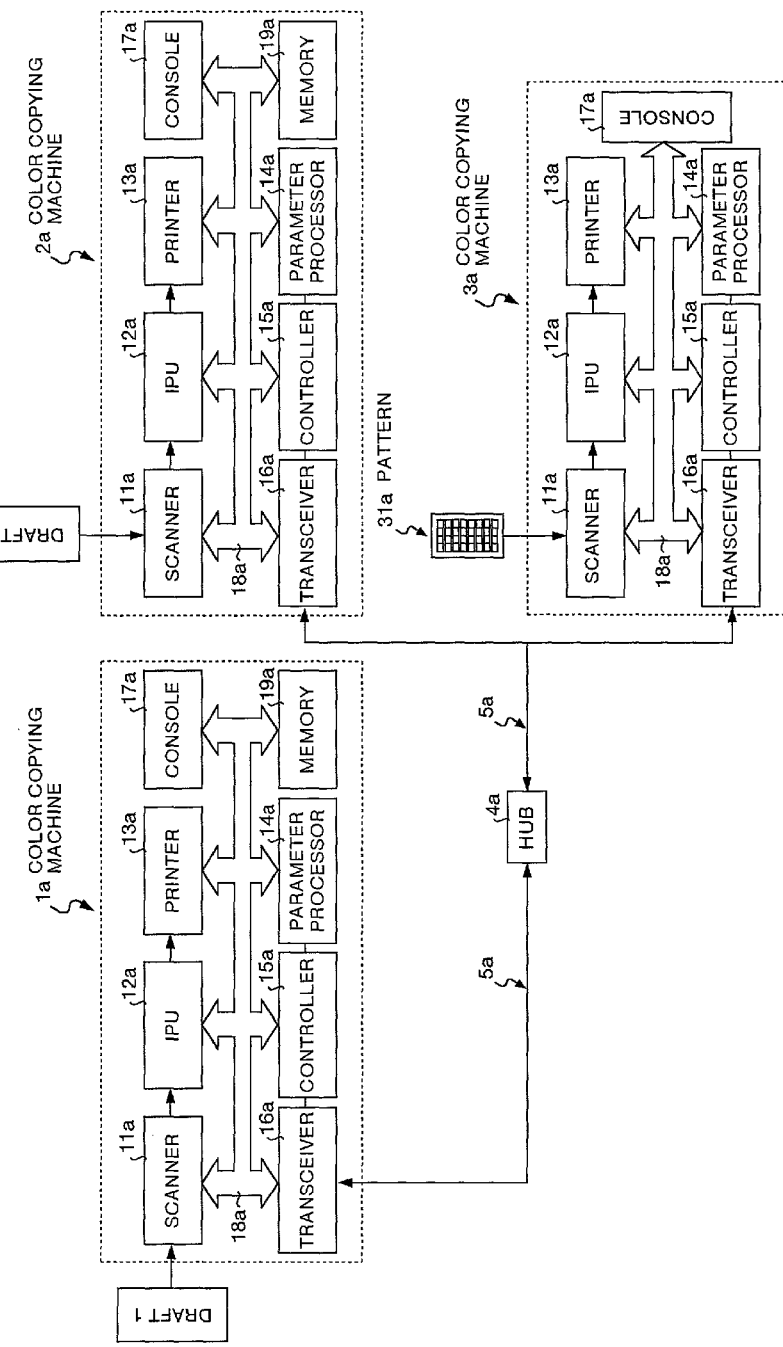

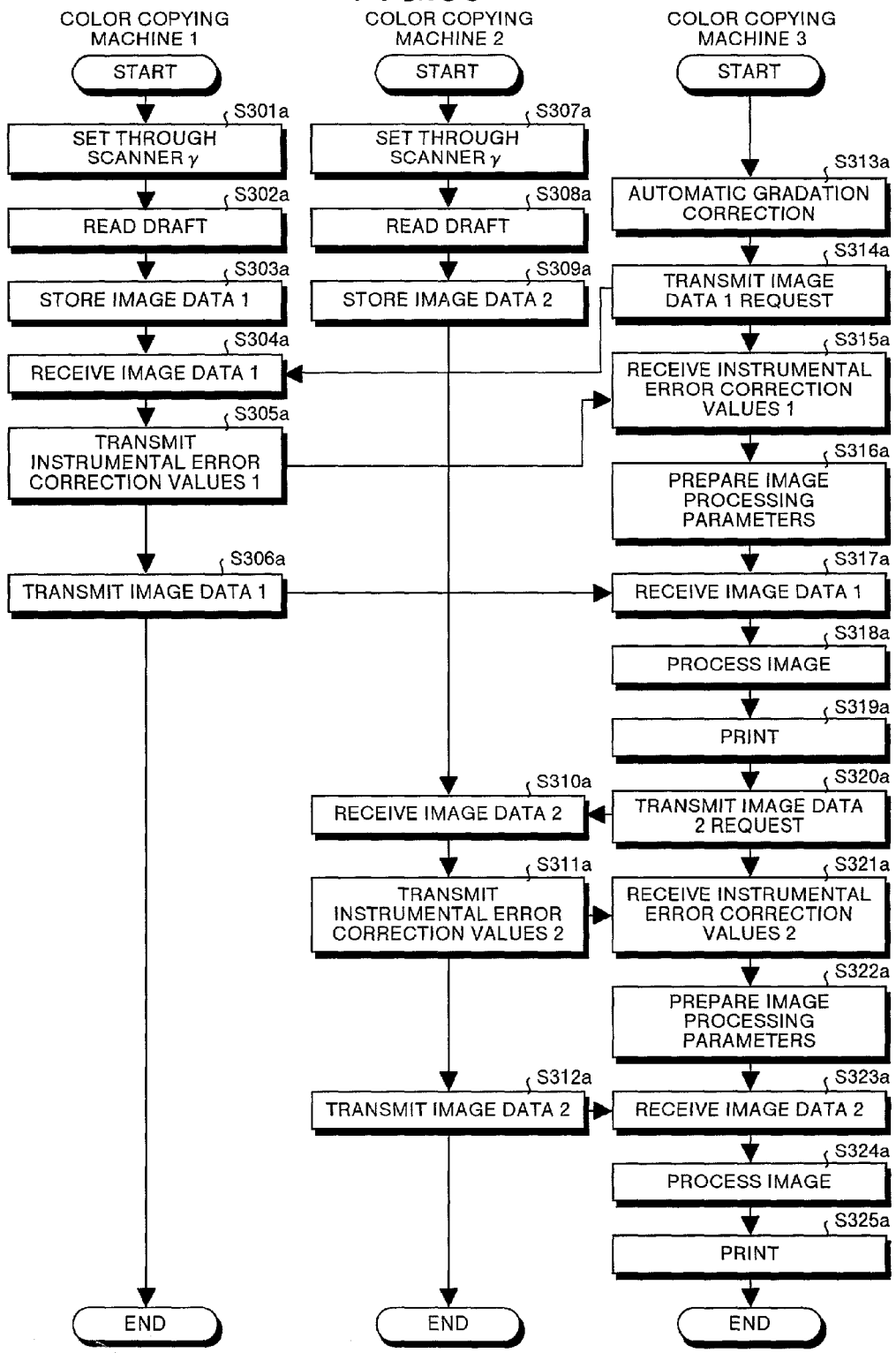

IMAGE FORMATION SYSTEM, IMAGE FORMATION APPARATUS, IMAGE FORMATION METHOD AND COMPUTER PRODUCTS

FIELD OF THE INVENTION

The present invention relates to an image formation system, image formation apparatus, image formation method, and computer products such as a computer-readable recording medium storing a computer program encoding the method, and a computer program encoding the method.

BACKGROUND OF THE INVENTION

Conventionally, image formation apparatus such as digital copying machines for processing digitized image data developed from analog copying machines and, color copying machines capable of making color prints as well as monochromatic prints have been widely used and distributed. The color copying machine generally consists of a scanner for inputting a draft image, an IPU for carrying out various kinds of image processing for the inputted image data, and a printer for printing the processed image data onto a sheet of transcription paper to output the draft image.

Prior to the shipment of these color copying machines from a plant, the scanner and the printer of each color copying machine are calibrated to set the image processing parameters in the IPU and the printer, so that the color copying machine can print a copy of a draft having a good reproducibility of colors. Thus, the color copying machines with its calibrated image processing parameters, are provided to users, and the color copying machines will print using these preset image processing parameters.

Further, along the recent development of communication technologies, the environments of the color copying machines have changed substantially. A large-scale image formation system capable of achieving data transmission/reception between a plurality of color copying machines has been produced by connecting a plurality of color copying machines together via the Internet or the like.

Using this large-scale image formation system, it is possible to transmit an image data read by the scanner of one color copying machine to another color copying machine, and the IPU and the printer of the color copying machine that has received this image data will carry out image processing and print the received image.

When it is desired to make a large volume of copies from only one existing draft in a short period of time, for example, it is possible for the scanner of one color copying machine to read the draft and transmit the read image data to a plurality of other color copying machines, which will simultaneously perform the image processing and print multiple copies of the received image data.

Further, it is desired to collect and integrally manage at one location a number of drafts that exists at a plurality of locations. For example, it is possible for the scanners of a plurality of color copying machines to read these drafts, and these color copying machines transmit the read image data to one color copying machine. This color copying machine carries out the image processing and prints the received image data.

However, when the conventional copy machine technology is used, the color reproducibility of printed materials is degraded when a plurality of color copying machines are connected together to transmitter receive data. If draft images are printed by a color copying machine which has not read the draft, the images are different from those that are printed by a color copying machine which has initially read the draft.

In other words, image processing parameters used for the image processing in a color copying machine are obtained by calibrating a scanner and a printer of a particular color copying machine at same time as a single set. Not all color copying machines have the same image processing parameters. In the conventional technique, the color copying machine that performs the image processing and prints is different from the color copying machine that reads the draft. Therefore, the combination of the scanner that has read the draft and the printer that carries out the printing is different from a combination of the scanner and the printer that have been calibrated together. As a result, when the image processing parameters of a color copying machine that has read the draft are different from the image processing parameters of a color copying machine that has received the image data, there has been a problem of degradation in the color reproducibility of the printed materials, as compared with the method of printing the image data by a single color copying machine that both reads and prints the draft.

This problem becomes more extreme in the case where, in order to make a large volume of copies from only one existing draft in a short period of time, a scanner of one color copying machine reads the draft, and then the color copying machine transmits the read image data to a plurality of other color copying machines. The color copying machines then carry out image processing and print the received image data. In other words,—the color reproducibility of the printed materials, when using the conventional copying technique, in which scanning and printing are done by separate machines, is worse than the image scanned and printed by a single color copying machine. Therefore, there has been a problem that a large volume of printed materials not having uniform color reproducibility is produced.

Similarly, the problem of the conventional copying technique becomes more extreme in the case where, in order to print all the drafts integrally at one location, the drafts that exist at a plurality of locations, are scanned by the scanners of a plurality of color copying machines, and the scanned images are then transmitted to another color copying machine where image processing is carried out and all the final drafts are printed.

SUMMARY OF THE INVENTION

It is an object of the present invention to provide an image formation system, an image formation apparatus, an image formation method, and a computer products, capable of improving the color reproducibility of printed materials when a draft image is printed by an image formation apparatus that is different from an original image formation apparatus that reads the draft image, by connecting a plurality of image formation apparatuses such as color copying machines.

The present invention relates to an image formation technique, having a plurality of image formation apparatuses connected together, each image formation apparatus having an image input section for inputting a draft image and an image output section for outputting the draft image. One predetermined image formation apparatus among the plurality of image formation apparatuses reads a draft image at its image input section, and the plurality of image formation apparatuses produce outputs of the draft image at their image output sections.

According to a first aspect of the present invention, an image formation system includes a plurality of mutually connected image formation apparatuses. Each image formation apparatus has an image input section for inputting a draft image and an image output section for outputting the draft image. One predetermined image formation apparatus of the plurality of image formation apparatus reads a draft image at its image input section. The plurality of image formation apparatuses receives outputs of this draft image at their image output sections. The image formation system further includes a preparing unit for preparing the calibration data containing the calibration patterns information, which is collected at the image input section of the predetermined image formation apparatus, to be received from the image output section of each image formation apparatus; and a correcting unit for correcting the draft image input from the image output section of the predetermined image formation apparatus based on the calibration data prepared by the preparing unit.

A second aspect of the invention provides an image formation system having a plurality of image formation apparatuses connected together. Each image formation apparatus has an image input section for inputting a draft image and an image output section for outputting the draft image. Each image formation apparatus reads a draft image at its image input section. One predetermined image formation apparatus of the plurality of image formation apparatuses receives an output of the draft images at its image output section. The image formation system further includes a preparing unit for preparing the calibration data containing the calibration patterns, which are collected at the image input section of each of the plurality of image formation apparatuses to be received at the image output section of the predetermined image formation apparatus; and a correcting unit for correcting the draft images input from the image output sections of the plurality of image formation apparatuses, based on the calibration data prepared by the preparing unit.

A third aspect of the invention provides an image formation method using a plurality of image formation apparatuses connected together. Each image formation apparatus has an image input section for inputting a draft image and an image output section for outputting the draft image. In the method, one predetermined image formation apparatus of the plurality of image formation apparatuses reads a draft image at its image input section. The plurality of image formation apparatuses transmits outputs of this draft image to their image output sections. The image formation method further includes the steps of: preparing calibration data containing calibration patterns, which are collected at the image input section of the predetermined image formation apparatus, to be output from the image output section of each image formation apparatus; and correcting the draft image input from the image input section of the predetermined image formation apparatus based on the calibration data prepared at the preparing step.

A fourth aspect of the invention provides an image formation method using a plurality of image formation apparatuses connected together, each image formation apparatus having an image input section for inputting a draft image and an image output section for outputting the draft image. In the method, each image formation apparatus reads a draft image at its image input section. One predetermined image formation apparatus of the plurality of image formation apparatus transmits outputs of draft images from the image output section. The image formation method further includes a preparing step for preparing calibration data containing calibration patterns, which are collected at the image input section of each image formation apparatus, to be output from the image output section of the predetermined image formation apparatus; and a correcting step for correcting the draft images input from the image input sections of the plurality of image formation apparatuses, based on the calibration data prepared at the preparing step.

A fifth aspect of the invention provides a computer-readable recording medium that stores a computer program encoding an image formation method, which employs a plurality of image formation apparatuses connected together. Each of the image formation apparatuses has an image input section for inputting a draft image and an image output section for outputting the draft image, wherein the computer-readable recording medium stores the image formation method that performs the steps of: (a) reading a draft image at the image input section of a predetermined one of the plurality of image formation apparatuses; (b) transmitting outputs of the draft image to the image output sections of the plurality of the image formation apparatuses; (c) preparing calibration data containing calibration patterns being collected at the image input section of the predetermined image formation apparatus to be output from the image output section of each image formation apparatus: and (d) correcting the draft image input from the image input section of the predetermined image formation apparatus based on the calibration data prepared at the preparing step (c).

A sixth aspect of the invention provides a computer-readable recording medium that stores a computer program for encoding an image formation method, which employs a plurality of image formation apparatuses connected together, each of the image formation apparatuses has an image input section for inputting a draft image and an image output section for outputting the draft image, wherein the image formation method performs the steps of: (a) reading a draft image at the image input section of each of the image formation apparatuses; (b) transmitting outputs of the draft images to its image output section of a predetermined one of the image formation apparatuses, (c) preparing calibration data containing calibration patterns being collected at the image input section of each of the image formation apparatuses to be output from the image output section of the predetermined image formation apparatus; and (d) correcting the draft image input from the image input section of each of the plurality of the image formation apparatuses based on the calibration data prepared at the preparing step.

Further, a seventh aspect of the invention provides an image formation system having a plurality of image formation apparatuses connected together. Each image formation apparatus has an image input section for inputting a draft image and an image output section for outputting the draft image. A first plurality of image formation apparatuses among these connected image formation apparatuses reads a draft image at its image input section, and a second plurality image formation apparatuses produce an output of the draft image from its image output section, wherein each of the first plurality of image formation apparatuses includes: a first memory for storing first instrumental error correction values corresponding to the read (or scanning) characteristics of the image input section of the first plurality of the apparatuses; and an output unit for outputting the second image formation apparatus the draft image read at the image input section of the first plurality of apparatuses. The first instrumental error correction values are stored in the first memory. Each of the second plurality of image formation apparatuses includes: a second memory for storing second instrumental error correction values corresponding to the read (scanning) characteristics of the image input section of the second plurality of the image formation apparatuses an image processing parameter preparing unit. The image processing parameter preparing unit prepares the image processing parameters corresponding to the read characteristics of the image input section of the second plurality of the few image formation apparatuses by changing the image processing parameters of the plural apparatus, based on the first instrumental error correction values output from the first plurality few of the image formation apparatuses and the second instrumental error correction values stored in the second memory; The second plurality of the image formation apparatus further include: a correcting unit for correcting the draft image read at the image input section of the corresponding to the first plurality of few image formation apparatuses, based on the image processing parameters prepared by the image processing parameter preparing unit. The first plurality of the few image formation apparatuses, transmits the draft image read at its image input section and the first instrumental error correction values corresponding to the read characteristics of its image input section stored in the first memory. In the second plurality of the image formation apparatuses, the image processing parameter preparing unit changes the image processing parameters corresponding to the read characteristics of the image input section of the second plurality of the image formation apparatus, based on the first instrumental error correction values output from the first plurality of the image formation apparatuses and the second instrumental error correction values corresponding to the read characteristics of the image input section of the second plurality image formation apparatuses stored in the second memory. Then, the image processing parameter preparing unit prepares the image processing parameters corresponding to the read characteristics of the image input section of the corresponding first plurality of the image formation apparatuses. The correcting unit corrects the draft image read at the image input section of the corresponding first plurality of the image formation apparatuses. With this arrangement, it is possible to decrease the influence of instrumental errors of the read characteristics between the image input section of the first plurality of the image formation apparatus that reads the draft image and the image input section of the second plurality of the image formation apparatuses that prints out the draft image.

An eighth aspect of the invention provides a first image formation apparatus connected with a second image formation apparatus to communicate data with each other, the first image formation apparatus including: an image input section for reading a draft image and converting the draft image into image data; an image output section for printing out image data read at the image input section; a memory for storing first instrumental error correction values corresponding to the read characteristics of the image input section; and a transmitting unit for transmitting to the second image formation apparatus the draft image read at the image input section of the first image formation apparatus and the first instrumental error correction values corresponding to the read characteristics of the image input section stored in the memory. According to this aspect, the image input section of the first image formation apparatus reads the draft image, the memory stores the first instrumental error correction values corresponding to the read characteristics of the image input section of the first image formation apparatus, and the transmitting unit transmits to the second image formation apparatus the draft image read at the image input section of the first image formation apparatus and the first instrumental error correction values corresponding to the read characteristics of the image input section of the first image formation apparatus stored in the memory. Therefore, when the first image formation apparatus (transmitter) reads a draft image at its image input section, and the second image formation apparatus prints out this draft image, the first image formation apparatus can correct the draft image based on the instrumental error correction values corresponding to the read characteristics of the image input section of the first apparatus.

A ninth aspect of the invention provides a first image formation apparatus connected with a second image formation apparatus communicate data with each other, the first image formation apparatus comprising: a first image input section for reading a draft image and converting the draft image into image data; a first image output section for printing out image data read at the image input section; a first memory for storing second instrumental error correction values corresponding to the read characteristics of the first image input section; a first receiving unit for receiving a draft image read at a second image input section of the second image formation apparatus and first instrumental error correction values corresponding to the read characteristics of a second image input section of the second image formation apparatus; a first image processing parameter preparing unit for preparing image processing parameters corresponding to the read characteristics of the second image input section of the second image formation apparatus received by the first receiving unit by changing the image processing parameters of the first apparatus, based on the first instrumental error correction values received by the first receiving unit and the second instrumental error correction values stored in the first memory; and a first correcting unit for correcting the draft image read at the second image input section of the second image formation apparatus received by the receiving unit, based on the image processing parameters prepared by the first image processing parameter preparing unit. According to this aspect, the first memory stores second instrumental error correction values corresponding to the read characteristics of the first image input section. The receiving unit receives a draft image read at a second image input section of the second image formation apparatus and first instrumental error correction values corresponding to the read characteristics of the first image input section of the second image formation apparatus. The image processing parameter preparing unit prepares image processing parameters corresponding to the read characteristics of the second image input section of the second image formation apparatus received by the receiving unit by changing the image processing parameters of the second apparatus, based on the first instrumental error correction values received by the first receiving unit and the second instrumental error correction values stored in the memory. The first correcting unit corrects the draft image read at the second image input section of the second image formation apparatus received by the first receiving unit, based on the image processing parameters prepared by the first image processing parameter preparing unit. With this arrangement, it is possible to decrease the influence of instrumental errors of the read characteristics between the second image input section of the second image formation apparatus that reads the draft image and the first image input section of the first image formation apparatus that prints out the draft image.

A tenth aspect of the invention provides an image formation method performing the steps of: (a) reading an image of a draft at an image input section of a first image formation apparatus; and (b) transmitting the draft image read at the image input section of the first image formation apparatus and first instrumental error correction values corresponding to read characteristics of the image input section of the first image formation apparatus from a memory to an image output section of a second image formation apparatus connected to the first image formation apparatus.

An eleventh aspect of the invention provides an image formation method comprising: a receiving step for receiving a draft image read at a first image input section of a first image formation apparatus and first instrumental error correction values corresponding to the read characteristics of the first image input section of the first image formation apparatus; an image processing parameter preparing step for preparing image processing parameters corresponding to the read characteristics of the first image input section of the first image formation apparatus by changing the image processing parameters of a second image formation apparatus, based on the first instrumental error correction values received and second instrumental error correction values corresponding to the read characteristics of a second image input section of the second apparatus stored in a memory; a correcting step for correcting the draft image read at the first image input section of the first image formation apparatus received, based on the image processing parameters prepared at the image processing parameter preparing step; and a printing out step for printing out at a second image output section the draft image corrected at the correcting step. According to the present aspect, a draft image read at the first image input section of the first image formation apparatus connected and first instrumental error correction values corresponding to the read characteristics of the first image input section of the first image formation apparatus connected are received. Image processing parameters are prepared corresponding to the read characteristics of the first image input section of the first image formation apparatus by changing the image processing parameters of the second apparatus, based on the first instrumental error correction values received and second instrumental error correction values corresponding to the read characteristics of the second image input section of the second apparatus stored in a memory. The draft image read at the first image input section of the first image formation apparatus received is corrected based on the image processing parameters prepared. Then, the draft image corrected is printed out at the second image output section. With this arrangement, it is possible to decrease the influence of instrumental errors of the read characteristics between the first image input section of the first image formation apparatus that reads the draft image and the second image input section of the second image formation apparatus that prints out the draft image.

A twelfth aspect of the invention provides a computer program stored in a computer readable medium performing the tasks of: (a) reading a draft image at an image input section of a first image formation apparatus; (b) transmitting the draft image read at the image input section and first instrumental error correction values corresponding to read characteristics of the image input section stored in a memory to a second image formation apparatus connected to the first image formation apparatus; and (c) correcting the received draft image read at the image input section of the first image formation apparatus based upon the first instrumental error correction values.

A thirteenth aspect of the invention provides a computer program stored in a computer readable medium performing the tasks of: (a) receiving a draft image read at an image input section of a second image formation apparatus and first instrumental error correction values corresponding to read characteristics of the image input section of the second image formation apparatus; (b) preparing image processing parameters corresponding to the read characteristics of the image input section of the second image formation apparatus by changing the image processing parameters of a first image formation apparatus based on the first instrumental error correction values received and second instrumental error correction values corresponding to read characteristics of an image input section of the first image formation apparatus stored in a memory; (c) correcting the received draft image read at the image input section of the second image formation apparatus based on the image processing parameters prepared at the step (b); and (d) printing out the draft image corrected at the step (c) at an image output section of the first image formation apparatus.

Other objects and features of this invention will become apparent from the following description with reference to the accompanying drawings.

BRIEF DESCRIPTION OF THE DRAWINGS

FIG. 24 is a diagram showing a display example of the liquid crystal screen of the console shown in FIG. 12;

FIG. 29 is a diagram showing a set screen of instrumental error correction values;

FIG. 34 is a flock diagram of an image formation system relating to a sixth embodiment of the present invention; and FIG. 35 is a flowchart for explaining a print operation of the image formation system relating to the sixth embodiment.

DESCRIPTION OF THE PREFERRED EMBODIMENTS

Preferred embodiments of an image formation system, an image formation method, and a computer-readable recording medium recorded with a program for making a computer execute this method relating to the present invention, will be explained in detail below with reference to the attached drawings. In a first embodiment, there will be explained a case where one color copying machine transmits image data to a plurality of color copying machines, and these plurality of color copying machines print the received image data. In a second embodiment, there will be explained a case where a plurality of color copying machines transmit image data to one color copying machine, and this one color copying machine prints the received image data. In a third embodiment, there will be explained a case where one image processing apparatus transmits image data to a plurality of printers, and these printers print the received image data.

(First Embodiment)

Figure 1:
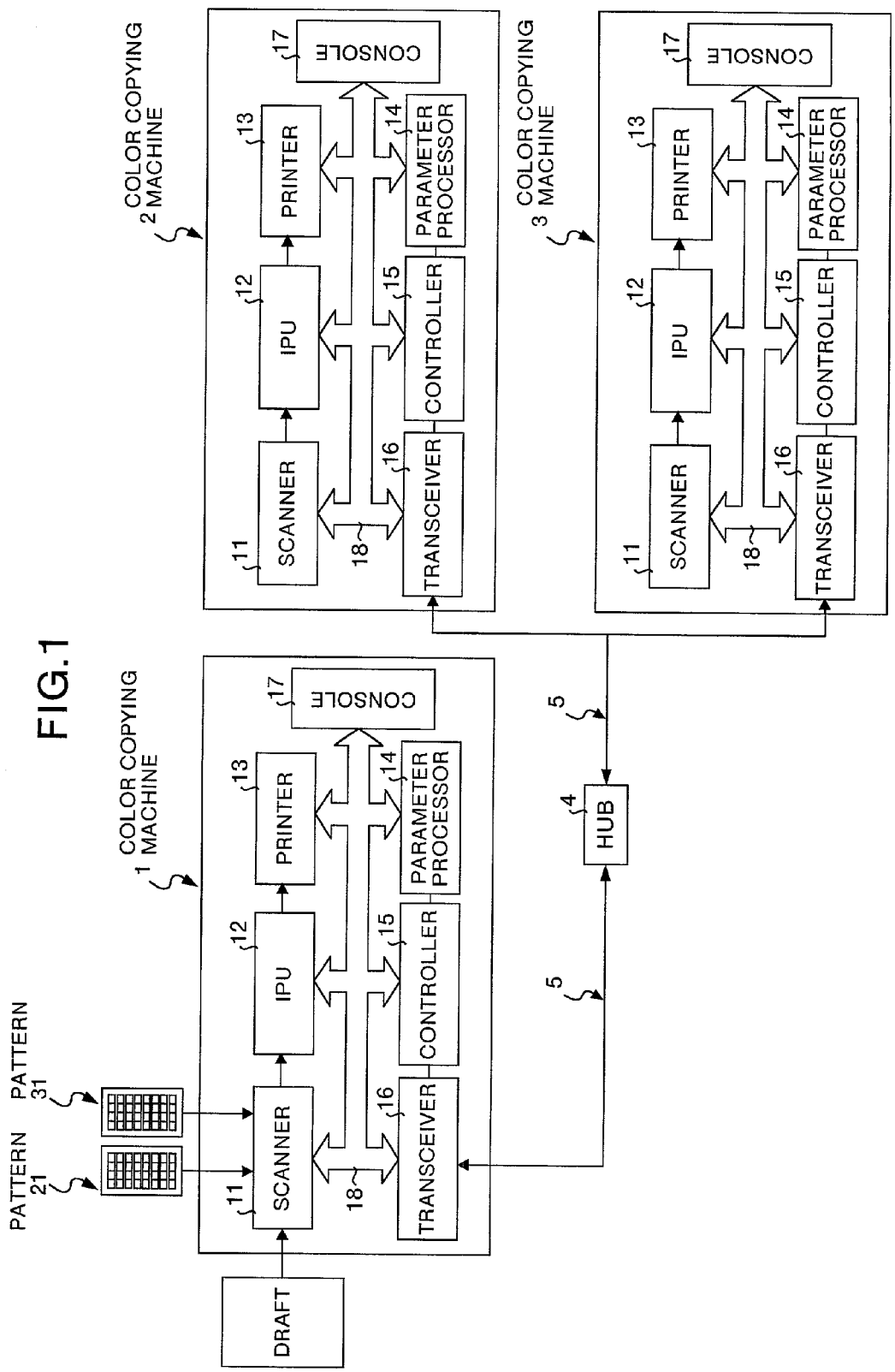
FIG. 1 is a block diagram showing a structure of an image formation system relating to a first embodiment of the present invention.

First, a structure of an image formation system relating to the first embodiment will be explained. FIG. 1 is a block diagram showing a structure of the image formation system relating to a first embodiment. As shown in FIG. 1, the image formation system relating to the first embodiment consists of a color copying machine 1, a color copying machine 2, and a color copying machine 3 that are connected together via an Internet cable 5 and a HUB 4 so that these color copying machines can transmit/receive data to and from each other. The color copying machine 1 reads image data and transmits the read image data to the color copying machine 2 and the color copying machine 3, and these color copying machines 2 and 3 print the received image data.

In outline, the image formation system relating to the first embodiment makes the color copying machine 1 (hereinafter to be referred to as a "master color copying machine") read calibration patterns (hereinafter to be referred to as patterns 21 and patterns 31) of the color copying machine 2 and the color copying machine 3 (hereinafter to be referred to as a "slave color copying machine") respectively. Then, the slave color copying machines carry out calibration based on the read data, and process image processing parameters corresponding to the read characteristics of the master color copying machine.

The master color copying machine transmits the image data read by the master color copying machine to the slave color copying machines. The slave color copying machines carry out image processing to the received image data using image processing parameters corresponding to the master color copying machine, thereby to produce outputs of printed materials with uniform color reproducibility having colors similar to those of the printed material at the master color copying machine side.

With reference to FIG. 1 to FIG. 5, the image formation system relating to the first embodiment will be explained on the following points in sequence: (1) a schematic structure and processing of each portion of a color copying machine, (2) a detailed structure and processing of each portion of a color copying machine, (3) processing of image processing parameters, (4) calibration processing in the image formation system, and (5) processing of linkage printing in the image formation system. In the image formation system relating to the first embodiment, the color copying machine 1, the color copying machine 2 and the color copying machine 3 have similar structures. Therefore, only the color copying machine 1 will be explained for the sake of convenience.

(1) A Schematic Structure and Processing of Each Portion of a Color Copying Machine First, a schematic structure and processing of each portion of the color copying machine will be explained with reference to FIG. 1. As shown in FIG. 1, the color copying machine 1 consists of a scanner 11, an IPU 12, a printer 13, a parameter processor 14, a controller 15, a transceiver 16, and a console 17 connected together via a bus 18, so as to be able to transmit/receive data.

In the color copying machine 1, the scanner 11 is a unit for reading image data (a draft and calibration patterns). In this scanner 11, an optical system carries out a read processing of draft reflection beams, a CCD (Charge Coupled Device) carries out a conversion processing for converting the image data into an electric signal, and an A/D converter converts the electric signal into a digital signal. The scanner also carries out a shading correction processing (a processing for correcting illuminance distribution unevenness of a light source), and a scanner γ correction processing (a processing for correcting density characteristics of a reading system).

The IPU 12 is a unit for carrying out an image processing like an editing of the image data. The IPU 12 carries out a shading correction processing (a processing for correcting illuminance distribution unevenness of a light source), a scanner γ correction processing (a processing for correcting density characteristics of a reading system), an MTF correction processing, a smoothing processing, an optional magnification processing in a main scanning direction, a density conversion (a γ conversion processing: corresponding to a density notch), a simple multi-value processing, a simple two-value processing, an error dispersion processing, a dither processing, a dot layout phase control processing (right-sided dot, left-sided dot), an isolated point removing processing, an image area separation processing (color decision, attribute decision, adaptive processing), and a density conversion processing.

The printer 13 is a unit for writing image data into a sheet of transcription paper. The printer 13 caries out an edge smoothing processing (a jaggy correction processing), a correction processing for dot relocation, a pulse control processing of an image signal, and a format conversion processing between parallel data and serial data.

When a color copying machine plays a role of a slave color copying machine (the color copying machine 2 or the color copying machine 3), the parameter processor 14 carries out calibration between the master color copying machine and the self (the slave color copying machine) based on the read data (hereinafter to be referred to as "calibration data") of calibration patterns transmitted from the master color copying machine.

In outline, this parameter processor 14 carries out an instrumental error correction processing, a texture correction processing, and a high-density correction processing to the calibration data. Based on this, the parameter processor 14 calculates image processing parameters relating to read characteristics of the master color copying machine and the print characteristics of the slave color copying machine. The image processing parameters are stored in the controller 15. The image processing parameters are used for the processing at the IPU 12 and the printer 13 at the time of printing the image data received from the master color copying machine.

The transceiver 16 is a unit for transmitting/receiving data to/from an external color copying machine via the Internet cable 5 and the HUB 4. For example, when a color copying machine achieves functions of a master color copying machine (the color copying machine 1), the transceiver 16 transmits a calibration processing start instruction command, calibration data, a linkage print start instruction command, and draft image data to a slave color copying machine (the color copying machine 2 or the color copying machine 3).

The console 17 is a unit for receiving processing conditions of each portion of the color copying machine from a user. For example, when a color copying machine achieves functions of a master color copying machine (the color copying machine 1), the console 17 receives a calibration processing start instruction, a calibration pattern read start instruction, a linkage print start instruction, a draft read start instruction, and a number of prints made by the self (the color copying machine 1) and slave color copying machines (the color copying machine 2 and the color copying machine 3) for carrying out a linkage printing.

The controller 15 is a unit for controlling each portion of the color copying machine based on processing conditions received by the console 17. For example, when a color copying machine achieves functions of a slave color copying machine (the color copying machine 2 or the color copying machine 3), the controller 15 controls each portion to print out calibration patterns when a calibration processing start instruction command has been received from the master color copying machine (the color copying machine 1).

Further, when the calibration data has been received from the master color copying machine (the color copying machine 1), for example, the controller 15 controls each portion to calculate image processing parameters corresponding to the read characteristics of the master color copying machine. When a linkage printing start instruction command has been received from the color copying machine (the color copying machine 1), the controller 15 controls each portion to carry out an image processing using the image processing parameters corresponding to the read characteristics of the master color copying machine.

Figure 2:
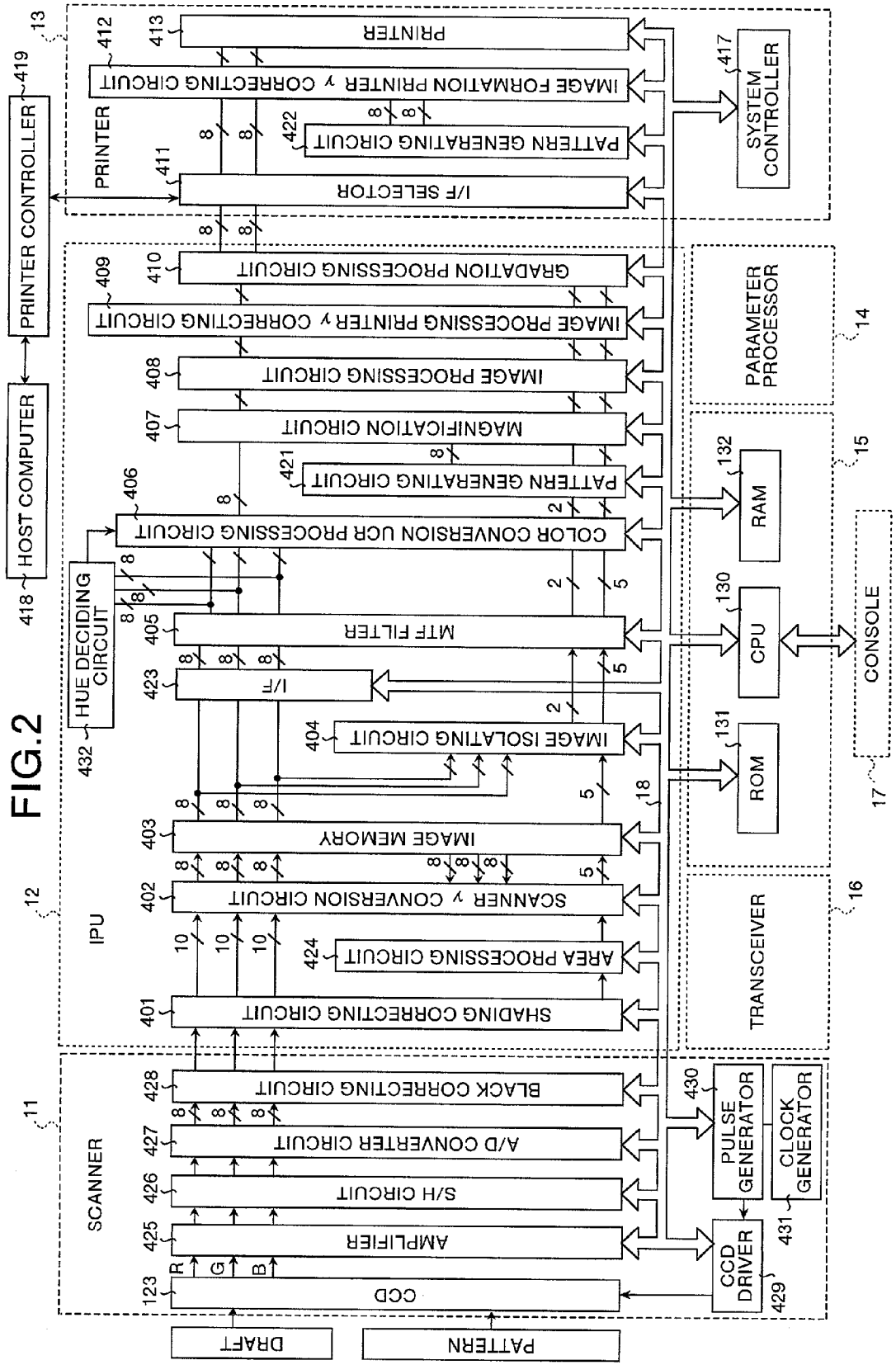
FIG. 2 is a block diagram showing a detailed structure of a color copying machine shown in FIG. 1.

(2) A Detailed Structure and Processing of Each Portion of a Color Copying Machine Next, a detailed structure and processing of each portion of the color copying machine will be explained with reference to FIG. 2. FIG. 2 is a block diagram showing a detailed structure of a color copying machine (the color copying machine 1, the color copying machine 2, the color copying machine 3) shown in FIG. 1. First, the scanner 11 of the color copying machine will be explained. As shown in FIG. 2, the scanner 11 of the color copying machine consists of a CCD 123, an amplifier circuit 425, a sample holding (S/H) circuit 426, an A/D converter circuit 427, a black correcting circuit 428, a CCD driver 429, a pulse generator 430, and a clock generator 431.

In the scanner 11, an exposure lamp (not shown) irradiates beams of a draft and calibration patterns (the patterns 21 and the patterns 31) to be copied. Reflected beams enter the CCD 123 via a reflection mirror (not shown) and a focusing lens (not shown). An RGB filter of the CCD 123 divides the reflected beams into three colors of Red, Green and Blue. The amplifier circuit 425 amplifies this analog signal into a predetermined size.

For converting an analog signal into a digital signal, the S/H circuit 426 sample-holds this amplified signal at every predetermined timing. The A/D converter circuit 427 converts this value into a digital signal expressed in, for example, an eight-bit signal value.

The amplifier circuit 425 amplifies the signal at an amplification factor of accommodating this digital signal within the range of this bit value. In other words, the amplification factor of the amplifier circuit 425 is determined such that an output value of the A/D converter circuit 427 after reading a certain specific draft density becomes a desired value. For example, a signal of a draft density 0.05 (0.891 in the reflection factor) during a normal copying is amplified to a value of 240 in the eight-bit signal value.

The black correcting circuit 428 decreases unevenness of black level (an electric signal when there is a small amount of light) between chips and between pixels of the CCD 123, thereby to prevent an occurrence of lines and unevenness in the black portion of the image. Assume a signal has a 240 value after the A/D conversion at a normal amplification rate, for example. The amplifier circuit 425 lowers the amplification factor of this signal and outputs a signal by lowering the digital signal value to a 180 value, for example, after the A/D conversion, at the time of shading correction. This reduction in the amplification factor is for increasing the sensitivity of the shading correction. When a shading correction is carried out at the amplification factor used for a normal copying, there arises a portion where the eight-bit signal after the A/D conversion is saturated to a maximum value of 255, when there is a large amount of reflection light. This results in an occurrence of error in the shading correction.

The CCD driver 429 supplies a pulse signal for driving the CCD 123. The pulse generator 430 supplies pulses necessary for driving the CCD driver 429, and supplies a timing necessary for the S/H circuit 426 to sample-hold the signal from the CCD 123. The clock generator 431 consists of a crystal oscillator and the like, and supplies a reference oscillation signal to the pulse generator 430.

The IPU 12 of the color copying machine will be explained next. As shown in FIG. 2, the IPU 12 of the color copying machine consists of a shading correcting circuit 401, an are a processing circuit 424, an interface I/F selector 423, a scanner γ conversion circuit 402, an image memory 403, an image isolating circuit 404, an MTF filter 405, a hue deciding circuit 432, a color conversion UCR processing circuit 406, a pattern generating circuit 421, a magnification circuit 407, an image processing (creating) circuit 408, an image processing printer γ correcting circuit 409, and a gradation processing circuit 410.

In the IPU 12, the shading correcting circuit 401 corrects white level (an electric signal when there is a large amount of light). The shading correcting circuit 401 irradiates beams by moving an exposure lamp (not shown) to a white color reference plate (not shown), thereby to correct variations in the white color and variations in the sensitivity of the CCD 123 that occur when the reflection light passes through a reflection mirror (not shown) and a focusing lens (not shown).

The area processing circuit 424 generates an area signal for identifying an area of a draft in which the image data is currently being processed. Based on the area signal output from this circuit, image processing parameters that are to be used at each processing section at a later stage are changed over. In other words, based on the comparison between area information assigned on the draft and read position information for reading the image, the processing circuit 424 generates the area signal.

Then, based on the area signal, parameters that are used in the scanner γ conversion circuit 402, the MTF filter 405, the color conversion UCR processing circuit 406, the image processing (creating) circuit 408, the image processing printer γ correcting circuit 409, and the gradation processing circuit 410, are changed.

It is possible to select image processing parameters in gradation conversion tables of a color correction coefficient, a space filter, etc. that are optimum for each draft like a character draft, a silver salt photograph draft, a half-tone photograph draft, an ink jet, a fluorescent pen, a map, and a heat-transfer draft, for each assigned area, from the setting in a plurality of tables according to each assigned image area.

When a color copying machine plays a role of a master color copying machine (the color copying machine 1), the image processing parameters are selected from a table of normal image processing parameters. When a color copying machine plays a role of a slave color copying machine (the color copying machine 2 or the color copying machine 3), the image processing parameters are selected from a table of image processing parameters corresponding to the read characteristics of the master color copying machine calculated by the parameter processor 14.

The interface I/F selector 423 is used for outputting an image read by the scanner to the outside. When this is used as a printer and a scanner IPU (a scanner and an IPU) like a copying machine, it is possible to take out the read image data from the I/F selector 411 of the printer to an external unit (a printer controller 419).

The scanner γ conversion circuit 402 converts reflection factor data of a signal read from the scanner into lightness data of this signal. The image isolating circuit 404 discriminates between a character portion and a photograph portion, and between chromatic color and achromatic color. The MTF filter 405 carries out a processing for changing frequency characteristics of an image signal like an edge emphasis and a smoothing according to a user's preference of a sharp image or a soft image, etc.

The color conversion UCR processing circuit 406 consists of a color correction processor for correcting a difference between color resolution characteristics of an input system and spectral characteristics of a color material of an output system, and calculating volumes of color materials YMC necessary for a faithful color reproduction, and a UCR processor for replacing a portion of a superimposition of three colors of YMC with black Bk.

This color correction processing is carried out based on a predetermined matrix calculation. The color correction processing is carried out using predetermined color correction coefficients. The color correction coefficients are different depending on six hues of RGBYMC, twelve hues obtained by dividing the six hues, and fourteen hues with an addition of black and white. Further, the hue deciding circuit 432 decides a hue to which the read data belongs. Based on a result of this decision made, each correction parameter of each hue is selected. The magnification circuit 407 magnifies vertically and horizontally. The image processing (creating) circuit 408 carries out a repeat processing.

The image processing printer γ correcting circuit 409 corrects an image signal according to an image quality mode of a character and a photograph. This circuit can also carry out skipping of a texture at the same time. The image processing printer γ correcting circuit 409 has a plurality of (for example, ten) gradation conversion tables that can be changed over corresponding to the area signals generated by the area processing circuit 424. It is possible to select gradation conversion tables that are optimum for each draft like a character draft, a silver salt photograph draft, a half-tone photograph draft, an ink jet, a fluorescent pen, a map, and a heat-transfer draft, from among a plurality of image processing parameters.

In other words, within the image processing printer γ correcting circuit 409, the decoder 1 decodes an area signal from the area processing circuit 424. A selector 1 selects a gradation conversion table from among a plurality of gradation conversion tables like characters, ink jet, etc. For example, a character gradation conversion table 1 is selected for a character area. A silver salt photograph gradation conversion table 3 is selected for a silver salt photograph area. A half-tone photograph draft gradation conversion table 4 is selected for a half-tone photograph area.

The gradation processing circuit 410 carries out a dither processing or a pattern processing. The pixel frequency of the output of the gradation processing circuit 410 is lowered to a half. Therefore, in order to be able to transfer data of two pixels to the printer at the same time, the image data bus has a sixteen-bit width (for two eight-bit image data).

In other words, the image signal (image data) that has been gradation-converted by the image processing printer γ correcting circuit 409 is decoded by a decoder 2 corresponding to the area signal again in the gradation processing circuit 410. Based on this signal, a selector 2 switches the gradation processing to be used. As gradation processing that can be used, there are a processing that does not use dither, a processing that uses dither, and an error dispersion processing. The error dispersion processing is carried out for an ink jet draft.

A decoder 3 selects a line 1 or a line 2 for an image signal after the gradation processing, based on read position information. The line 1 and the line 2 are changed over for each pixel in a sub-scanning direction. The data on the line 1 is temporarily stored in a FIFO (First In First Out) memory that is located at the downstream of a selector 3, and the data on the line 1 and the line 2 are output. With this arrangement, it is possible to lower the pixel frequency to one half, and apply the data to the interface I/F selector 411.

The pattern generating circuits 421 and 422 generate gradation patterns to be used in the IPU 12 and the printer 13 respectively.

Next, the printer 13 of the color copying machine will be explained. As shown in FIG. 2, the printer 13 in the color copying machine consists of an image formation printer γ correcting circuit 412, a printer 413, an I/F selector 411, a system controller 417, and a pattern generating circuit 422.

In this printer 13, the I/F selector 411 has functions of outputting the image data read by the scanner 11 to an external unit like a host computer 418 for this computer to process this image data, and changing over the image data from the external host computer 418 or other color copying machine (the mater color copying machine) to output this image data to the printer 413.

The image formation printer γ (procon γ) correcting circuit 412 converts an image signal from the I/F selector 411 based on the gradation conversion table, and outputs a result to a modulation circuit (not shown).

As described above, the printer 13 consists of the I/F selector 411, the image formation printer γ correcting circuit 412, the printer 413, and the system controller 417. It is possible to use this printer independent of the scanner 11 and the IPU 12. Therefore, the printer 13 can be used to achieve a printer function (printer) by arranging such that the I/F selector 411 inputs image data of a master color copying machine received by the transceiver 16, the image formation printer γ correcting circuit 412 carries out a gradation conversion, is and the printer 413 forms an image.

Next, the controller 15 of the color copying machine will be explained. As shown in FIG. 2, the controller 15 of the color copying machine consists of a CPU 130, a ROM 131, and a RAM 132.

In this controller 15, the CPU 130 controls the scanner 11, the IPU 12, the printer 13, the parameter processor 14, the transceiver 16, and the console 17. In other words, the CPU 130 is connected to these units via the bus 18. Further, the CPU 130 reads/writes data necessary for the control to/from the ROM 131 and the RAM 132 respectively.

The CPU 130 also controls a scanner driving unit not shown, and drive-controls the scanner. The ROM 131 stores image processing parameters.

(3) Processing of Image Processing Parameters

Figure 3:
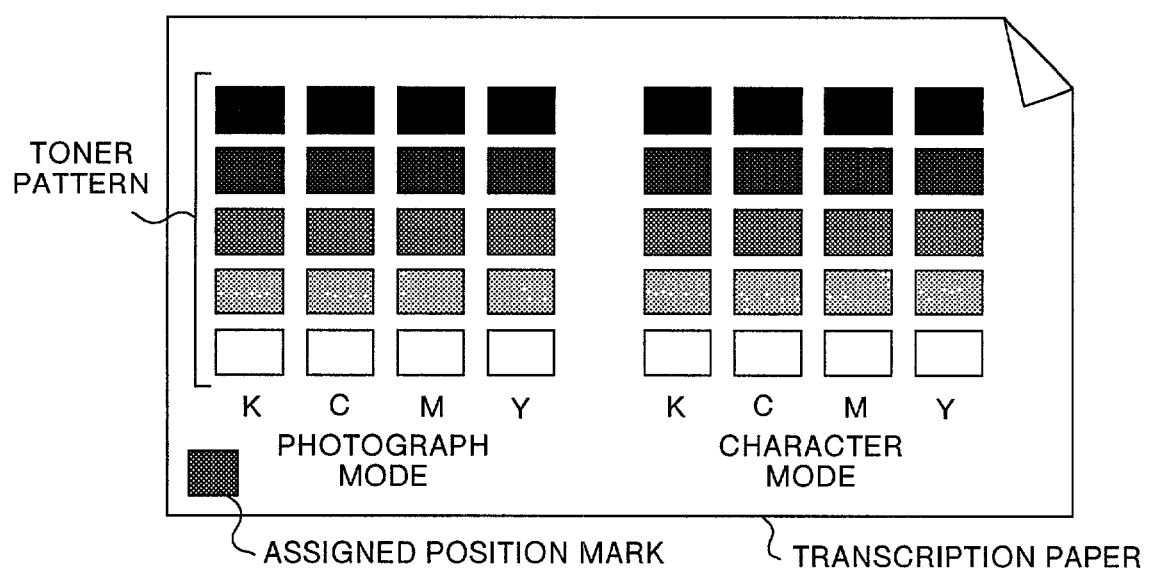
FIG. 3 is a diagram showing calibration patterns output from the color copying machine shown in FIG. 1.

The image processing parameters in the parameter processor 14 of the color copying machine will be explained next. FIG. 3 is a diagram showing calibration patterns output from the color copying machine (the color copying machine 2 and the color copying machine 3) shown in FIG. 1. As shown in FIG. 3, the calibration patterns are formed with a plurality of density gradation patterns corresponding to the colors of YMCK, characters, and image quality mode of a photograph. These calibration patterns are set and stored in the ROM 131 of the controller in advance.

When the slave color copying machine has received a calibration processing start instruction command from the master color copying machine (the color copying machine 1) the slave color copying machine (the color copying machine 2 or the color copying machine 3) outputs these calibration patterns. In other words, the printer 13 of the slave color copying machine writes the calibration patterns stored in the ROM 131 onto a sheet of transcription paper in sixteen patterns of 00h, 11h, 22h, - - - , EEh, and FFh in a hexadecimal display. FIG. 3 shows patches of five gradations excluding the texture, and it is possible to select an optional value within an eight-bit signal of 00h-FFh.

Then, the transcription papers on which calibration patterns (hereinafter to be referred to as "patterns") are printed are mounted on a draft table of the master color copying machine (the color copying machine 1). The scanner 11 reads these patterns, and transmits the read data (hereinafter to be referred to as "calibration data") to the slave color copying machine (the color copying machine 2 or the color copying machine 3). The parameter processor 14 of the slave color copying machine calibrates the calibration data, and processes the image processing parameters corresponding to the read characteristics of the master color copying machine.

Specifically, the parameter processor 14 prepares image processing parameters (a YMCK gradation correction table) for each image mode of photograph and characters by carrying out an instrumental error correction, a texture correction and a high-density correction for each of the YMCK colors, using the calibration data and reference data and instrumental error correction values stored in advance in the ROM 131.

The prepared image processing parameters are stored in the ROM 131. These image processing parameters are used when the slave color copying machine carries out the image processing and print processing of the image data received from the master color copying machine (the color copying machine 1). As a result, the slave color copying machine (the color copying machine 2 or the color copying machine 3) can printout a printed material with uniform color reproducibility having colors similar to those of the printed material at the master color copying machine side.

(4) Calibration Processing in the Image Formation System

Figure 4:
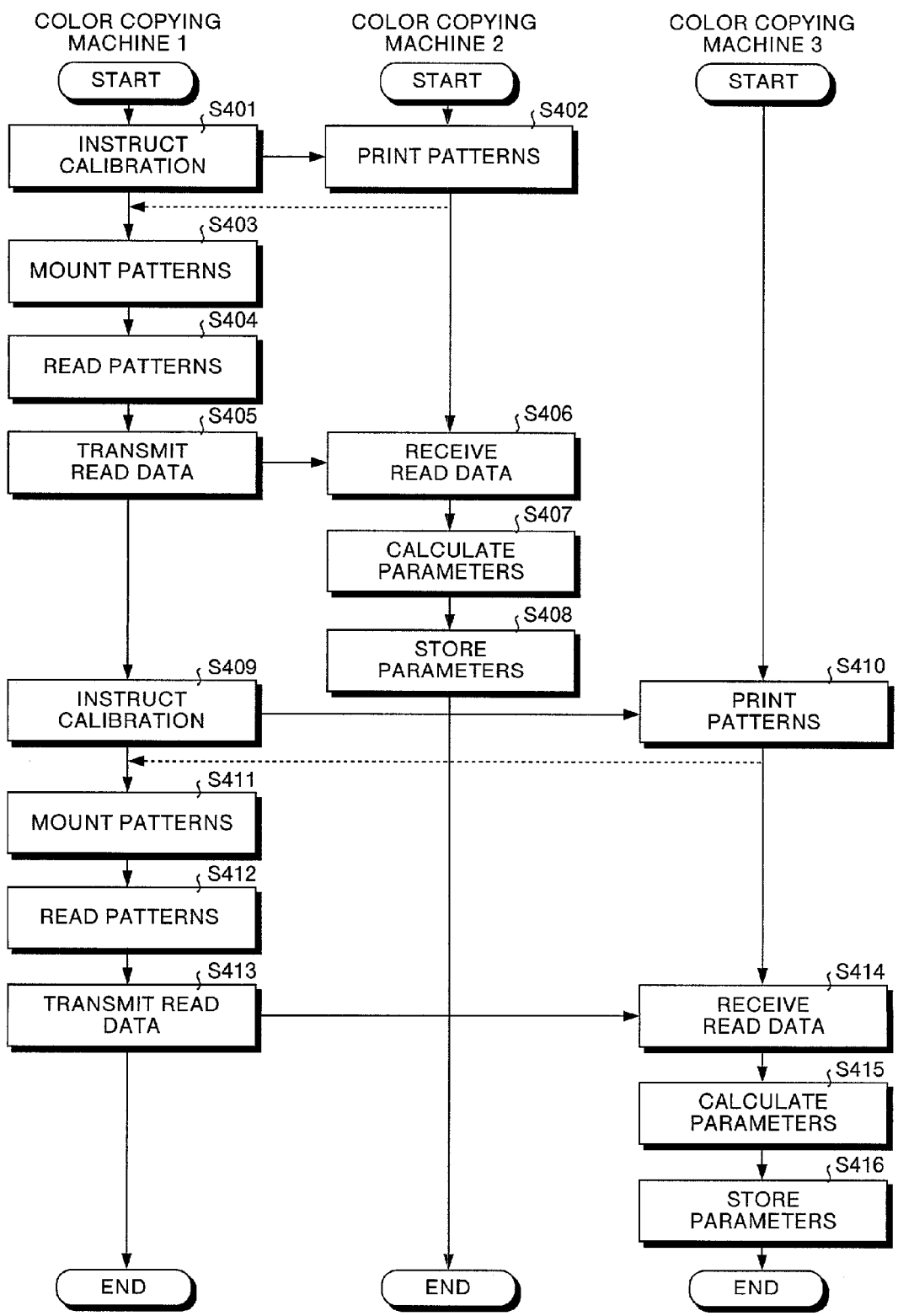
FIG. 4 is a flowchart showing a procedure of a calibration processing in the image formation system relating to the first embodiment.

A procedure of the calibration processing in the image formation system relating to the first embodiment will be explained next. FIG. 4 is a flowchart showing a procedure of the calibration processing in the image formation system relating to the first embodiment. First, when the console 17 of the color copying machine 1 has received a calibration processing start instruction for calibrating with the color copying machine 2, the color copying machine 1 transmits a calibration processing start instruction command to the color copying machine 2 (step S401).

Next, the color copying machine 2 receives the calibration processing start instruction command, and prints the calibration patterns (step S402). The color copying machine 1 mounts the calibration patterns on the scanner 11 of the color copying machine 1 (step S403). The color copying machine 1 reads the mounted calibration patterns (step S404), and transmits the read data to the color copying machine 2 (step S405).

The color copying machine 2 receives the read data (step S406). The parameter processor 14 processes the image processing parameters based on the received read data (step S407), and stores the processed image processing parameters in the controller 15 (step S408).

When the console 17 of the color copying machine 1 has received a calibration processing start instruction for calibrating with the color copying machine 3, the color copying machine 1 transmits a calibration processing start instruction command to the color copying machine 3 (step S409).

Next, the color copying machine 3 receives the calibration processing start instruction command, and prints the calibration patterns (step S410). The color copying machine 1 mounts the calibration patterns on the scanner 11 of the color copying machine 1 (step S411) The color copying machine 1 reads the mounted calibration patterns (step S412), and transmits the read data to the color copying machine 3 (step S413).

The color copying machine 3 receives the read data (step S414). The parameter processor 14 processes the image processing parameters based on the received read data (step S415), and stores the processed image processing parameters in the controller 15 (step S416).

(5) Processing of Linkage Printing in the Image Formation System

Figure 5:
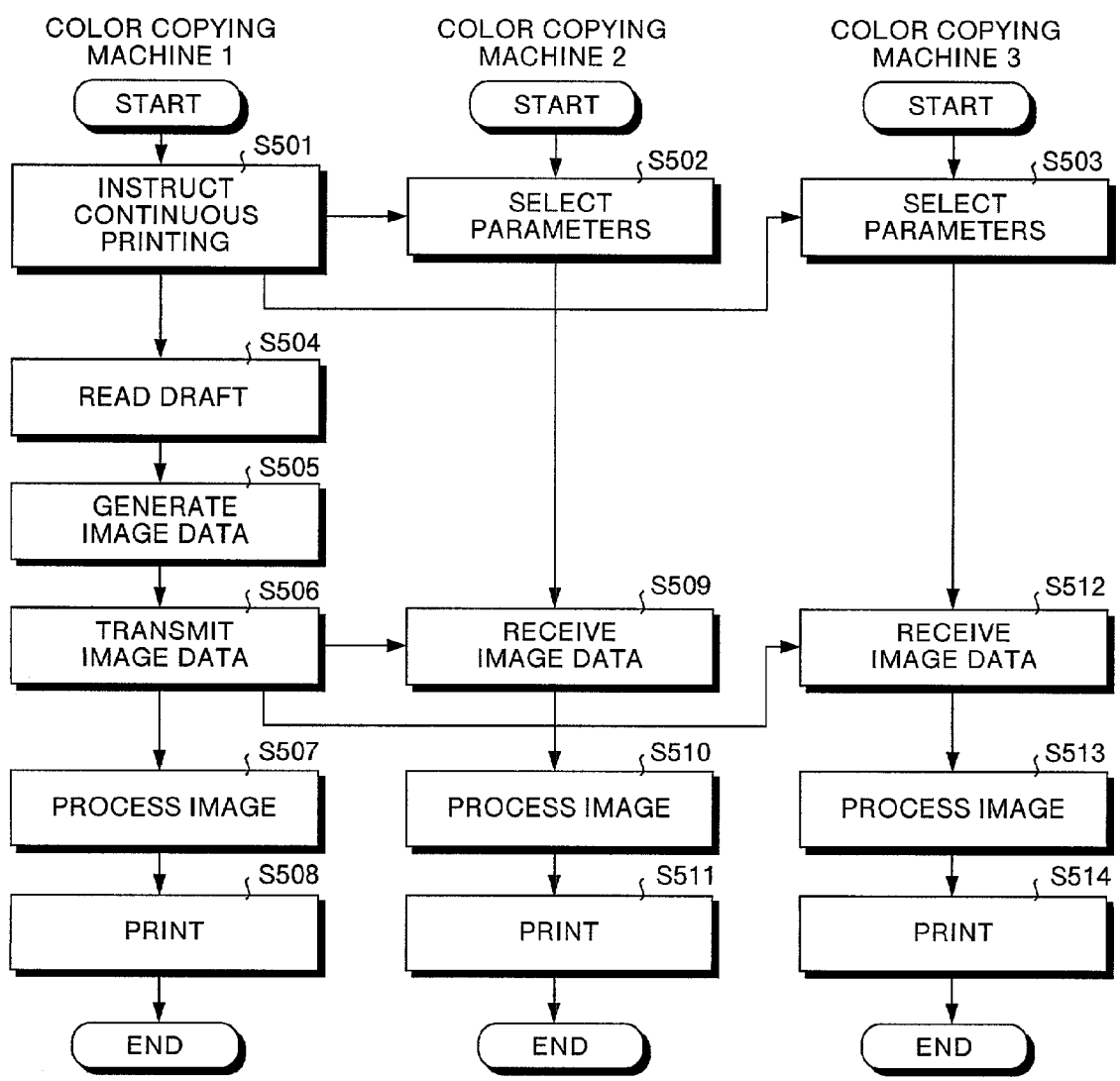
FIG. 5 is a flowchart showing a procedure of a linkage printing in the image formation system relating to the first embodiment.

Next, the processing of a linkage printing in the image formation system relating to the first embodiment will be explained. FIG. 5 is a flowchart showing a procedure of a linkage printing in the image formation system relating to the first embodiment. First, when the console 17 of the color copying machine 1 has received a linkage print processing start instruction for carrying out a linkage processing with the color copying machine 2 and the color copying machine 3 respectively, the color copying machine 1 transmits a linkage print processing start instruction command to the color copying machine 2 and the color copying machine 3 respectively (step S501).

Next, the color copying machine 2 and the color copying machine 3 receive the linkage print processing start instruction command respectively, and select image processing parameters corresponding to the read characteristics of the color copying machine 1 from the parameters stored in the ROM 131 (step S502 and step S503).

The scanner 11 of the color copying machine 1 reads a draft (step S504), prepares image data (step S505), and transmits this image data to the IPU 12 as well as to the color copying machine 2 and the color copying machine 3 (step S506). Next, the IPU 12 of the color copying machine 1 carries out various kinds of image processing (step S507), and the printer 13 prints the image data (step S508).

In the mean time, the color copying machine 2 receives the image data from the color copying machine 1 (step S509), and the IPU 12 carries out various kinds of image processing using the image processing parameters selected at step S502 (step S510). The printer 13 prints the image data (step S511).

At the same time, the color copying machine 3 receives the image data from the color copying machine 1 (step S512), and the IPU 12 carries out various kinds of image processing using the image processing parameters selected at step S503 (step S513). The printer 13 prints the image data (step S514).

As explained above, according to the first embodiment, the color copying machine 1 prepares the calibration data that has read the calibration patterns output from the printers 13 of the color copying machine 2 and the color copying machine 3 respectively, at the scanner 11 of the color copying machine 1. The parameter processors 14, the controllers 15, the IPUs 12, and the printers 13 of the color copying machine 2 and the color copying machine 3 respectively correct the draft image input from the scanner 11 of the color copying machine 1, based on the calibration data. Based on this arrangement, the printed materials of the draft images output from the color copying machine 2 and the color copying machine 3 have uniform color reproducibility with colors similar to those of the printed material at the color copying machine 1 that has input the draft image. As a result, in the case of producing a large volume of copies from only one existing draft in a short time, it is possible to improve the color reproducibility of the printed materials.

Further, according to the first embodiment, in the color copying machine 2 and the color copying machine 3, the parameter processors 14 calculate image processing parameters relating to the read characteristics of the scanner 11 of the color copying machine 1 and the print characteristics of the printer 13 of the color copying machine 2 or the color copying machine 3, based on the calibration data. The IPUs 12 and the printers 13 of the color copying machine 2 and the color copying machine 3 respectively convert the draft image input from the scanner 11 of the color copying machine 1, using the image processing parameters calculated by the parameter processors 14. Based on this arrangement, the printed materials of the draft images output from the color copying machine 2 and the color copying machine 3 have uniform color reproducibility with colors similar to those of the printed material at the color copying machine 1 that has input the draft image. As a result, in the case of producing a large volume of copies from only one existing draft in a short time, it is possible to improve the color reproducibility of the printed materials.

Further, according to the first embodiment, in the color copying machine 2 and the color copying machine 3, the parameter processors 14 compares the calibration data with a predetermined target data, thereby to calculate the image processing parameters to be used for gradation conversion. Based on this arrangement, the printed materials of the draft images output from the color copying machine 2 and the color copying machine 3 have uniform color reproducibility with colors similar to those of the printed material at the color copying machine 1 that has input the draft image. As a result, in the case of producing a large volume of copies from only one existing draft in a short time, it is possible to improve the color reproducibility of the printed materials.

Further, according to the first embodiment, in the color copying machine 2 and the color copying machine 3, the controllers 15 store the image processing parameters calculated by the parameter processors 14. The IPUs 12 and the printers 13 convert the draft image input from the scanner 11 of the color copying machine 1 using the image processing parameters stored in the controllers 15, only when the draft image input by the scanner 11 of the color copying machine 1 is to be output. Therefore, when the color copying machine 2 and the color copying machine 3 are to be used as single color copying machines respectively, it is also possible to maintain the color reproducibility of the printed materials.

In the first embodiment, there has been explained the case where the color copying machine 2 and the color copying machine 3 calculate the image processing parameters. However, the present invention is not limited to this case. It is also possible to arrange such that the color copying machine 1 calculates image processing parameters, stores the image processing parameters, and carries out the image processing using the image processing parameters. It is also possible to arrange such that a separate color copying machine calculates image processing parameters, stores the image processing parameters, and carries out the image processing using the image processing parameters.

(Second Embodiment)

In the first embodiment, one color copying machine transmits image data to a plurality of color copying machines, and these color copying machines print the received image data. However, the present invention is not limited to this, and it is also possible to arrange such that a plurality of color copying machines read image data, and transmit the read image data to one color copying machine, and this color copying machine prints the received image data. In the second embodiment, there will be explained the case where a plurality of color copying machines transmit image data to one color copying machine, and this color copying machine prints the received image data. In the following description, portions having functions similar to those of the portions shown in the first embodiment are attached with like reference symbols, and detailed explanation of these portions will be omitted.

Figure 6:
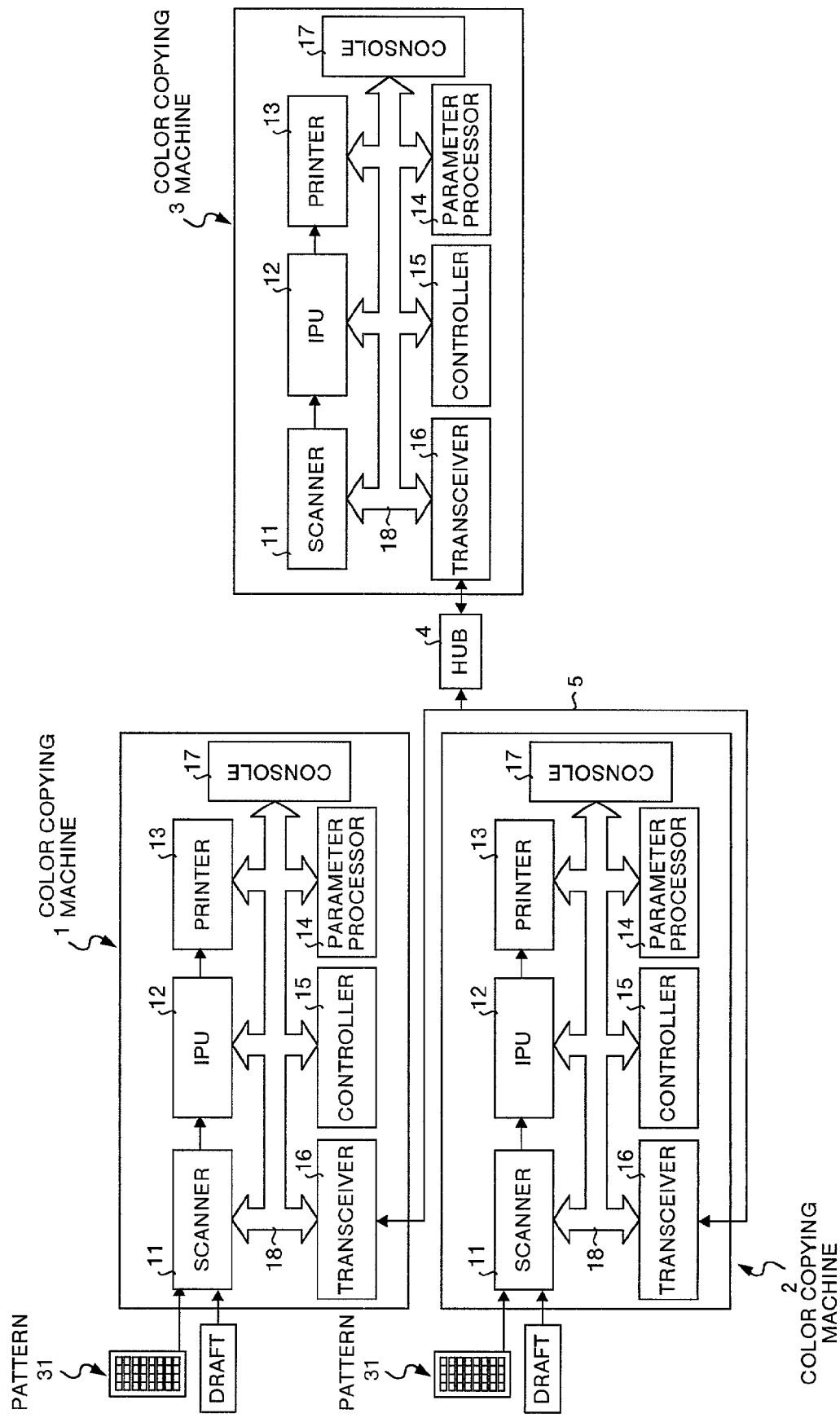
FIG. 6 is a block diagram showing a structure of an image formation system relating to a second embodiment of the present invention.

First, a structure of an image formation system relating to the second embodiment will be explained. FIG. 6 is a block diagram showing a structure of the image formation system relating to the second embodiment. As shown in FIG. 6, the image formation system relating to the second embodiment consists of a color copying machine 1, a color copying machine 2, and a color copying machine 3 that are connected together via an Internet cable 5 and a HUB 4 so that these color copying machines can transmit/receive data to and from each other. The color copying machine 1 and the color copying machine 2 read image data and transmit the read image data to the color copying machine 3, and this color copying machine 3 prints the received image data.

In outline, the image formation system relating to the second embodiment makes the color copying machine 1 and the color copying machine 2 (hereinafter to be referred to as a "master color copying machines") read calibration patterns (hereinafter to be referred to as patterns 31) of the color copying machine 3 (hereinafter to be referred to as a "slave color copying machine"). Then, the slave color copying machine carries out calibration based on the read data, and processes image processing parameters corresponding to the read characteristics of the master color copying machines respectively.

The master color copying machines transmit the image data read by the master color copying machines to the slave color copying machine. The slave color copying machine carries out image processing to the received image data using image processing parameters corresponding to the master color copying machines, thereby to produce an output of a printed material with uniform color reproducibility having colors similar to those of the printed materials of the master color copying machines.

Figure 7:
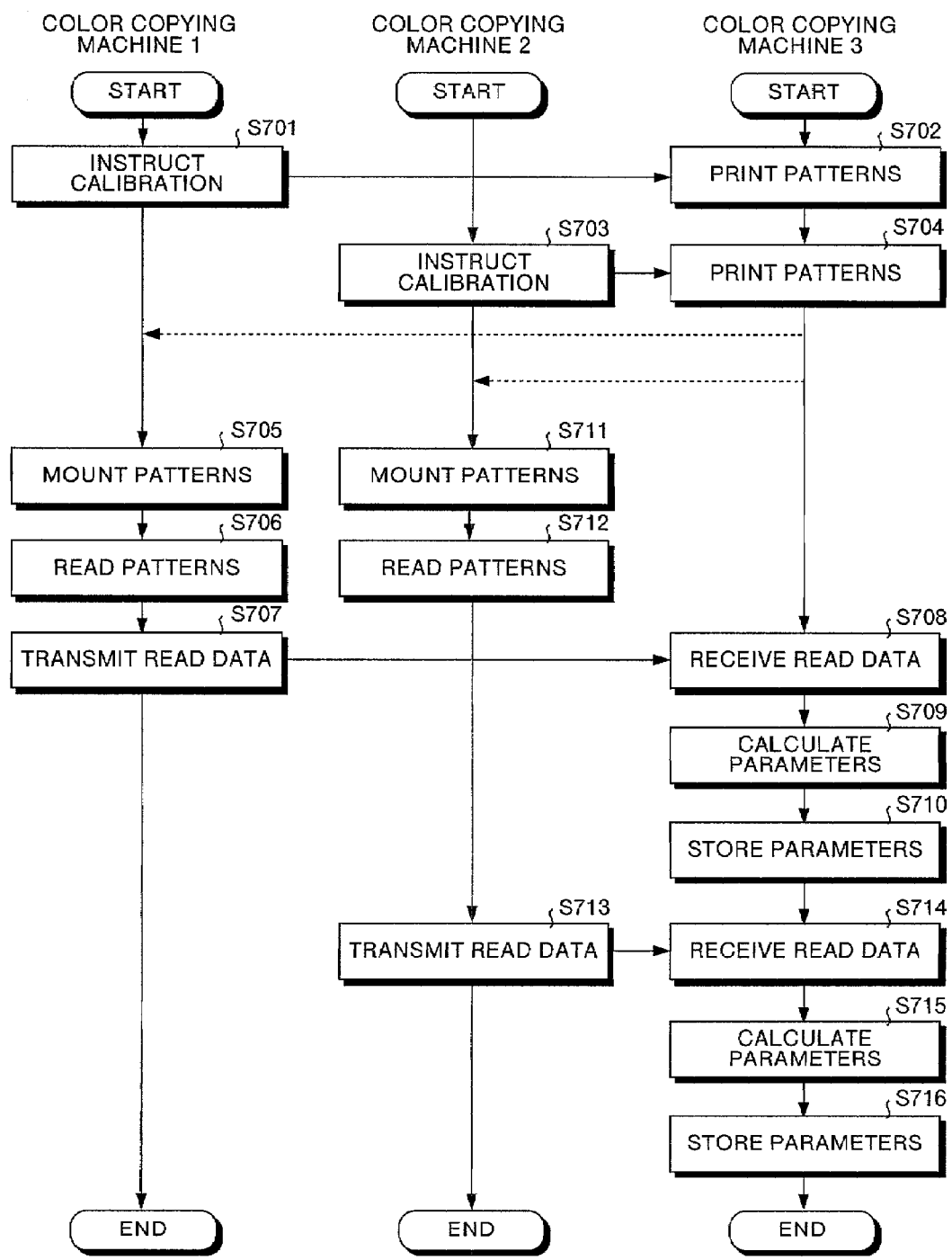
FIG. 7 is a flowchart showing a procedure of a calibration processing in the image formation system relating to the second embodiment.
Figure 8:
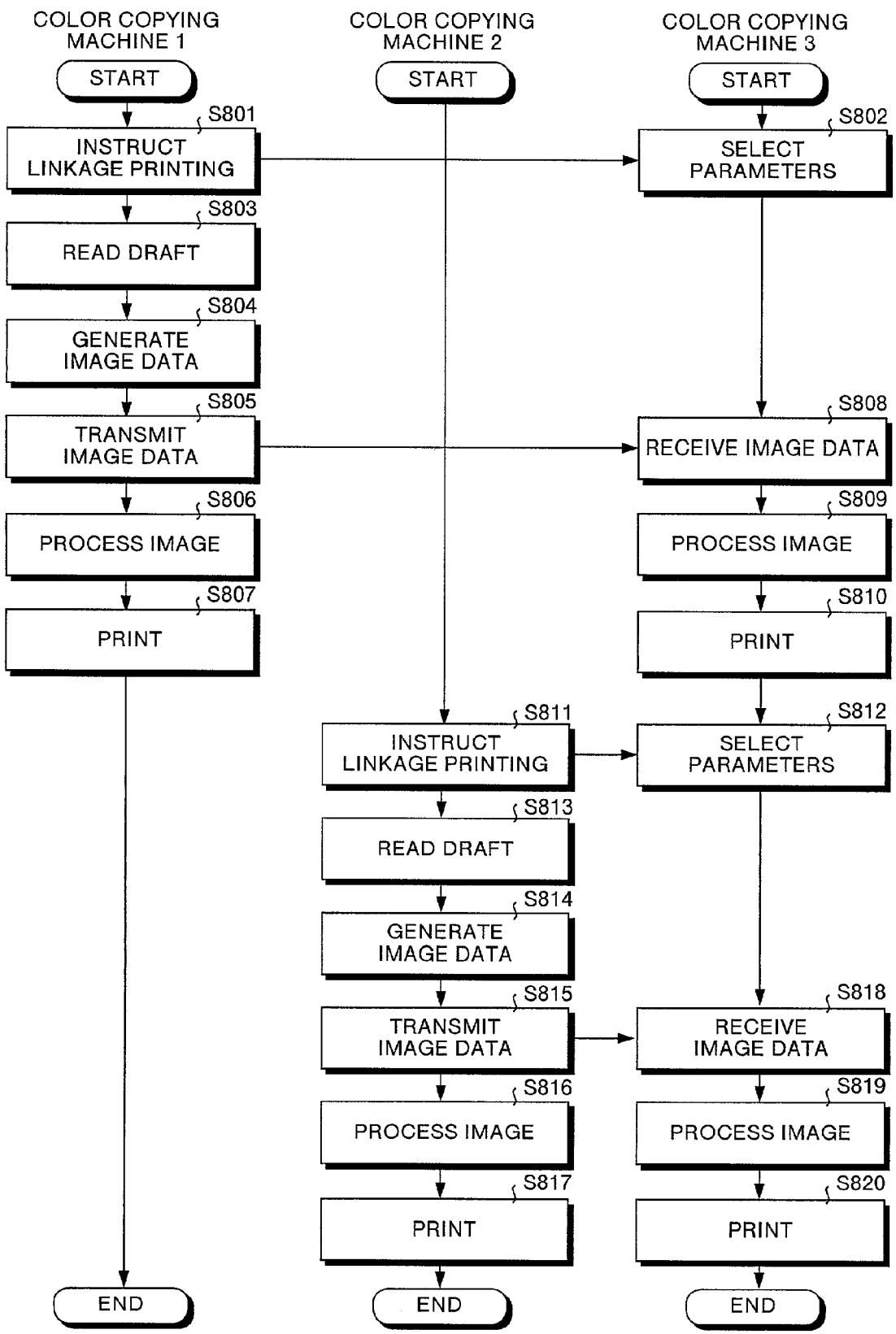
FIG. 8 is a flowchart showing a procedure of a linkage printing in the image formation system relating to the second embodiment.

With reference to FIG. 7 and FIG. 8, the image formation system relating to the second embodiment will be explained on the following points in sequence: (1) calibration processing in the image formation system, and (2) processing of linkage printing in the image formation system. The color copying machines (the color copying machine 1, the color copying machine 2, and the color copying machine 3) shown in FIG. 6 have structures and functions similar to those of the color copying machines used in the first embodiment. Therefore, the explanation of the structures and functions of each portion in the color copying machines of the second embodiment will be omitted.

(1) Calibration Processing in the Image Formation System

First, a procedure of the calibration processing in the image formation system relating to the second embodiment will be explained. FIG. 7 is a flowchart showing a procedure of the calibration processing in the image formation system relating to the second embodiment. First, when the console 17 of the color copying machine 1 has received a calibration processing start instruction for calibrating with the color copying machine 3, the color copying machine 1 transmits a calibration processing start instruction command to the color copying machine 3 (step S701). Also, when the console 17 of the color copying machine 2 has received a calibration processing start instruction for calibrating with the color copying machine 3, the color copying machine 2 transmits a calibration processing start instruction command to the color copying machine 3 (step S703).

Next, the color copying machine 3 receives the calibration processing start instruction commands from the color copying machine 1 and the color copying machine 2 respectively, and prints the calibration patterns (step S702 and step S704). The color copying machine 1 and the color copying machine 2 mount the calibration patterns on the scanners 11 of the color copying machine 1 and the color copying machine 2 respectively (step S705 and step S711) The color copying machine 1 and the color copying machine 2 read the mounted calibration patterns respectively (step S706 and step S712), and transmit the read data to the color copying machine 3 (step S707 and steps S713).

When the color copying machine 3 has received the read data from the color copying machine 1 (step S708), the parameter processor 14 of the color copying machine 3 processes the image processing parameters corresponding to the read characteristics of the color copying machine 1 based on the received read data (step S709), and stores the processed image processing parameters in the controller 15 (step S710).

Also, when the color copying machine 3 has received the read data from the color copying machine 2 (step S714), the parameter processor 14 of the color copying machine 3 processes the image processing parameters corresponding to the read characteristics of the color copying machine 2 based on the received read data (step S715), and stores the processed image processing parameters in the controller 15 (step S716).

(2) Processing of Linkage Printing in the Image Formation System

Next, the processing of a linkage printing in the image formation system relating to the second embodiment will be explained. FIG. 8 is a flowchart showing a procedure of a linkage printing in the image formation system relating to the second embodiment. First, when the console 17 of the color copying machine 1 has received a linkage print processing start instruction for carrying out a linkage processing with the color copying machine 3, the color copying machine 1 transmits a linkage print processing start instruction command to the color copying machine 3 (step S801).

Next, the color copying machine 3 receives the linkage print processing start instruction command from the color copying machine 1, and selects image processing parameters corresponding to the read characteristics of the color copying machine 1 from the parameters stored in the ROM 131 (step S802).

The scanner 11 of the color copying machine 1 reads a draft (step S803), prepares image data (step S804), and transmits this image data to the IPU 12 as well as to the color copying machine 3 (step S805). Next, the IPU 12 of the color copying machine 1 carries out various kinds of image processing (step S806), and the printer 13 prints the image data (step S807).

The color copying machine 3 receives the image data from the color copying machine 1 (step S808), and the IPU 12 carries out various kinds of image processing using the image processing parameters corresponding to the read characteristics of the color copying machine 1 selected at step S802 (step S809). The printer 13 of the color copying machine 3 prints the image data (step S810).

When the console 17 of the color copying machine 2 has received a linkage print processing start instruction for carrying out a linkage processing with the color copying machine 3, the color copying machine 2 transmits a linkage print processing start instruction command to the color copying machine 3 (step S811).

Next, the color copying machine 3 receives the linkage print processing start instruction command from the color copying machine 2, and selects image processing parameters corresponding to the read characteristics of the color copying machine 2 from the parameters stored in the ROM 131 (step S812).

The scanner 11 of the color copying machine 2 reads a draft (step S813), prepares image data (step S814), and transmits this image data to the IPU 12 as well as to the color copying machine 3 (step S815). Next, the IPU 12 of the color copying machine 2 carries out various kinds of image processing (step S816), and the printer 13 prints the image data (step S817).

The color copying machine 3 receives the image data from the color copying machine 2 (step S818), and the IPU 12 carries out various kinds of image processing using the image processing parameters corresponding to the read characteristics of the color copying machine 2 selected at step S812 (step S819). The printer 13 of the color copying machine 3 prints the image data (step S820).

As explained above, according to the second embodiment, the color copying machine 1 and the color copying machine 2 prepare respectively the calibration data that have read the calibration patterns output from the printer 13 of the color copying machine 3, at the scanners 11 of the color copying machine 1 and the color copying machine 2 respectively. The parameter processor 14, the controller 15, the IPU 12, and the printer 13 of the color copying machine 3 respectively correct the draft images input from the scanners 11 of the color copying machine 1 and the color copying machine 2, based on the calibration data. Based on this arrangement, the printed materials of the draft images output from the color copying machine 3 have uniform color reproducibility with colors similar to those of the printed materials at the color copying machine 1 and the color copying machine 2 that have input the draft images. As a result, in the case of producing a large volume of copies of drafts existing at a plurality of positions in a short time, it is possible to improve the color reproducibility of the printed materials.

In the second embodiment, there has been explained the case where the color copying machine 3 calculates the image processing parameters. However, the present invention is not limited to this case. It is also possible to arrange such that the color copying machine 1 and the color copying machine 2 calculate image processing parameters, store the image processing parameters, and carry out the image processing using the image processing parameters. It is also possible to arrange such that a separate color copying machine calculates image processing parameters, stores the image processing parameters, and carries out the image processing using the image processing parameters.

(Third Embodiment)

In the first embodiment, one color copying machine transmits image data to a plurality of color copying machines, and these color copying machines print the received image data. However, the present invention is not limited to this, and it is also possible to arrange such that one image processor reads image data, and transmit the read image data to a plurality of printers, and these printers print the received image data. In the third embodiment, there will be explained the case where one image processor transmits image data to a plurality of printers, and these printers print the received image data. In the following description, portions having functions similar to those of the portions shown in the first embodiment are attached with like reference symbols, and detailed explanation of these portions will be omitted.

Figure 9:
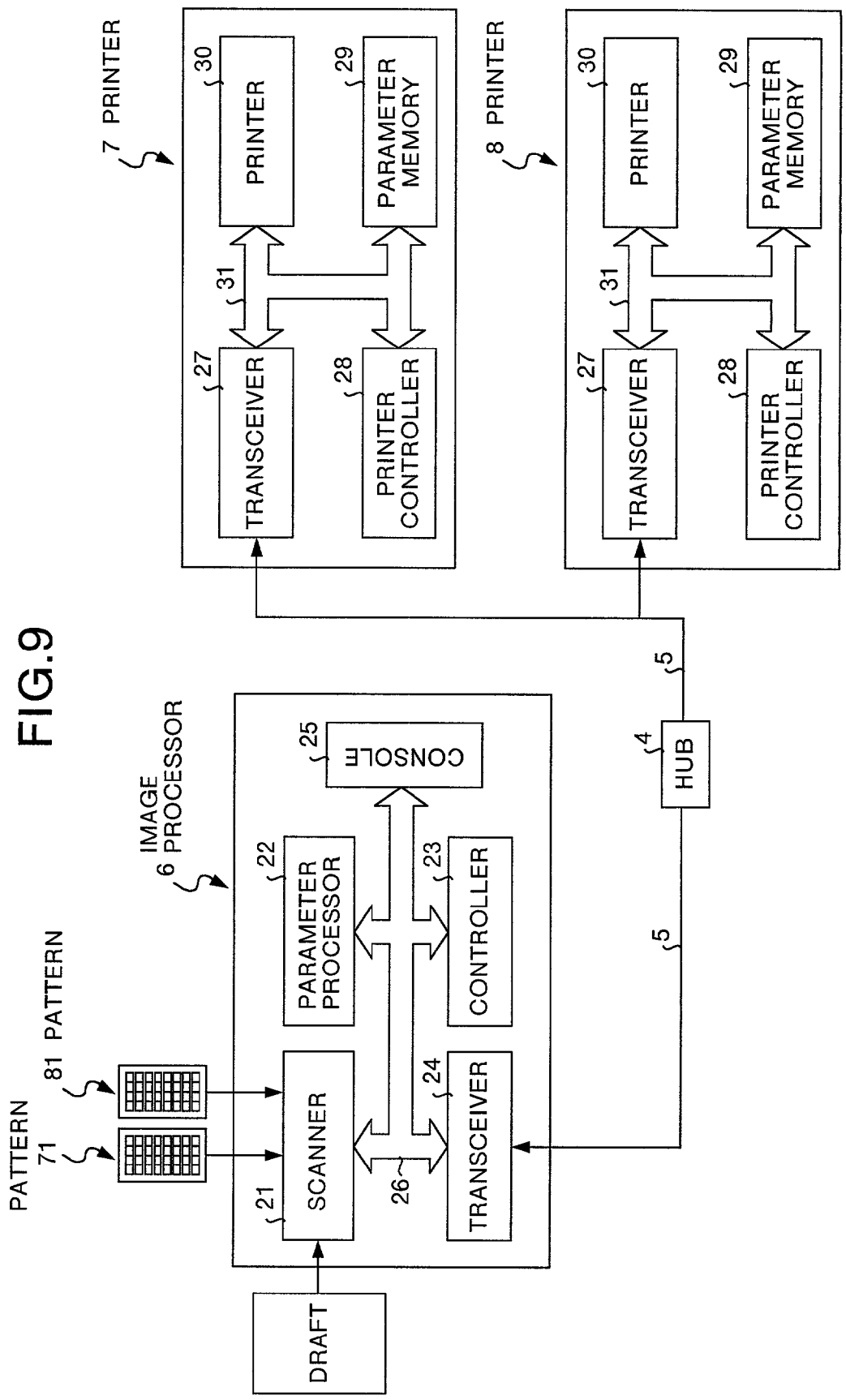
FIG. 9 is a block diagram showing a structure of an image formation system relating to a third embodiment of the present invention.

First, a structure of the image formation system relating to the third embodiment will be explained. FIG. 9 is a block diagram showing a structure of the image formation system relating to the third embodiment. As shown in FIG. 9, the image formation system relating to the third embodiment consists of an image processor 6, a printer 7, and a printer 8 that are connected together via an Internet cable 5 and a HUB 4 so as to be able to transmit/receive data to and from each other. The image processor 6 reads image data and transmits the read image data to the printer 7 and the printer 8, and these printers 7 and 8 print the received image data.

In outline, the image formation system relating to the third embodiment makes the image processor 6 read calibration patterns (hereinafter to be referred to as patterns 71 and patterns 81) of the printer 7 and the printer 8 (hereinafter to be referred to as "printers") respectively. Then, the image processor 6 carries out calibration based on the read data, and process image processing parameters corresponding to the read characteristics of the image processor 6. The processed image processing parameters are transmitted to the printer 7 and the printer 8, and are stored in these printers.

The image processor 6 transmits the image data read by the image processor 6 to the printer 7 and the printer 8 respectively. The printer 7 and the printer 8 carry out image processing to the received image data using image processing parameters corresponding to the image processor 6, thereby to produce outputs of printed materials with uniform color reproducibility having similar colors.

Figure 10:
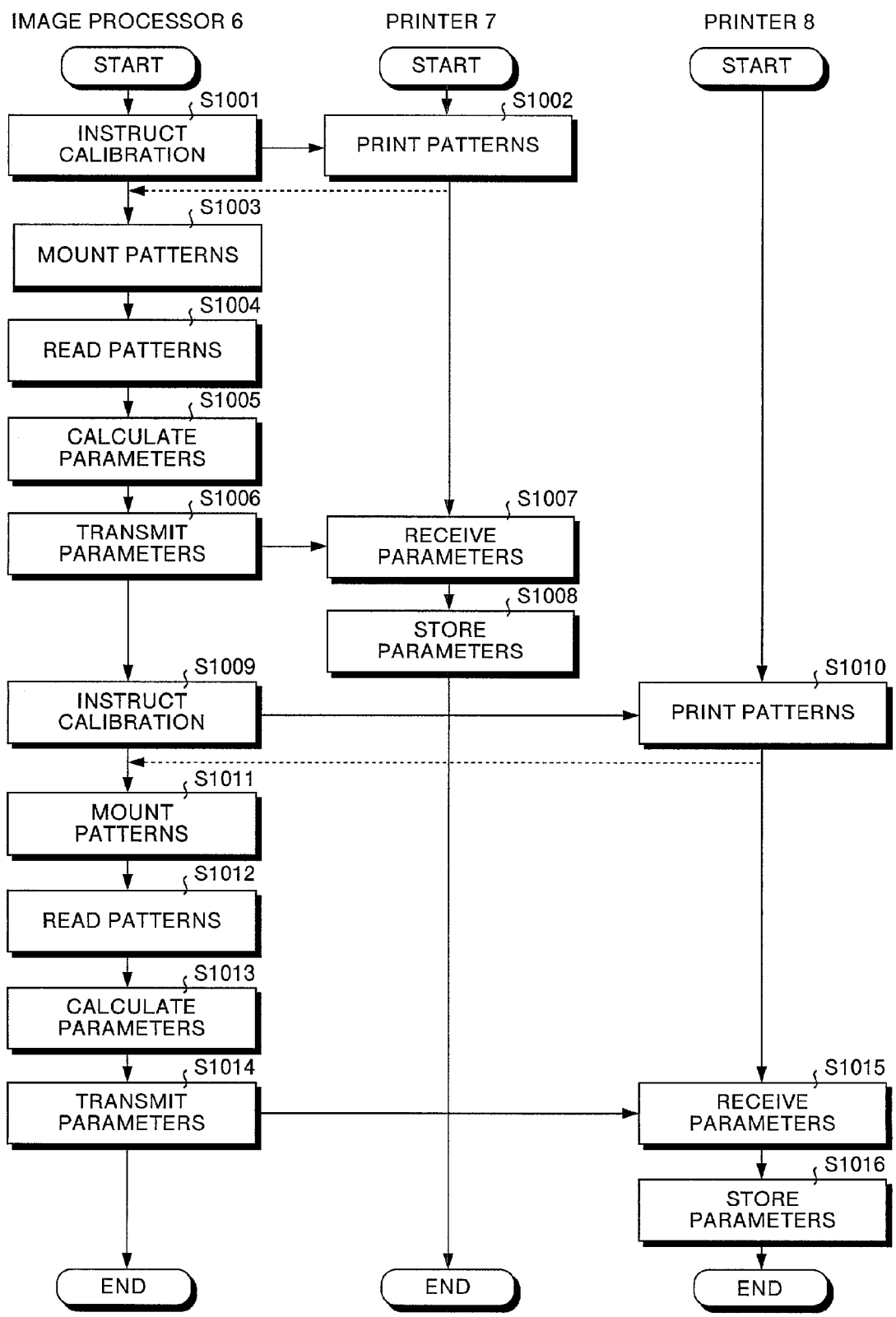
FIG. 10 is a flowchart showing a procedure of a calibration processing in the image formation system relating to the third embodiment.
Figure 11:
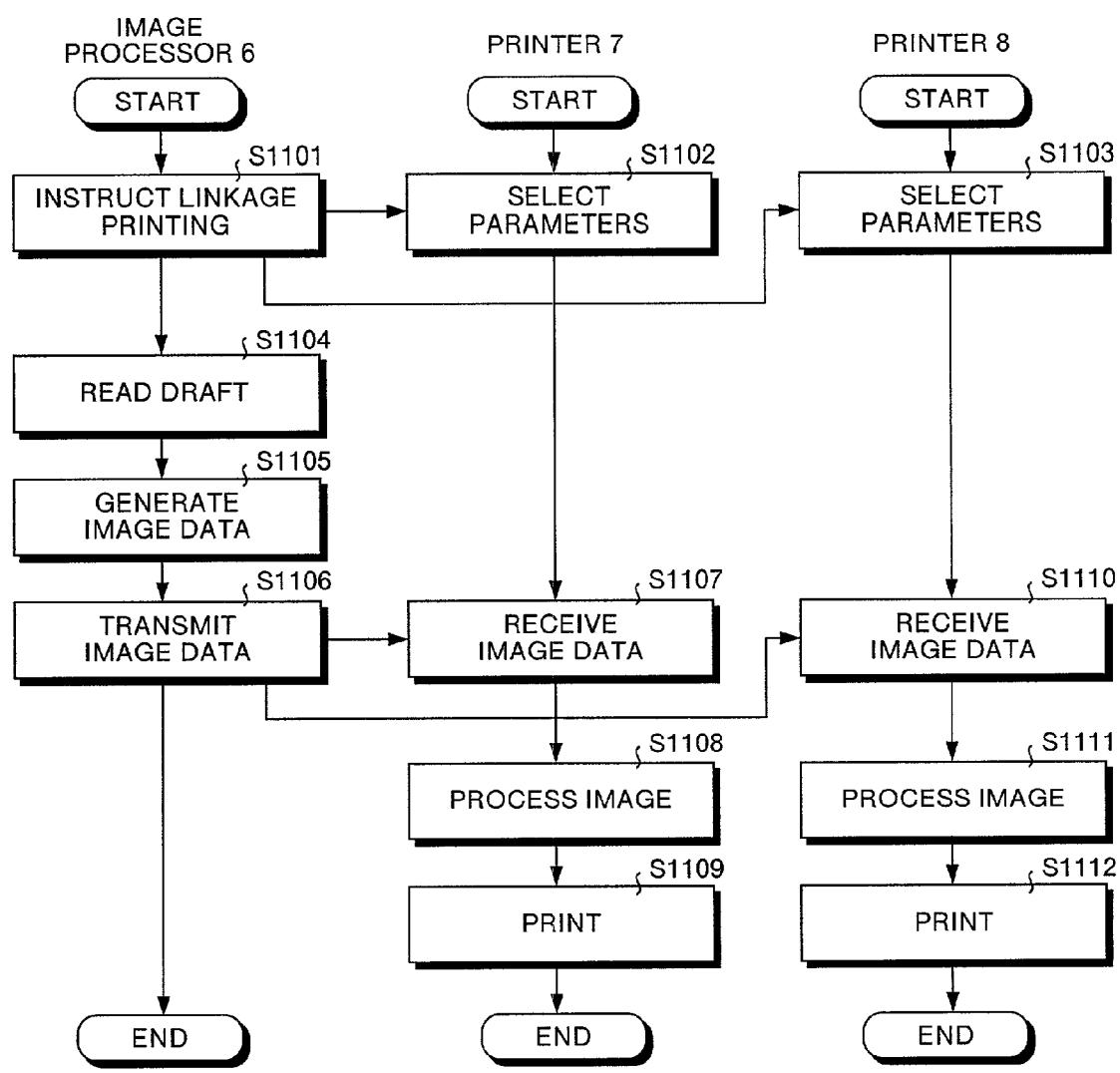
FIG. 11 is a flowchart showing a procedure of a linkage printing in the image formation system relating to the third embodiment.

With reference to FIG. 9 to FIG. 11, the image formation system relating to the third embodiment will be explained on the following points in sequence: (1) a structure and processing of each portion of the image processor 6, (2) a structure and processing of each portion of the printer 7 and the printer 8, (3) calibration processing in the image formation system, and (4) processing of linkage printing in the image formation system.

(1) A Structure and Processing of Each Portion of the Image Processor 6

First, a schematic structure and processing of each portion of the image processor 6 will be explained with reference to FIG. 9. As shown in FIG. 9, the image processor 6 consists of a scanner 21, a parameter processor 22, a controller 23, a transceiver 24, and a console 25 connected together via a bus 26, so as to be able to transmit/receive data.

In the image processor 6, the scanner 21 is a unit for reading image data (a draft and calibration patterns). In this scanner 21, an optical system carries out a read processing of draft reflection beams, a CCD (Charge Coupled Device) carries out a conversion processing for converting the image data into an electric signal, and an A/D converter converts the electric signal into a digital signal. The scanner 21 also carries out a shading correction processing (a processing for correcting illuminance distribution unevenness of a light source), and a scanner γ correction processing (a processing for correcting density characteristics of a reading system).

The parameter processor 22 is a unit for carrying out calibration between the image processor 6 and the printers 6 and 7, based on the read data (hereinafter to be referred to as "calibration data") of calibration patterns of the printer 7 and the printer 8 read by the scanner 21.

Specifically, this parameter processor 22 carries out an instrumental error correction processing, a texture correction processing, and a high-density correction processing to the calibration data. Based on this, the parameter processor 22 calculates image processing parameters corresponding to the read characteristics of the image processor 6, for the printer 7 and the printer 8 respectively. The image processing parameters are transmitted to the printer 7 and the printer 8. The image processing parameters are used at the printer 7 and the printer 8 for the processing at a printer controller 28 and a printer 30 at the time of printing the image data received from the image processor 6.

The transceiver 24 is a unit for transmitting/receiving data to/from the external printer 7 and printer 8 via the Internet cable 5 and the HUB 4. For example, the transceiver 24 transmits a calibration processing start instruction command, the image processing parameters processed by the parameter processor 22, a linkage print start instruction command, and draft image data to the printer 7 and the printer 8 respectively.

The console 25 is a unit for receiving processing conditions of each portion of the image processor 6 and the printers (the printer 7 and the printer 8) from a user. For example, the console 25 receives a calibration processing start instruction, a calibration pattern read start instruction, an image processing parameter processing instruction, an image processing parameter transmission instruction, a linkage print start instruction, a draft read start instruction, and a number of prints made by the printer 7 and the printer 8 respectively.

The controller 23 is a unit for the user to control each portion of the image processor 6 and the printers (the printer 7 and the printer 8) based on processing conditions received by the console 25. For example, the controller 23 controls the printer 7 and the printer 8 so as to be able to print calibration patterns of the printer 7 and the printer 8 respectively, when the console 25 has received a calibration processing start instruction.

Further, when the console 25 has received calibration patterns read start instruction, for example, the controller 23 controls the parameter processor 22 to reads the calibration patterns of the printer 7 and the printer 8 respectively, and calculate the image processing parameters corresponding to the read characteristics of the image processor 6 for the printer 7 and the printer 8 respectively.

Further, when the console 25 has received a linkage print start instruction, for example, the controller 23 controls the printer 7 and the printer 8 to carry out the image processing using the image processing parameters corresponding to the read characteristics of the image processor 6.

(2) A Structure and Processing of Each Portion of the Printer 7 and the Printer 8.

Next, a detailed structure and processing of each portion of the printers (the printer 7 and the printer 8) will be explained with reference to FIG. 9. As shown in FIG. 9, each printer consists of a transceiver 27, a printer 30, a parameter memory 29, and a printer controller 28, via a bus 31 so as to be able to transmit/receive data.

In the printer, the transceiver 27 is a unit for carrying out data transmission/reception to/from the external image processor 6 via the Internet cable 5 and the HUB4. For example, the transceiver 27 receives a calibration processing start instruction command, image processing parameters calculated by the parameter processor 22, a linkage print start instruction command, and draft image data, from the image processor 6.

The parameter memory 29 is a memory for storing image processing parameters received by the transceiver 27. In the third embodiment, the parameter memory 29 stores image processing parameters corresponding to the read characteristics of one image processor 6. However, it is also possible to arrange such that the parameter memory 29 stores image processing parameters corresponding to the read characteristics of a plurality of image processors respectively other than the image processor 6.

The printer controller 28 is a unit for carrying out various kinds of image processing like an editing (for example, a color correction, a printer γ conversion, a gradation processing, etc.) to the image data received by the transceiver 27. For this image processing, image processing parameters corresponding to the read characteristics of the image processor 6 stored in the parameter memory 29 are used. When the parameter memory 29 has stored a plurality of image processing parameters for a plurality of image processors respectively, the printer controller 28 suitably selects the corresponding image processing parameters.

The printer controller 28 also carries out control of each portion (the transceiver 27, the printer 30, and the parameter memory 29) of the printer. The printer 30 is a unit for writing image data image processed by the printer controller 28 onto a sheet of transcription paper or the like.

(3) Calibration Processing in the Image Formation System

A procedure of the calibration processing in the image formation system relating to the third embodiment will be explained next. FIG. 10 is a flowchart showing a procedure of the calibration processing in the image formation system relating to the third embodiment. First, when the console 25 of the image processor 6 has received a calibration processing start instruction for calibrating with the printer 7, the image processor 6 transmits a calibration processing start instruction command to the printer 2 (step S1001).

Next, the printer 7 receives the calibration processing start instruction command, and prints the calibration patterns (step S1002). The image processor 6 mounts the calibration patterns on the scanner 21 of the image processor 6 (step S1003). The image processor 6 reads the mounted calibration patterns (step S1004).

The parameter processor 22 of the image processor 6 processes the image processing parameters for the printer 7 (step S1005), and transmits the processed image processing parameters to the printer 7 (step S1006). Next, the printer 7 receives the image processing parameters from the image processor 6 (step S1007), and stores the received image processing parameters in the parameter memory 29 (step S1008).

When the console 25 of the image processor 6 has received a calibration processing start instruction for calibrating with the printer 8 the image processor 6 transmits a calibration processing start instruction command to the printer 8 (step S1009). Next, the printer 8 receives the calibration processing start instruction command, and prints the calibration patterns (step S1010). The image processor 6 mounts the calibration patterns on the scanner 21 of the image processor 6 (step S1011). The image processor 6 reads the mounted calibration patterns (step S1012).

The parameter processor 22 of the image processor 6 processes the image processing parameters for the printer 8 based on the read data of the image processing parameters (step S1013), and transmits the processed image processing parameters to the printer 8 (step S1014). The printer 8 receives the image processing parameters from the image processor 6 (step S1015), and stores the image processing parameters in the parameter memory 29 (step S1016).

(4) Processing of Linkage Printing in the Image Formation System

Next, the processing of a linkage printing in the image formation system relating to the third embodiment will be explained. FIG. 11 is a flowchart showing a procedure of a linkage printing in the image formation system relating to the third embodiment. First, when the console 25 of the image processor 6 has received a linkage print processing start instruction for carrying out a linkage processing with the printer 7 and the printer 8 respectively, the image processor 6 transmits a linkage print processing start instruction command to the printer 7 and the printer 8 respectively (step S1101).

Next, the printer 7 and the printer 8 receive the linkage print processing start instruction command respectively, and select image processing parameters corresponding to the read characteristics of the image processor 6 from the parameters stored in the respective parameter memories 29 (step S1102 and step S1103).

The scanner 21 of the image processor 6 reads a draft (step S1104), prepares image data (step S1105), and transmits this image data to the printer 7 and the printer 8 (step S1106).

In the mean time, the printer 7 receives the image data from the image processor 6 (step S1107). The printer controller 28 of the printer 7 carries out various kinds of image processing using the image processing parameters selected at step S1102 (step S1108), and the printer 30 prints the image data (step S1109).

The printer 8 receives the image data from the image processor 6 (step S1110), and the printer controller 28 carries out various kinds of image processing using the image processing parameters selected at step S1103 (step S1111). The printer 30 prints the image data (step S1112).

As explained above, according to the third embodiment, the image processor 6 prepares the calibration data that has read the calibration patterns output from the printers 30 of the printers 7 and the printer 8 respectively, at the scanner 21 of the image processor 6. The parameter memories 29, the printer controllers 28, and the printers 30 of the printer 7 and the printer 8 respectively correct the draft image input from the scanner 21 of the image processor 6, based on the calibration data. Based on this arrangement, the printed materials of the draft images output from the printer 7 and the printer 8 have uniform color reproducibility with colors similar to those of draft images. As a result, in the case of producing a large volume of copies from only one existing draft in a short time, it is possible to improve the color reproducibility of the printed materials.

In the third embodiment, there has been explained the case where the image processor 6 calculates the image processing parameters, and the printer 7 and the printer 8 store the image processing parameters and carry out the image processing using these image processing parameters. However, the present invention is not limited to this case. It is also possible to arrange such that the image processor 6 stores the image processing parameters, and carries out the image processing using the image processing parameters. It is also possible to arrange such that the printer 7 and the printer 8 calculate the image processing parameters. It is also possible to arrange such that a separate apparatus calculates image processing parameters, stores the image processing parameters, and carries out the image processing using the image processing parameters.

The image formation methods explained in the first to third embodiments can also be realized by making a personal computer or a workstation computer execute a program prepared in advance. This program is recorded on a computer-readable recording medium like a hard disk, a floppy disk, a CD-ROM, an MO, or a DVD. A computer executes this program by reading it from the recording medium. It is possible to distribute this program via a recording medium and via a network like the Internet.

As explained above, according to the present invention, there is provided an image formation system having a plurality of image formation apparatuses connected together, each image formation apparatus having an image input section for inputting a draft image and an image output section for outputting the draft image, thereby arranging such that a predetermined image formation apparatus reads a draft image at its image input section, and a plurality of image formation apparatuses produce outputs of this draft image from their image output sections. In this apparatus, a preparing unit prepares calibration data that has read calibration patterns to be output from the image output section of each image formation apparatus at the image input section of the predetermined image formation apparatus. A correcting unit corrects the draft image input from the image input section of the predetermined image formation apparatus, based on the calibration data prepared by the preparing unit. Based on this arrangement, the printed materials of the draft images output from a plurality of image formation apparatuses have uniform color reproducibility with colors similar to those of the printed materials at the side of a image formation apparatus that has input the draft image. As a result, in the case of producing a large volume of copies from only one existing draft in a short time, there is an effect that it is possible to obtain an image formation system capable of improving the color reproducibility of the printed materials.

Further, according to the present invention, in the correcting unit, a parameter calculating unit calculates image processing parameters relating to the read characteristics of the image input section of the predetermined image formation apparatus and the print characteristics of the image output sections of the plurality of image formation apparatuses, based on the calibration data prepared by the preparing unit, and a converting unit converts the draft image input from the image input section of the predetermined image formation apparatus, using the image processing parameters calculated by the parameter calculating unit. Based on this arrangement, the printed materials of the draft images output from a plurality of image formation apparatuses have uniform color reproducibility with colors similar to those of the printed materials at the side of a image formation apparatus that has input the draft image. As a result, in the case of producing a large volume of copies from only one existing draft in a short time, there is an effect that it is possible to obtain an image formation system capable of improving the color reproducibility of the printed materials.

Further, according to the present invention, the parameter calculating unit calculates image processing parameters to be used for a gradation conversion, by comparing the calibration data with predetermined target data. Based on this arrangement, the printed materials of the draft images output from a plurality of image formation apparatuses have uniform color reproducibility with colors similar to those of the printed materials at the side of a image formation apparatus that has input the draft image. As a result, in the case of producing a large volume of copies from only one existing draft in a short time, there is an effect that it is possible to obtain an image formation system capable of improving the color reproducibility of the printed materials.

Further, according to the present invention, a parameter memory stores the image processing parameters calculated by the parameter calculating unit, and the converting unit converts the draft image input from the image input section of the predetermined image formation apparatus using the image processing parameters stored in the parameter memory, only when the draft image input by the image input section of the predetermined image formation apparatus is to be output from the image output section of other image formation apparatus. Therefore, when a plurality of image formation apparatuses for outputting the draft images are to be used as single color copying machines respectively, there is an effect that it is possible to obtain an image formation apparatus capable of maintaining the color reproducibility of the printed materials.

Further, according to the present invention, the predetermined image formation apparatus includes the preparing unit, and each of the plurality of image formation apparatuses includes the correcting unit. Therefore, there is an effect that it is possible to obtain an image formation system capable of making a large volume of copies from only one existing draft in a shorter time, while improving the color reproducibility of the printed materials.

Further, according to the present invention, there is provided an image formation system having a plurality of image formation apparatuses connected together, each image formation apparatus having an image input section for inputting a draft image and an image output section for outputting the draft image, thereby arranging such that each image formation apparatus reads a draft image at its image input section, and a predetermined image formation apparatus produces an output of the draft images from its image output section. In this apparatus, a preparing unit prepares calibration data that has read calibration patterns to be output from the image output section of the predetermined image formation apparatus at each image input section of each image formation apparatus. A correcting unit corrects the draft images input from the image input sections of the plurality of image formation apparatuses, based on the calibration data prepared by the preparing unit. Based on this arrangement, the printed materials of the draft images output from a predetermined image formation apparatus have uniform color reproducibility with colors similar to those of the printed materials at a plurality of image formation apparatuses that have input the draft images. As a result, in the case of producing copies of drafts existing at a plurality of places in a short time, there is an effect that it is possible to obtain an image formation system capable of improving the color reproducibility of the printed materials.

Further, according to the present invention, in the correcting unit, a parameter calculating unit calculates image processing parameters relating to the read characteristics of the image input sections of the plurality of image formation apparatuses and the print characteristics of the image output section of the predetermined image formation apparatus, based on the calibration data prepared by the preparing unit, and a converting unit converts the draft images input from the image input sections of the plurality of image formation apparatuses, using the image processing parameters calculated by the parameter calculating unit. Based on this arrangement, the printed materials of the draft images output from a predetermined image formation apparatus have uniform color reproducibility with colors similar to those of the printed materials at the side of a plurality of image formation apparatuses that have input the draft images. As a result, in the case of producing copies of drafts existing at a plurality of places in a short time, there is an effect that it is possible to obtain an image formation system capable of improving the color reproducibility of the printed materials.

Further, according to the present invention, the parameter calculating unit calculates image processing parameters to be used for a gradation conversion, by comparing the calibration data with predetermined target data. Based on this arrangement, the printed materials of the draft images output from a predetermined image formation apparatus have uniform color reproducibility with colors similar to those of the printed materials at the side of a plurality of image formation apparatuses that have input the draft images. As a result, in the case of producing copies of drafts existing at a plurality of places in a short time, there is an effect that it is possible to obtain an image formation system capable of improving the color reproducibility of the printed materials.

Further, according to the present invention, a parameter memory stores the image processing parameters calculated by the parameter calculating unit, and the converting unit converts the draft image input from the image input section of each image formation apparatus using the image processing parameters stored in the parameter memory, only when the draft image input by the image input section of each image formation apparatus is to be output from the image output section of the predetermined image formation apparatus. Therefore, when a predetermined image formation apparatus for outputting the draft images is to be used as a single color copying machine, there is an effect that it is also possible to obtain an image formation apparatus capable of maintaining the color reproducibility of the printed materials.

Further, according to the present invention, the plurality of image formation apparatuses include the preparing units respectively, and the predetermined image formation apparatus includes the correcting unit. Therefore, there is an effect that it is possible to obtain an image formation system capable of making copies of drafts existing at a plurality of positions in a shorter time, while improving the color reproducibility of the printed materials.

Further, according to the present invention, the image input section is a color scanner, and the image output section is a color printer. Therefore, there is an effect that it is possible to obtain an image formation system capable of improving the color reproducibility of the printed materials without extremely increasing cost.

Further, according to the present invention, there is provided an image formation method having a plurality of image formation apparatuses connected together, each image formation apparatus having an image input section for inputting a draft image and an image output section for outputting the draft image, thereby arranging such that a predetermined image formation apparatus reads a draft image at its image input section, and a plurality of image formation apparatuses produce outputs of this draft image from their image output sections. In this method, at a preparing step, there is prepared calibration data that has read calibration patterns to be output from the image output section of each image formation apparatus at the image input section of the predetermined image formation apparatus. At a correcting step, the draft image input from the image input section of the predetermined image formation apparatus is corrected, based on the calibration data prepared at the preparing step. Based on this arrangement, the printed materials of the draft images output from a plurality of image formation apparatuses have uniform color reproducibility with colors similar to those of the printed materials at the side of a image formation apparatus that has input the draft image. As a result, in the case of producing a large volume of copies from only one existing draft in a short time, there is an effect that it is possible to obtain an image formation method capable of improving the color reproducibility of the printed materials.

Further, according to the present invention, the correcting step includes a parameter calculating step for calculating image processing parameters relating to the read characteristics of the image input section of the predetermined image formation apparatus and the print characteristics of the image output sections of the plurality of image formation apparatuses, based on the calibration data prepared at the preparing step. The correcting step also includes a converting step for converting the draft image input from the image input section of the predetermined image formation apparatus, using the image processing parameters calculated at the parameter calculating step. Based on this arrangement, the printed materials of the draft images output from a plurality of image formation apparatuses have uniform color reproducibility with colors similar to those of the printed materials at the side of a image formation apparatus that has input the draft image. As a result, in the case of producing a large volume of copies from only one existing draft in a short time, there is an effect that it is possible to obtain an image formation method capable of improving the color reproducibility of the printed materials.

Further, according to the present invention, at the parameter calculating step, image processing parameters to be used for a gradation conversion are calculated, by comparing the calibration data with predetermined target data. Based on this arrangement, the printed materials of the draft images output from a plurality of image formation apparatuses have uniform color reproducibility with colors similar to those of the printed materials at the side of a image formation apparatus that has input the draft image. As a result, in the case of producing a large volume of copies from only one existing draft in a short time, there is an effect that it is possible to obtain an image formation method capable of improving the color reproducibility of the printed materials.

Further, according to the present invention, at a parameter memory step, the image processing parameters calculated at the parameter calculating step are stored. At the converting step, there is converted the draft image input from the image input section of the predetermined image formation apparatus using the image processing parameters stored at the parameter memory step, only when the draft image input by the image input section of the predetermined image formation apparatus is to be output from the image output section of other image formation apparatus. Therefore, when a plurality of image formation apparatuses for outputting the draft images are to be used as single color copying machines respectively, there is an effect that it is possible to obtain an image formation method capable of maintaining the color reproducibility of the printed materials.

Further, according to the present invention, the predetermined image formation apparatus includes the preparing step, and each of the plurality of image formation apparatuses includes the correcting step. Therefore, there is an effect that it is possible to obtain an image formation method capable of making a large volume of copies from only one existing draft in a shorter time, while improving the color reproducibility of the printed materials.

Further, according to the present invention, there is provided an image formation method having a plurality of image formation apparatuses connected together, each image formation apparatus having an image input section for inputting a draft image and an image output section for outputting the draft image, thereby arranging such that each image formation apparatus reads a draft image at its image input section, and a predetermined image formation apparatus produces outputs of draft images from the image output section. In this method, at a preparing step, there is prepared calibration data that has read calibration patterns to be output from the image output section of the predetermined image formation apparatus at the image input section of each image formation apparatus. At a correcting step, there is corrected the draft images input from the image input sections of the plurality of image formation apparatuses, based on the calibration data prepared at the preparing step. Based on this arrangement, the printed materials of the draft images output from a predetermined image formation apparatus have uniform color reproducibility with colors similar to those of the printed materials at the side of a plurality of image formation apparatuses that have input the draft images. As a result, in the case of producing copies of drafts existing at a plurality of places in a short time, there is an effect that it is possible to obtain an image formation system capable of improving the color reproducibility of the printed materials.

Further, according to the present invention, the correcting step includes a parameter calculating step for calculating image processing parameters relating to the read characteristics of the image input sections of the plurality of image formation apparatuses and the print characteristics of the image output section of the predetermined image formation apparatus, based on the calibration data prepared at the preparing step. The correcting step also includes a converting step for converting the draft images input from the image input sections of the plurality of image formation apparatuses, using the image processing parameters calculated at the parameter calculating step. Based on this arrangement, the printed materials of the draft images output from a predetermined image formation apparatus have uniform color reproducibility with colors similar to those of the printed materials at the side of a plurality of image formation apparatuses that have input the draft images. As a result, in the case of producing copies of drafts existing at a plurality of places in a short time, there is an effect that it is possible to obtain an image formation method capable of improving the color reproducibility of the printed materials.

Further, according to the present invention, at the parameter calculating step, image processing parameters to be used for a gradation conversion are calculated, by comparing the calibration data with predetermined target data. Based on this arrangement, the printed materials of the draft images output from a predetermined image formation apparatus have uniform color reproducibility with colors similar to those of the printed materials at the side of a plurality of image formation apparatuses that have input the draft images. As a result, in the case of producing copies of drafts existing at a plurality of places in a short time, there is an effect that it is possible to obtain an image formation method capable of improving the color reproducibility of the printed materials.

Further, according to the present invention, at a parameter memory step, the image processing parameters calculated at the parameter calculating step are stored. At the converting step, there is converted the draft image input from the image input section of each image formation apparatus using the image processing parameters stored at the parameter memory step, only when the draft image input by the image input section of each image formation apparatus is to be output from the image output section of the predetermined image formation apparatus. Therefore, when a predetermined image formation apparatus for outputting the draft images is to be used as a single color copying machine, there is an effect that it is also possible to obtain an image formation method capable of maintaining the color reproducibility of the printed materials.

Further, according to the present invention, the plurality of image formation apparatuses include the preparing steps respectively, and the predetermined image formation apparatus includes the correcting step. Therefore, there is an effect that it is possible to obtain an image formation method capable of making copies of drafts existing at a plurality of positions in a shorter time, while improving the color reproducibility of the printed materials.

Further, according to the present invention, the image input section is a color scanner, and the image output section is a color printer. Therefore, there is an effect that it is possible to obtain an image formation method capable of improving the color reproducibility of the printed materials without extremely increasing cost.

Fourth to sixth embodiments relating to the present invention will be explained next.

(Fourth Embodiment)

An image formation system and an image formation apparatus relating to the fourth embodiment will be explained on the following points in this order.

Figure 12:
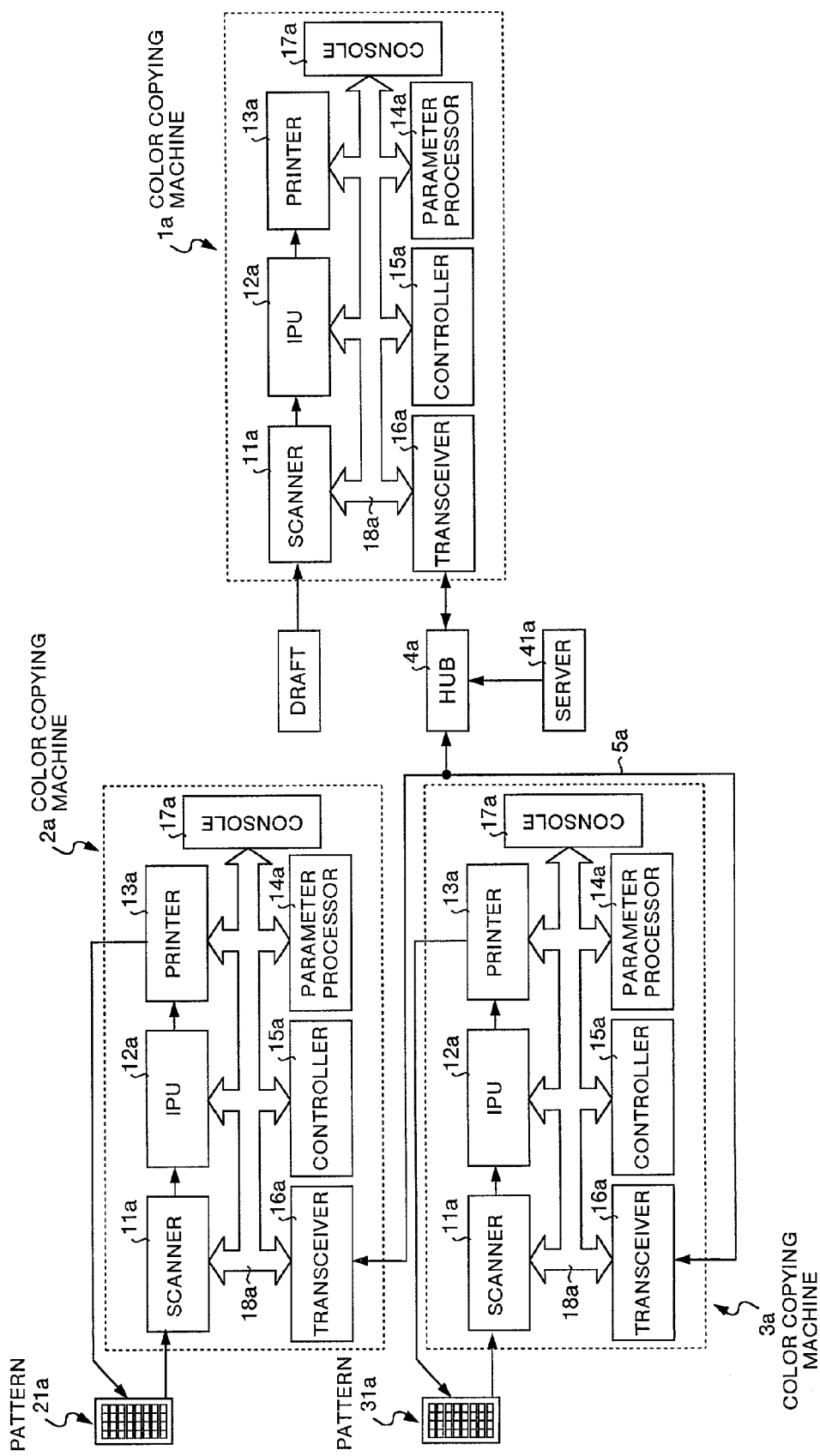
FIG. 12 is a block diagram showing a structure of an image formation system relating to a fourth embodiment of the present invention.

(1) A schematic structure of the image formation system of the fourth embodiment
(2) A schematic structure of a color copying machine in the image formation system of the fourth embodiment
(3) A method of preparing a gradation conversion table
  (3)-1 Automatic gradation correction of image density (gradation)
  (3)-2 Correction of the texture
  (3)-3 Preparation of a gradation conversion table
(4) Print operation in the image formation system (1) A Schematic Structure of the Image Formation System of the Fourth Embodiment FIG. 12 is a block diagram showing a schematic structure of an image formation system relating to the fourth embodiment of the present invention. As shown in FIG. 12, the image formation system relating to the fourth embodiment consists of a color copying machine 1a, a color copying machine 2a, a color copying machine 3a, and a server 41a that are connected together via an Internet cable 5a and a HUB 4a so that these color copying machines can transmit/receive data to and from each other.

In FIG. 12, the color copying machine 1a reads image data, and transmits the read image data and instrumental error correction values corresponding to the read characteristics (parameters corresponding to the read characteristics of the image input section) of the scanner of the color copying machine 1a, to the server 41a. The server 41a stores the image data of the color copying machine 1a and the instrumental error correction values by relating to them to each other, in the memory. When there have been requests from the color copying machine 2a and the color copying machine 3a for the transmission of the image data of the color copying machine 1a, the server 41a transmits the image data and the instrumental error correction values of the color copying machine 1a to the color copying machine 2a and the color copying machine 3a respectively according to these requests. The color copying machine 2a and the color copying machine 3a prepare image processing parameters (gradation conversion tables) based on the instrumental error correction values of the color copying machine 1a and the instrumental error correction values of the own apparatuses respectively, image-process the image data of the color copying machine 1a based on the image processing parameters (gradation conversion tables), and print out the images respectively.

In other words, according to the image formation system relating to the fourth embodiment, the color copying machine 2a and the color copying machine 3a prepare the image processing parameters (gradation conversion tables) corresponding to the read characteristics of the color copying machine 1a, based on the instrumental error correction values of the color copying machine 1a and the instrumental error correction values of the own apparatuses respectively.

The color copying machine 2a and the color copying machine 3a image-process the image data read by the color copying machine 1a, using the image processing parameters corresponding to the color copying machine 1a respectively, thereby to output printed materials having color reproducibility with colors similar to those of the printed material at the side of the color copying machine 1a.

In the following explanation, the color copying machine that reads the image data of the draft and transmits the read image data to the outside will be called a master color copying machine (the "color copying machine 1a" in the following explanation). The color copying machines that receive the image data transmitted from the master color copying machine 1a and print the image data will be called slave color copying machines (the "color copying machine 2a" and the "color copying machine 3a" in the following explanation).

(2) A Schematic Structure of a Color Copying Machine in the Image Formation System of the Fourth Embodiment In the image formation system relating to the fourth embodiment, the color copying machine 1a, the color copying machine 2a and the color copying machine 3a have similar structures. Therefore, only the color copying machine 1a will be explained for the sake of convenience.

As shown in FIG. 12, the color copying machine 1a consists of a scanner 11a, an IPU 12a, a printer 13a, a parameter processor 14a, a controller 15a, a transceiver 16a, and a console 17a connected together via a bus 18a, so as to be able to transmit/receive data. In the color copying machine 1a, the scanner 11a is a unit for reading image data (a draft and calibration patterns). In this scanner 11a, an optical system carries out a read processing of draft reflection beams, a CCD (Charge Coupled Device) carries out a conversion processing for converting the image data into an electric signal, and an A/D converter converts the electric signal into a digital signal. The scanner also carries out a shading correction processing (a processing for correcting illuminance distribution unevenness of a light source), and a scanner γ correction processing (a processing for correcting density characteristics of a reading system).

The IPU 12a is a unit for carrying out an image processing like an editing of the image data. The IPU 12a carries out a shading correction processing (a processing for correcting illuminance distribution unevenness of a light source), a scanner γ correction processing (a processing for correcting density characteristics of a reading system), an MTF correction processing, a smoothing processing, an optional magnification processing in a main scanning direction, a density conversion (a γ conversion processing: corresponding to a density notch), a simple multi-value processing, a simple two-value processing, an error dispersion processing, a dither processing, a dot layout phase control processing (right-sided dot, left-sided dot), an isolated point removing processing, an image area separation processing (color decision, attribute decision, adaptive processing), and a density conversion processing.

The printer 13a is a unit for writing image data into a sheet of transcription paper. The printer 13 caries out an edge smoothing processing (a jaggy correction processing), a correction processing for dot relocation, a pulse control processing of an image signal, and a format conversion processing between parallel data and serial data.

When a color copying machine plays a role of a slave color copying machine (the color copying machine 2s or the color copying machine 3s), the parameter processor 14a carries out calibration based on the read data (hereinafter to be referred to as "calibration data") of calibration patterns.

In outline, this parameter processor 14a carries out an instrumental error correction processing, a texture correction processing, and a high-density correction processing to the calibration data. Based on this, the parameter processor 14a calculates image processing parameters relating to read characteristics of the master color copying machine and the print characteristics of the slave color copying machine. The image processing parameters are stored in the controller 15a. The image processing parameters are used for the processing at the IPU 12a and the printer 13a at the time of printing the image data received from the master color copying machine.

The transceiver 16a is a unit for transmitting/receiving data to/from an external color copying machine and the server 41a via the Internet cable 5a and the HUB 4a. For example, when a color copying machine achieves functions of a master color copying machine (the color copying machine 1a), the transceiver 16a transmits the image data of the draft and the instrumental error correction values of the own apparatus to the server 41a. When a color copying machine achieves functions of a slave color copying machine (the color copying machine 2a or the color copying machine 3a), the transceiver 16a receives the image data and the instrumental error correction values from the server 41a.

The console 17a is a unit for receiving processing conditions of each portion of the color copying machine from a user. For example, the console 17a receives an automatic gradation correction processing start instruction, a draft read start instruction, and a number of printing.

The controller 15a is a unit for controlling each portion of the color copying machine based on processing conditions received by the console 17a. For example, the controller 15a controls each portion to print out the calibration patterns. Further, the controller 15a controls each portion to calculate image processing parameters corresponding to the read characteristics of the master color copying machine. In the case of outputting the image data of the master color copying machine, the controller 15a controls each portion to carry out the image processing according to the image processing parameters corresponding to the read characteristics of the master color copying machine.

Figure 13:
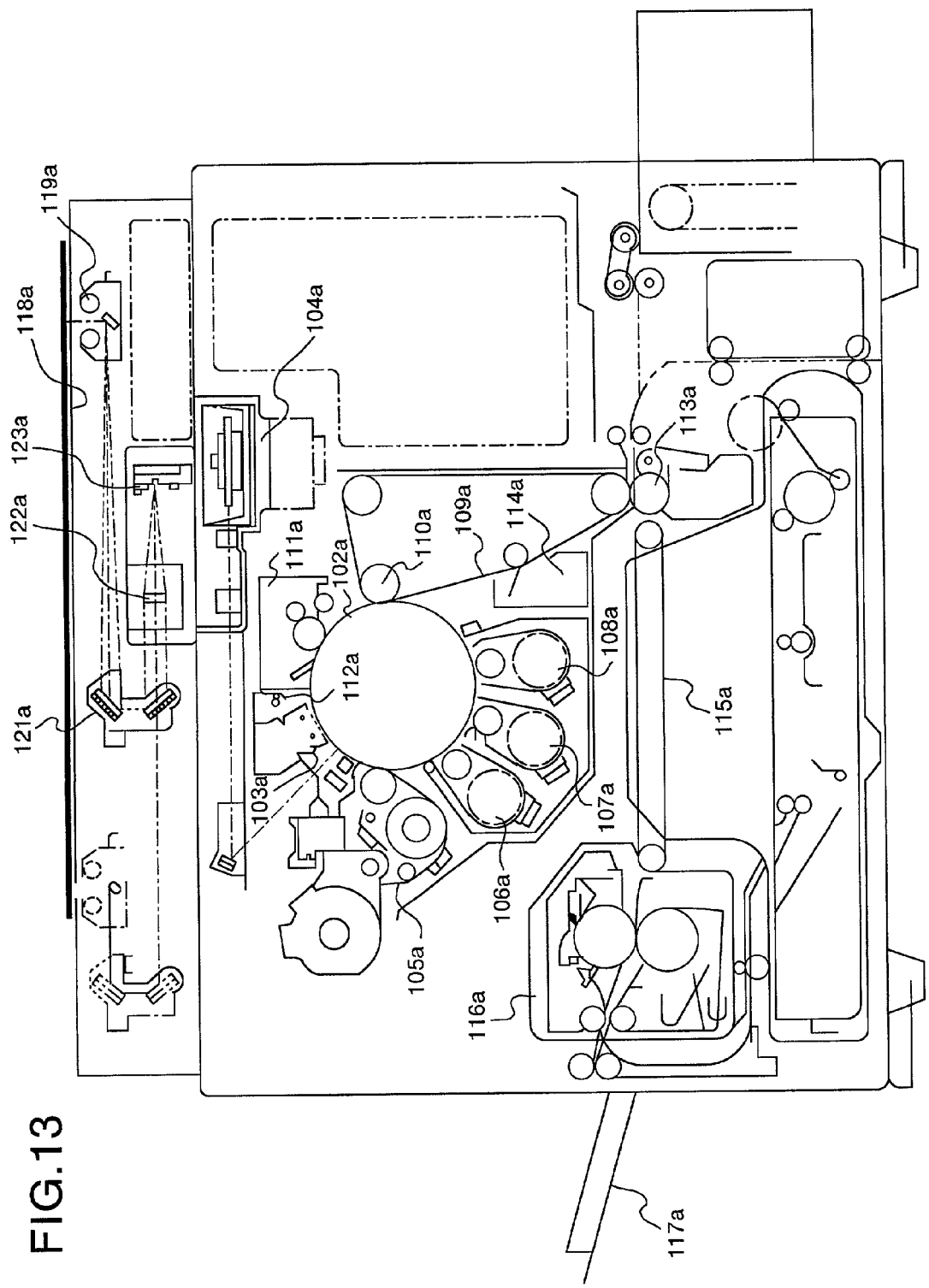
FIG. 13 is a diagram showing a mechanical structure of a color copying machine shown in FIG. 12.

Next, the outline mechanism of the color copying machine 1a shown in FIG. 12 will be explained. FIG. 13 shows an outline of the mechanism of the color copying machine shown in FIG. 12. In FIG. 13, an organic photo conductor (OPC) drum 102a of a diameter 120 [mm] is disposed as an image holder at approximately the center of the color copying machine 1a. Around this photo conductor drum 102a, there are sequentially disposed a charger 103a for charging the surface of the photo conductor drum 102a, a laser optical system 104a for forming an electrostatic latent image by irradiating a semiconductor laser beam onto the surface of the photo conductor drum 102a that has been uniformly charged, a black developing unit 105a for obtaining a toner image of each color by developing the electrostatic latent image based on a supply of each color toner to the electrostatic latent image, three color developing units 106a, 107a and 108a of yellow Y, magenta M, and cyan C, an intermediate transfer belt 109a for sequentially transferring a toner image of each color formed on the photo conductor drum 102a, a bias roller 110a for applying a transfer voltage onto the intermediate transfer belt 109a, a cleaning unit 111a for removing a toner remaining on the surface of the photo conductor drum 102a after the transfer, and a current removing unit 112a for removing a charge remaining on the surface of the photo conductor drum 102a after the transfer.

The intermediate transfer belt 109a is disposed with a transfer bias roller 113a for applying a voltage for transferring a transferred toner image onto the recording paper, and a belt cleaning unit 114a for cleaning a toner image remaining on the recording paper after the image transfer.

At the output end of a carrier belt 115a for carrying the recording paper separated from the intermediate transfer belt 109a, there is disposed a fixing unit 116a for fixing the toner image by heating and pressing. At the output of the fixing unit 116a, there is disposed a paper discharge tray 117a.

Above the laser optical system 104a, there are provided a contact glass 118a as a draft table disposed on the upper portion of the color copying machine 1a, and an exposure lamp 119a for irradiating a scanning beam onto the draft on the contact glass 118a. A beam reflected from the draft is guided to a focusing lens 122a by a reflection mirror 121a, and is made incident to an image sensor array 123a of a CCD (Charge Coupled Device) as a photoelectric conversion element. An image signal converted into an electric signal by the image sensor array 123a of the CCD passes through image processors (the IPU 12a, the printer 13a), and controls the laser oscillation of the semiconductor laser in the laser optical system 104a.

Figure 14:
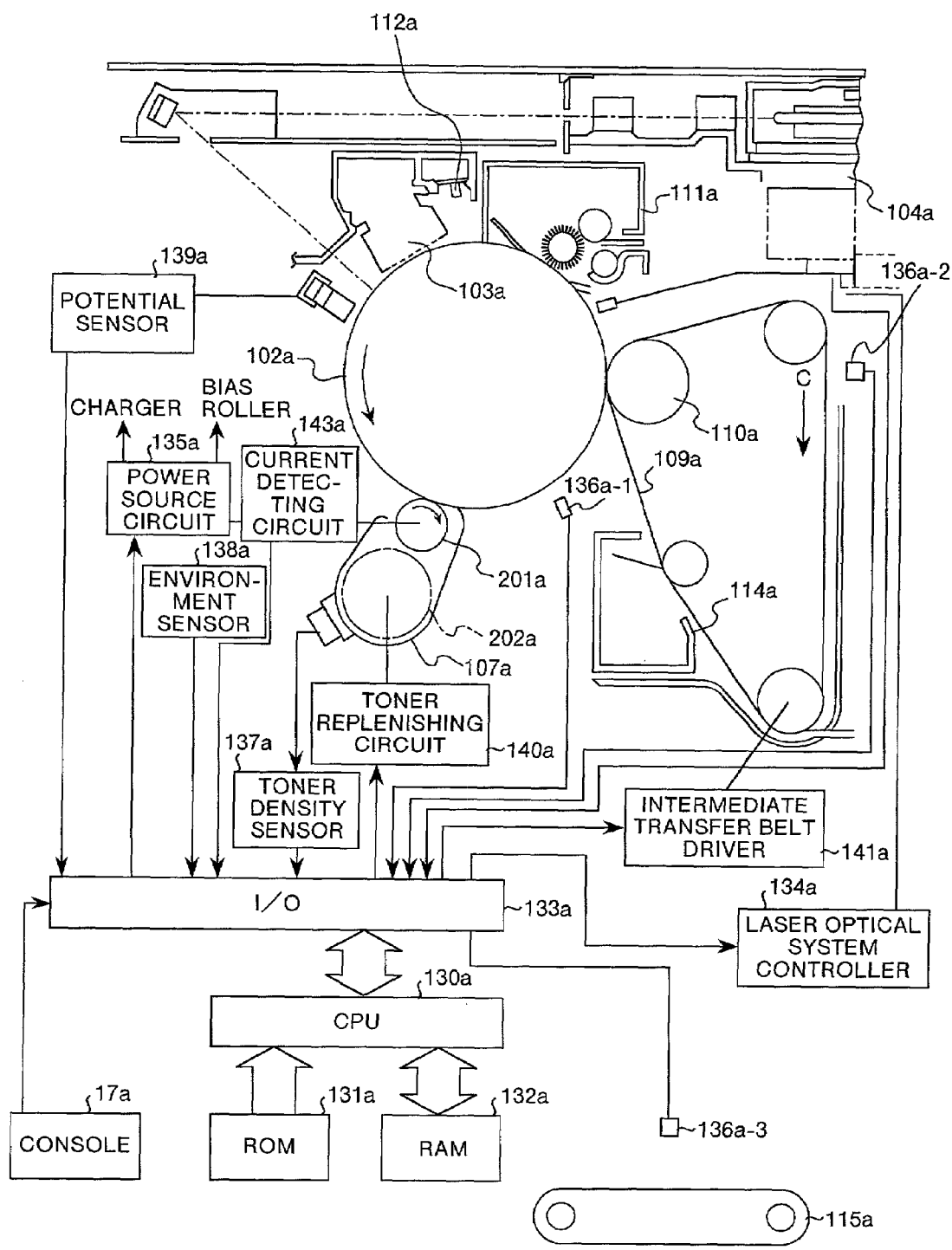
FIG. 14 is an explanatory diagram of a control system in the color copying machine shown in FIG. 12.

A control system incorporated in the color copying machine 1a will be explained next. FIG. 14 shows the control system incorporated in the color copying machine 1a. As shown in FIG. 14, the control system has a main controller (CPU) 13a0a. A predetermined ROM 131a and a predetermined RAM 132a are provided for this main controller 130a. The main controller 130a is connected with a laser optical system controller 134a, a power source circuit 135a, an optical sensor 136a, a toner density sensor 137a, an environment sensor 138a, a photo conductor surface potential sensor 139a, a toner replenishing circuit 140a, an intermediate transfer belt driver 141a, a console 17a, and a current detector circuit 143a, via an Interface I/O 133a respectively.

The laser optical system controller 134a is for adjusting the laser output of the laser optical system 104a. The power source circuit 135a applies a predetermined charge discharging voltage to the charger 103a, applies development bias of a predetermined voltage to the developing units 105a, 106a, 107a, and 108a, and applies a predetermined transfer voltage to the bias roller 110a and the transfer bias roller 113a.

The optical sensor 136a consists of a light emitting element like a light-emitting diode closely disposed in an area after the transfer of the photo conductor drum 102a and a light-receiving element like a photo sensor. The optical sensor 136a senses an adhesion volume of a toner in the toner image of a detection pattern latent image formed on the photo conductor drum 102a, and an adhesion volume of a toner in the texture, for each color. The optical sensor 136a also detects a remaining potential after removing the current of the photo conductor.

A detection output signal from the optical sensor 136a is applied to a photoelectric sensor controller not shown. The photoelectric sensor controller increases a ratio of the toner adhesion volume in the detection pattern toner image to the toner adhesion volume in the texture. The photoelectric sensor controller detects a variation in the image density based on a comparison between the ratio value and a reference value, and corrects the control value of the toner density sensor 137a.

The toner density sensor 137a detects a toner density based on a change in the permeability of a developer existing within each of the developing units 105a to 108a. The toner density sensor 137a compares the detected toner density value with the reference value. When the toner density has become lower than a predetermined value and the toner has become in shortage, the toner density sensor 137a applies a toner replenishment signal corresponding to this shortage to the toner replenishing circuit 140a.

The potential sensor 139a detects the surface potential of the photo conductor drum 102a as the image holder. The intermediate transfer belt driver 141a controls the driving of the intermediate transfer belt 109a.

Each of the developing units 105a to 108a (FIG. 14 shows only the developing unit 107a) accommodates a developer including a black toner or a corresponding color toner and a carrier. The toner and the carrier are stirred based on a rotation with a developer stirrer 202a. Each of the developing units 105a to 108a adjusts the volume of the developer dipped upon to a sleeve with the developer stirrer 202a. The supplied developer is magnetically held on the developer sleeve 201a, and is rotated in a rotation direction of the developer sleeve 201a as a magnetic brush.

Next, a detailed structure and processing of each portion of the color copying machine 1a will be explained with reference to FIG. 2. FIG. 2 is a block diagram showing a detailed structure of a color copying machine (the color copying machine 1a, the color copying machine 2a, the color copying machine 3a) shown in FIG. 12. First, the scanner 11 of the color copying machine will be explained. As shown in FIG. 2, the scanner 11 of the color copying machine consists of a CCD 123, an amplifier circuit 425, a sample holding (S/H) circuit 426, an A/D converter circuit 427, a black correcting circuit 428, a CCD driver 429, a pulse generator 430, and a clock generator 431.

In the scanner 11, an exposure lamp (not shown) irradiates beams of a draft and calibration patterns (the patterns 21 and the patterns 31) to be copied. Reflected beams enter the CCD 123 via a reflection mirror (not shown) and a focusing lens (not shown). An RGB filter of the CCD 123 divides the reflected beams into three colors of Red, Green and Blue. The amplifier circuit 425 amplifies this analog signal into a predetermined size.

For converting an analog signal into a digital signal, the S/H circuit 426 sample-holds this amplified signal at every predetermined timing. The A/D converter circuit 427 converts this value into a digital signal expressed in, for example, an eight-bit signal value.

The amplifier circuit 425 amplifies the signal at an amplification factor of accommodating this digital signal within the range of this bit value. In other words, the amplification factor of the amplifier circuit 425 is determined such that an output value of the A/D converter circuit 427 after reading a certain specific draft density becomes a desired value. For example, a signal of a draft density 0.05 (0.891 in the reflection factor) during a normal copying is amplified to a value of 240 in the eight-bit signal value.

The black correcting circuit 428 decreases unevenness of black level (an electric signal when there is a small amount of light) between chips and between pixels of the CCD 123, thereby to prevent an occurrence of lines and unevenness in the black portion of the image. Assume a signal has a 240 value after the A/D conversion at a normal amplification rate, for example. The amplifier circuit 425 lowers the amplification factor of this signal and outputs a signal by lowering the digital signal value to a 180 value, for example, after the A/D conversion, at the time of shading correction. This reduction in the amplification factor is for increasing the sensitivity of the shading correction. When a shading correction is carried out at the amplification factor used for a normal copying, there arises a portion where the eight-bit signal after the A/D conversion is saturated to a maximum value of 255, when there is a large amount of reflection light. This results in an occurrence of error in the shading correction.

The CCD driver 429 supplies a pulse signal for driving the CCD 123. The pulse generator 430 supplies pulses necessary for driving the CCD driver 429, and supplies a timing necessary for the S/H circuit 426 to sample-hold the signal from the CCD 123. The clock generator 431 consists of a crystal oscillator and the like, and supplies a reference oscillation signal to the pulse generator 430.

The IPU 12 of the color copying machine will be explained next. As shown in FIG. 2, the IPU 12 of the color copying machine consists of a shading correcting circuit 401, an area processing circuit 424, an interface I/F selector 423, a scanner γ conversion circuit 402, an image memory 403, an image isolating circuit 404, an MTF filter 405, a hue deciding circuit 432, a color conversion UCR processing circuit 406, a pattern generating circuit 421, a magnification circuit 407, an image processing (creating) circuit 408, an image processing printer γ correcting circuit 409, and a gradation processing circuit 410.

In the IPU 12, the shading correcting circuit 401 corrects white level (an electric signal when there is a large amount of light). The shading correcting circuit 401 irradiates beams by moving an exposure lamp (not shown) to a white color reference plate (not shown), thereby to correct variations in the white color and variations in the sensitivity of the CCD 123 that occur when the reflection light passes through a reflection mirror (not shown) and a focusing lens (not shown).

The area processing circuit 424 generates an area signal for identifying an area of a draft in which the image data is currently being processed. Based on the area signal output from this circuit, image processing parameters that are to be used at each processing section at a later stage are changed over. In other words, based on the comparison between area information assigned on the draft and read position information for reading the image, the processing circuit 424 generates the area signal.

Then, based on the area signal, parameters that are used in the scanner γ conversion circuit 402, the MTF filter 405, the color conversion UCR processing circuit 406, the image processing (creating) circuit 408, the image processing printer γ correcting circuit 409, and the gradation processing circuit 410, are changed.

It is possible to select image processing parameters in gradation conversion tables of a color correction coefficient, a space filter, etc. that are optimum for each draft like a character draft, a silver salt photograph draft, a half-tone photograph draft, an ink jet, a fluorescent pen, a map, and a heat-transfer draft, for each assigned area, from the setting in a plurality of tables according to each assigned image area.

When a color copying machine plays a role of a master color copying machine (the color copying machine 1a), the image processing parameters are selected from a table of normal image processing parameters. When a color copying machine plays a role of a slave color copying machine (the color copying machine 2a or the color copying machine 3a), the image processing parameters are selected from a table of image processing parameters corresponding to the read characteristics of the master color copying machine calculated by the parameter processor 14*a*.

The interface I/F selector 423 is used for outputting an image read by the scanner to the outside. When this is used as a printer and a scanner IPU (a scanner and an IPU) like a copying machine, it is possible to take out the read image data from the I/F selector 411 of the printer to an external unit (a printer controller 419).

The scanner γ conversion circuit 402 converts reflection factor data of a signal read from the scanner into lightness data of this signal. The image isolating circuit 404 discriminates between a character portion and a photograph portion, and between chromatic color and achromatic color. The MTF filter 405 carries out a processing for changing frequency characteristics of an image signal like an edge emphasis and a smoothing according to a user's preference of a sharp image or a soft image, etc. For example, the MTF filer 405 executes what is called an adaptive edge emphasis for applying an edge emphasis to character edges and not applying an edge emphasis to half-tone images, for each of the R, G and B signals.

The color conversion UCR processing circuit 406 consists of a color correction processor for correcting a difference between color resolution characteristics of an input system and spectral characteristics of a color material of an output system, and calculating volumes of color materials YMC necessary for a faithful color reproduction, and a UCR processor for replacing a portion of a superimposition of three colors of YMC with black Bk. This color correction processing can be achieved based on a matrix calculation as expressed below.

$$\begin{pmatrix} Y(\text{hue}) \\ M(\text{hue}) \\ C(\text{hue}) \end{pmatrix} = \begin{pmatrix} a11(\text{hue}) & a12(\text{hue}) & a13(\text{hue}) \\ a21(\text{hue}) & a22(\text{hue}) & a23(\text{hue}) \\ a31(\text{hue}) & a32(\text{hue}) & a33(\text{hue}) \end{pmatrix} \begin{pmatrix} s(B) \\ s(G) \\ s(R) \end{pmatrix} \quad [\text{Expression 1}]$$

In the above expression, s(R), s(G) and s(B) represent R, G and B signals of the scanner after the scanner γ conversion. Hue expresses each hue of White, Black, Yellow, Red, Magenta, Blue, Cyan, and Green. This split of hue is one example. It is also possible to divide the hue into further detail. The matrix coefficient aij (hue) is determined for each hue depending on the spectral characteristics of the input system and the output system (color material). While a linear masking equation is shown in the above, it is possible to carry out color correction in higher precision using a quadratic equation like s(B) x s(B) or s(B) x x(G), or an equation of higher degree. It is also possible to use a NOIGEBOWER equation. According to any method, it is possible to obtain Y, M and C from values of s(B), s(G) and s(R).

A decision on the hue is made as follows as one example. A relationship between a scanner read value and a calorimetric value is expressed as follows using predetermined coefficients bij (i, j=1, 2, 3).

$$\begin{pmatrix} X \\ Y \\ Z \end{pmatrix} = \begin{pmatrix} b11 & b12 & b13 \\ b21 & b22) & b23 \\ b31 & b32 & b33 \end{pmatrix} \begin{pmatrix} B \\ G \\ R \end{pmatrix} \quad [\text{Expression 2}]$$

From the definition of the calorimetric value, $L^* = 116((Y/Y_n)^{(1/3)}) - 16$ where, $Y/Y_n > 0.008856$ $L^* = 903.3(Y/Y_n)$ where, $Y/Y_n <= 0.008856$ $a^* = 500(f(X/X_n) - f(Y/Y_n))$ $b^* = 200(f(Y/Y_n) - f(Z/Z_n))$ In this case $f(t) = t^{(1/3)}$
where, $t > 0.008856$, $f(t) = 7.787*t + 16/116$ where, $t <= 0.008856$
Yn, Xn and Zn are constants.

$C = (a^{*2} + b^{*2})^{0.5}$ $hab = \text{arc} \tan(b^*/a)$

Figure 15:
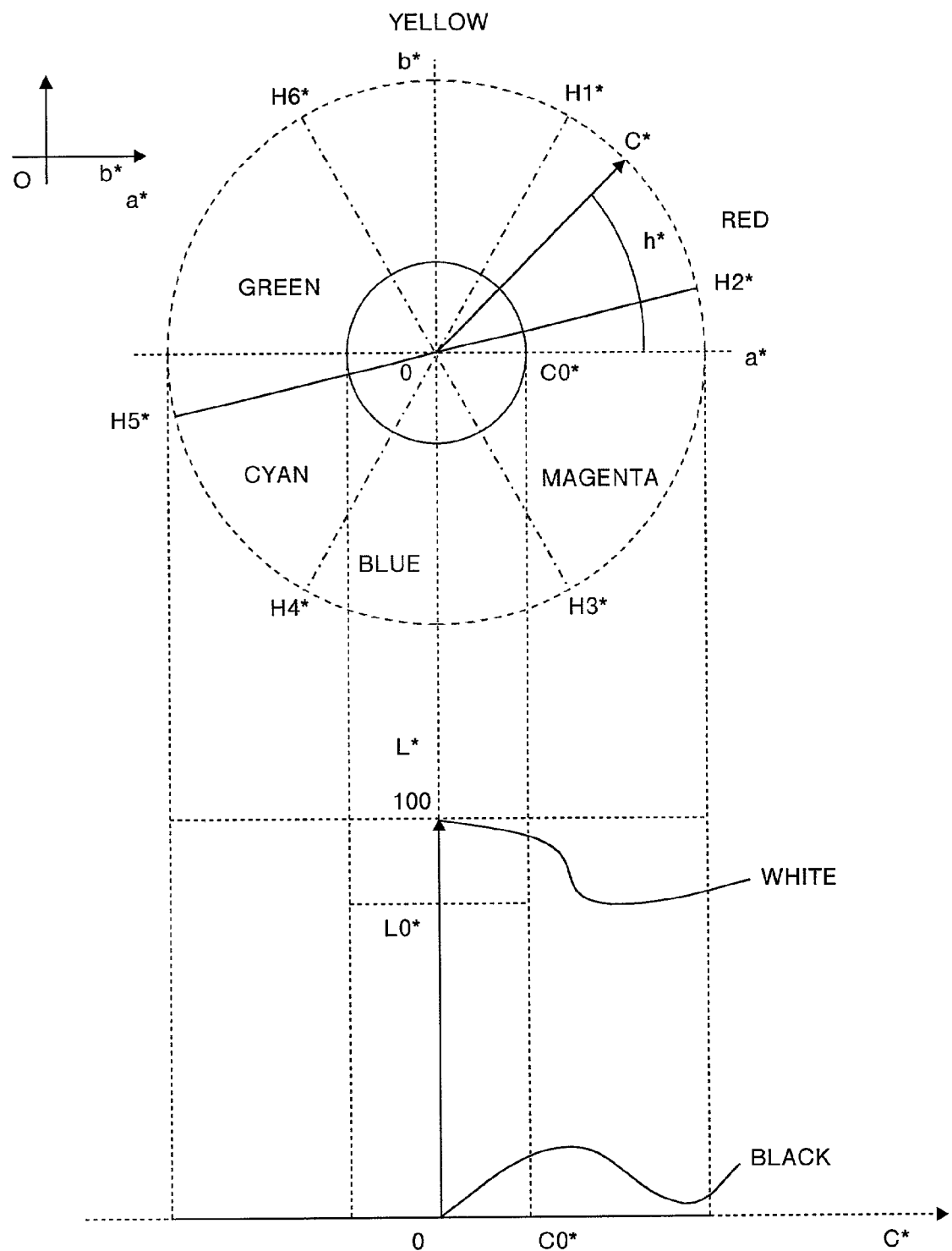
FIG. 15 is a diagram showing one example of a hue.

Therefore, it is possible to decide a hue to which a certain pixel of a draft read from the scanner RGB signals belongs. FIG. 15 shows one example of hue. As the hue shown in FIG. 15 has been well known in general, the outline will be explained.

The center of the concentric circle at an upper portion is a L*a*b* calorimetric system, with an axis of achromatic color when $a^* = b^* = 0$. A distance in a radial direction from the center of the circle shows chroma C*. An angle from a straight line of $a^* > 0$ and $b^* = 0$ to a certain point shows a hue angle h*. Each hue of Yellow, Red, Magenta, Blue, Cyan and Green has chroma that becomes chroma $C^* \geq C0^*$ in relation to a certain reference value C of chroma. Each hue angle can be defined as follows (as one example).

Yellow: $H1^* \leq h^* < H6^*$
Red: $H2^* \leq h^* < H1^*$
Magenta: $H3^* \leq h^* < 0$ and $0 \leq h^* < H2^*$
Blue: $H4^* \leq h^* < H3^*$
Cyan: $H5^* \leq h^* < H4^*$
Green: $H6^* \leq h^* < H5^*$ A vertical axis at a lower portion of the diagram expresses L* (lightness). Chroma C* is $C^* \leq C0^*$. The lightness is defined as follows.

Whit: L=100
Black: L=0

As a brief method, it is also possible to decide hue from a ratio s(B):s(G):s(R) of the signals s(B), s(G) and s(R) and an absolute value.

In the mean time, the UCR processing can be carried out using the following expression (2).

$Y' = Y - \alpha * min(Y, M, C)$ $M' = M - \alpha * min(Y, M, C)$ $C' = C - \alpha * min(Y, M, C)$ $Bk = \alpha * min(Y, M, C)$ (2)

In the above expression, α is a coefficient for determining the volume of UCR. When α=1, a 100% UCR processing is carried out. α may be a constant value. For example, it is possible to make smooth the image at the high-light portion when α is close to 1 in the high-density portion, and is close to 0 in the high-light portion (low image-density portion). The color correction coefficients are different depending on six hues of RGBYMC, twelve hues obtained by dividing the six hues, and fourteen hues with an addition of black and white.

Further, the hue deciding circuit 432 decides a hue to which the read data belongs. Based on a result of this decision made, each correction parameter of each hue is selected. The magnification circuit 407 magnifies vertically and horizontally. The image processing (creating) circuit 408 carries out a repeat processing.

The image processing printer γ correcting circuit 409 corrects an image signal according to an image quality mode of a character and a photograph. This circuit can also carry out skipping of a texture at the same time. The image processing printer γ correcting circuit 409 has a plurality of (for example, ten) gradation conversion tables that can be changed over corresponding to the area signals generated by the area processing circuit 424. It is possible to select gradation conversion tables that are optimum for each draft like a character draft, a silver salt photograph draft, a half-tone photograph draft, an ink jet, a fluorescent pen, a map, and a heat-transfer draft, from among a plurality of image processing parameters. The dither processing circuit 410 carries out a dither processing or a pattern processing.

The pattern generating circuits 421 and 422 generate gradation patterns to be used in the IPU 12 and the printer 13 respectively.

Next, the printer 13 of the color copying machine will be explained. As shown in FIG. 2, the printer 13 in the color copying machine consists of an image formation printer γ correcting circuit 412, a printer 413, an I/F selector 411, a system controller 417, and a pattern generating circuit 422.

In this printer 13, the I/F selector 411 has functions of outputting the image data read by the scanner 11 to an external unit like a host computer 418 for this computer to process this image data, and changing over the image data from the external host computer 418 or other color copying machine (the master color copying machine) to output this image data to the printer 413.

The image formation printer γ (procon γ) correcting circuit 412 converts an image signal from the I/F selector 411 based on the gradation conversion table, and outputs a result to a modulation circuit (not shown).

As described above, the printer 13 consists of the I/F selector 411, the image formation printer γ correcting circuit 412, the printer 413, and the system controller 417. It is possible to use this printer independent of the scanner 11 and the IPU 12. Therefore, the printer 13 can be used to achieve a printer function (printer) by arranging such that the I/F selector 411 inputs image data of a master color copying machine received by the transceiver 16, the image formation printer γ correcting circuit 412 carries out a gradation conversion, and the printer 413 forms an image.

Next, the controller 15 of the color copying machine will be explained. As shown in FIG. 2, the controller 15 of the color copying machine consists of a CPU 130, a ROM 131, and a RAM 132.

In this controller 15, the CPU 130 controls the scanner 11, the IPU 12, the printer 13, the parameter processor 14, the transceiver 16, and the console 17. In other words, the CPU 130 is connected to these units via the bus 18. Further, the CPU 130 reads/writes data necessary for the control to/from the ROM 131 and the RAM 132 respectively. The CPU 130 also controls a scanner driving unit not shown, and drive-controls the scanner. The ROM 131 stores image processing parameters.

The above image processor (the scanner 11, and the IPU 12) is controlled by the CPU 130. The CPU 130 is connected with the ROM 131, the RAM 132 and the scanner/IPU via the BUS 18. The CPU 130 is connected with the system controller 417 through the serial I/F. A command from the console 17 is transmitted through the system controller 417. Various kinds of parameters are set to each image processing circuit based on the transmitted image quality mode, the density information and the area information.

Figure 16:
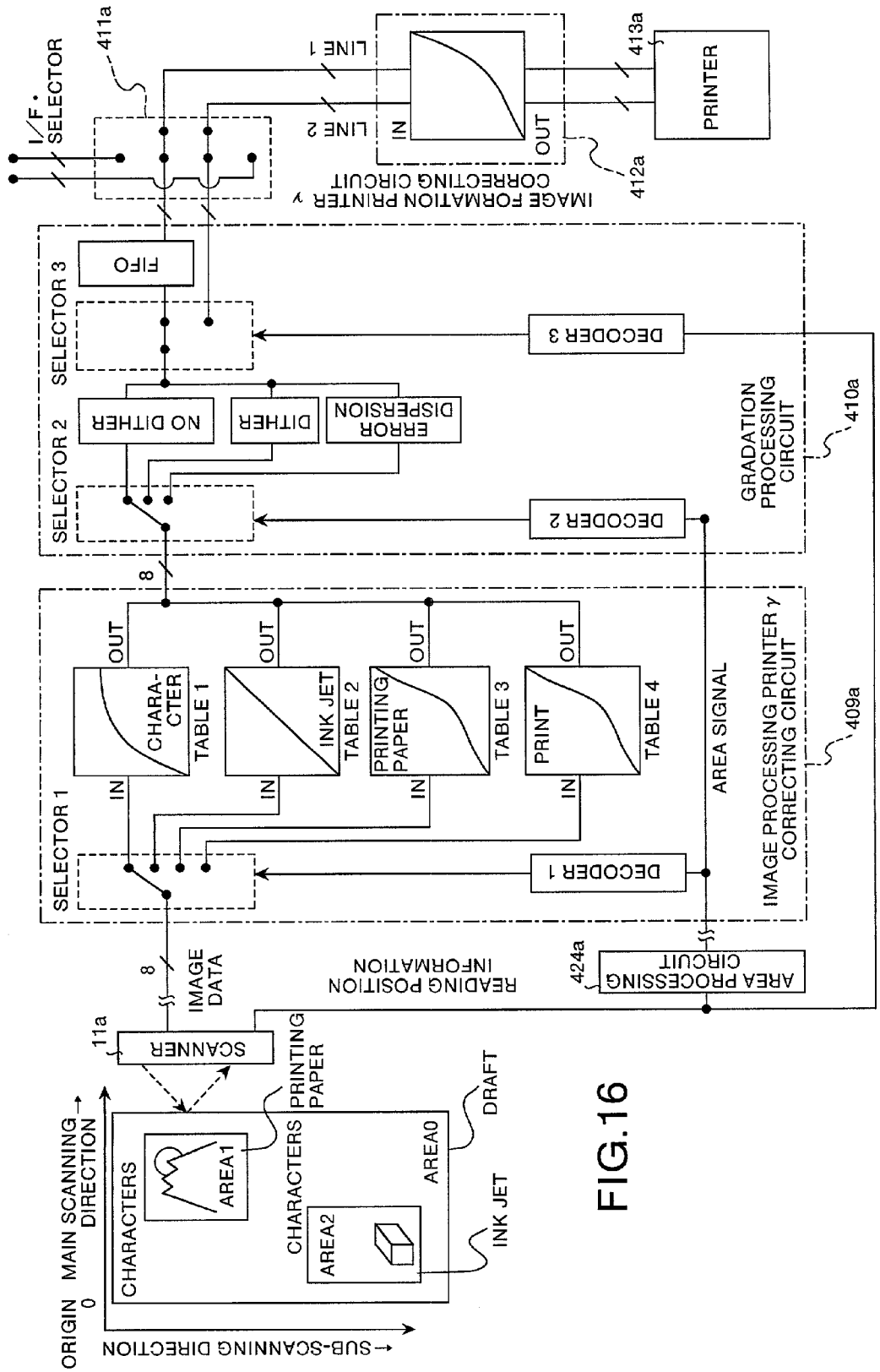
FIG. 16 is an explanatory diagram of an operation of switching gradation conversion tables in the color copying machine shown in FIG. 12.

Detailed processing of an image processing printer γ correcting circuit 409a, a gradation processing circuit 410a, and an image formation printer γ correcting circuit 412a will be explained next with reference to FIG. 16. FIG. 16 is a diagram for explaining the processing of the image processing printer γ correcting circuit 409a, the gradation processing circuit 410a, and the image formation printer γ correcting circuit 412a.

As shown in FIG. 16, the area processing circuit 424a generates an area signal based on a comparison between area information assigned on the draft and read position information for reading the image. Then, based on the area signal, parameters that are used in the scanner γ conversion circuit 402, the MTF filter 405, the color conversion UCR processing circuit 406, the image processing (creating) circuit 408, the image processing printer γ correcting circuit 409a, and the gradation processing circuit 410a, are changed. Particularly, FIG. 16 shows in detail the image processing printer γ correcting circuit 409a and the gradation processing circuit 410a.

Within the image processing printer γ correcting circuit 409a, the decoder 1 decodes an area signal from the area processing circuit 424a. A selector 1 selects a gradation conversion table from among a plurality of gradation conversion tables (scanner gradation conversion tables of the present invention) like a character, an ink jet, etc. A draft shown in FIG. 16 shows an example of a case that a character area 0, a printing paper area 1, and an ink jet area 2 exist. For example, a character gradation conversion table 1 is selected for the character area 0, a printing paper gradation conversion table 3 is used for the printing paper area 1, and an ink jet gradation conversion table 2 is used for the ink jet area 2.

The image signal (image data) that has been gradation-converted by the image processing printer γ correcting circuit 409a is decoded by a decoder 2 corresponding to the area signal again in the gradation processing circuit 410a. Based on this signal, a selector 2 switches the gradation processing to be used. As gradation processing that can be used, there are a processing that does not use dither, a processing that uses dither, and an error dispersion processing. The error dispersion processing is carried out for an ink jet draft.

A decoder 3 selects a line 1 or a line 2 for an image signal after the gradation processing, based on read position information. The line 1 and the line 2 are changed over for each pixel in a sub-scanning direction. The data on the line 1 is temporarily stored in a FIFO (First In First Out) memory that is located at the downstream of a selector 3, and the data on the line 1 and the line 2 are output. With this arrangement, it is possible to lower the pixel frequency to one half, and apply the data to the interface I/F selector 411a.

Next, laser modulation circuits prepared for the image data of the line 1 and the line 2 respectively will be explained with reference to FIG. 17. The write frequency is 18.6 [MHz], and the scanning time for one pixel is 53.8 [nsec]. The image data of eight bits can be γ converted by a look-up table (LUT) 451a.

A pulse width modulation circuit (PWM) 452a converts the image data into an eight-value pulse width based on a higher three-bit signal of the eight-bit image signal. A power modulation circuit (PM) 453a power converts the signal into 32-value based the lower five bits. A laser diode (LD) 454a emits light based on the modulated signal. A photo detector (PD) 455a monitors the intensity of light emission, and corrects the intensity for each one dot. A maximum value of the intensity of the laser beam can be varied into eight bits (256 gradations) independent of the image signal.

The diameter of a beam in the main scanning direction (this is defined as a width when the beam intensity at a still time is attenuated to 1/e2 of the maximum value) is less than 90%, preferably 80%, of a size of one pixel. When DPI is 600 and one pixel has 42.3 [μum], the beam diameter used is 50 [μm] in the main scanning direction, and is 60 [μm] in the sub scanning direction.

Figure 17:
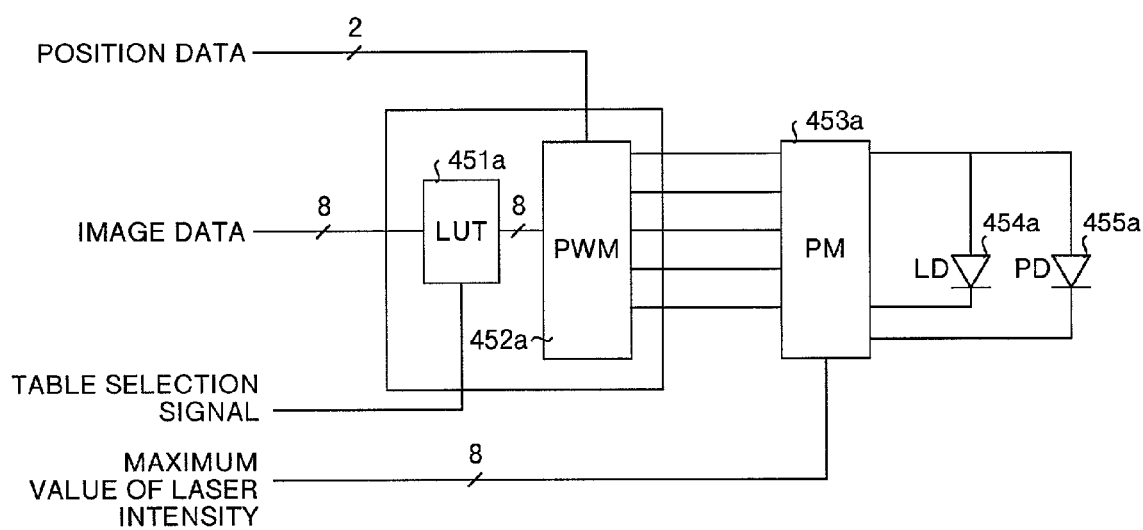
FIG. 17 is a structure diagram of a laser modulation circuit in the color copying machine shown in FIG. 12.

The laser modulation circuit shown in FIG. 17 is prepared corresponding to each of the image data of the line 1 and the line 2 shown in FIG. 16. The image data of the line 1 and the line 2 are synchronous with each other. The image data are scanned on a photo conductor in parallel in a main scanning direction.

(3) A method of Preparing a Gradation Conversion Table
  (3)-1 Automatic gradation correction of image density (gradation)
  (3)-2 Correction of texture
  (3)-3 Preparation of a gradation conversion table
  (3)-1 Automatic Gradation Correction of Image Density (Gradation)

Figure 18:
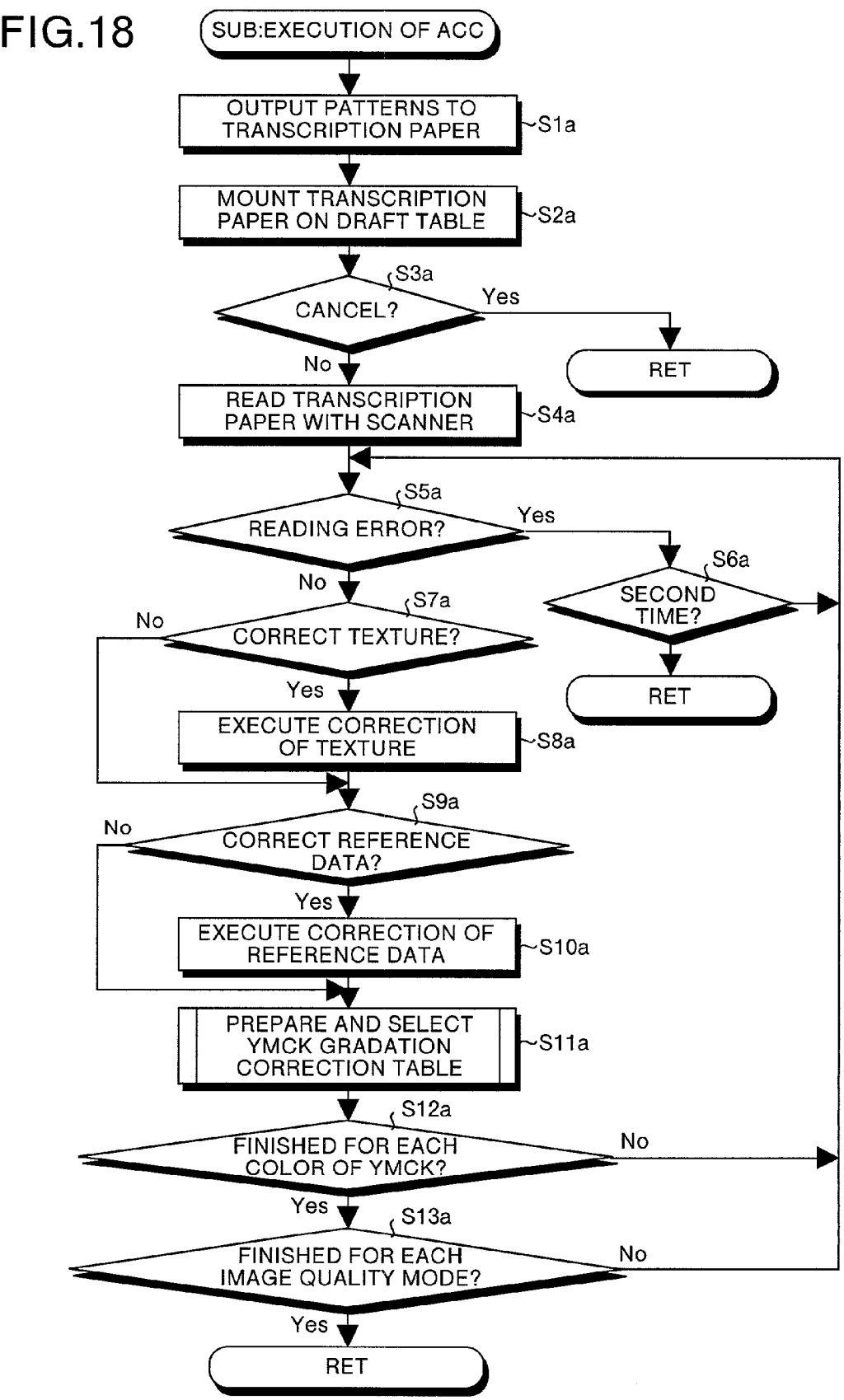
FIG. 18 is a flowchart showing automatic gradation correction (ACC: Auto Color Calibration) operation of image density (gradation)
Figure 19:
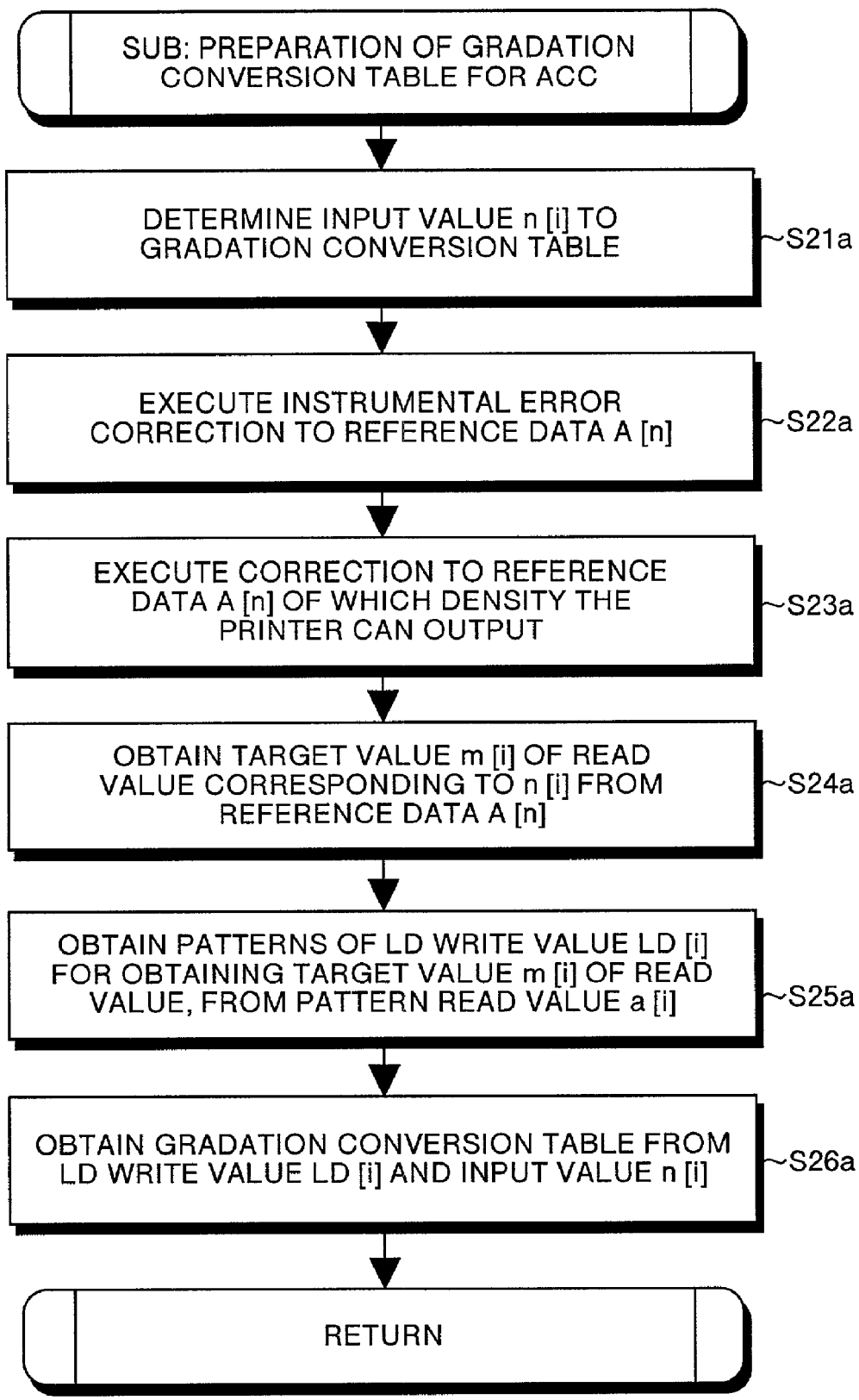
FIG. 19 is a flowchart showing a preparation procedure of the gradation conversion table at the time of carrying out ACC.
Figure 20:
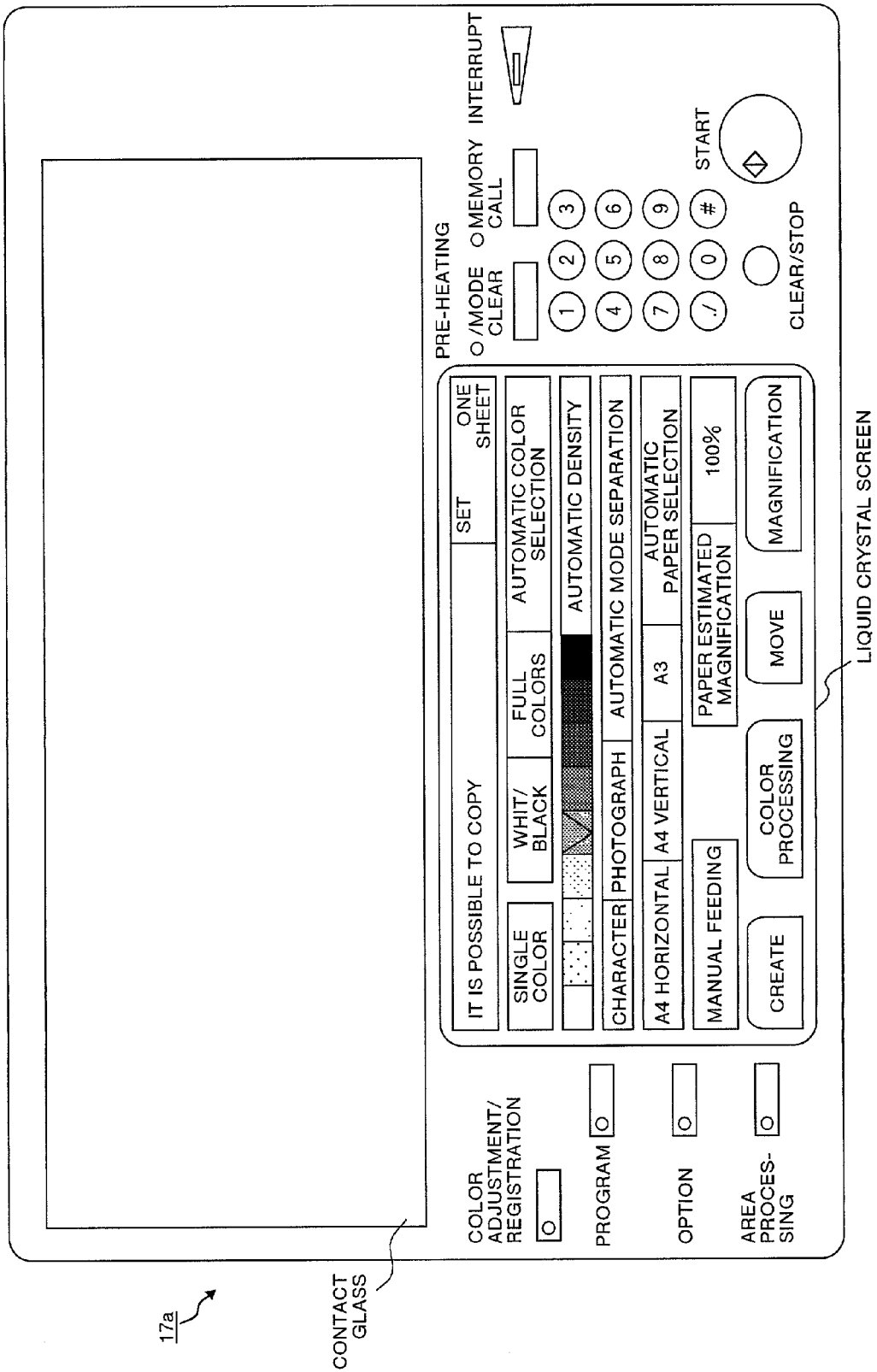
FIG. 20 is a diagram showing a schematic structure of a console shown in FIG. 12.
Figure 21:
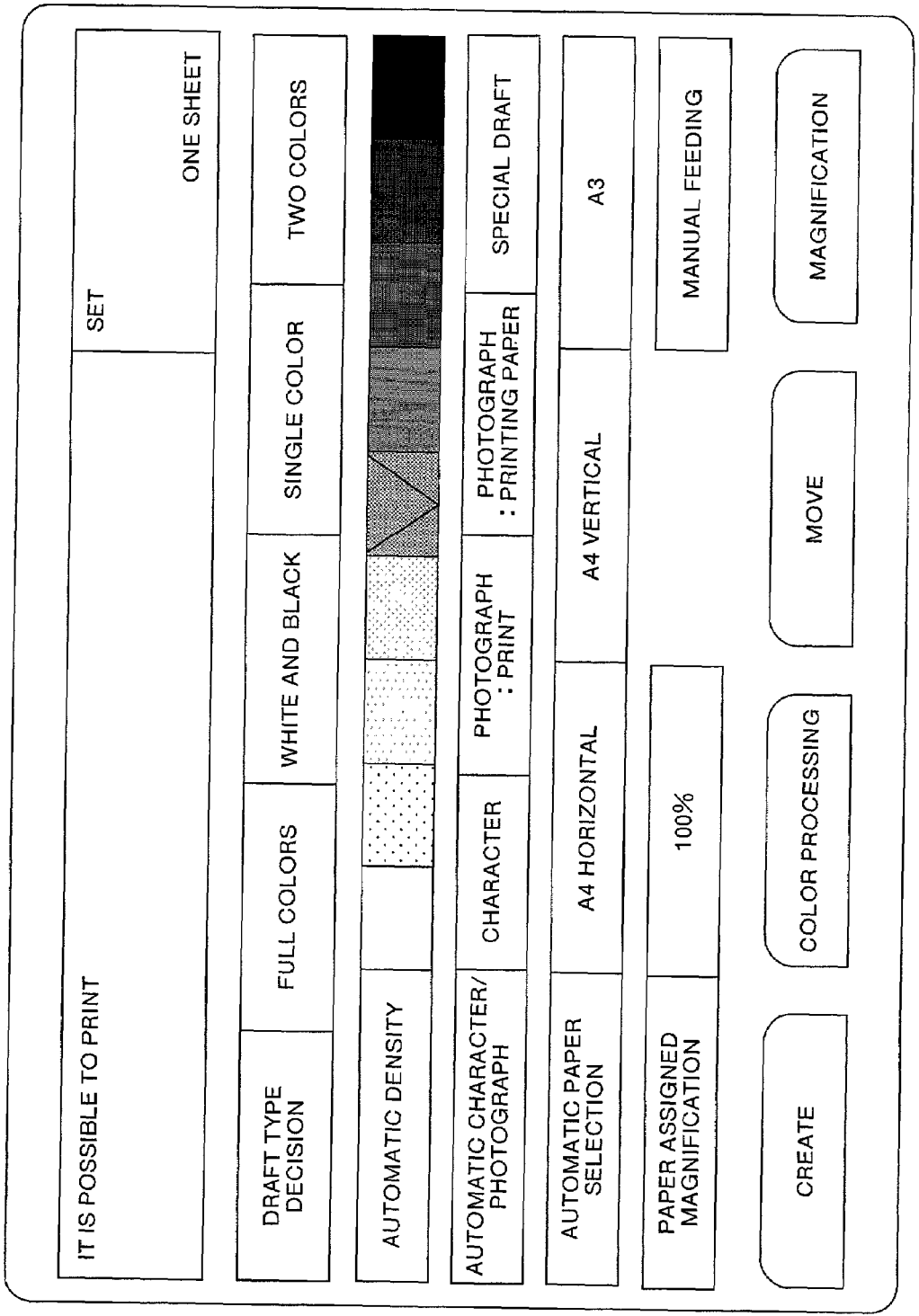
FIG. 21 is a diagram showing a liquid crystal screen of the console shown in FIG. 12.
Figure 26:
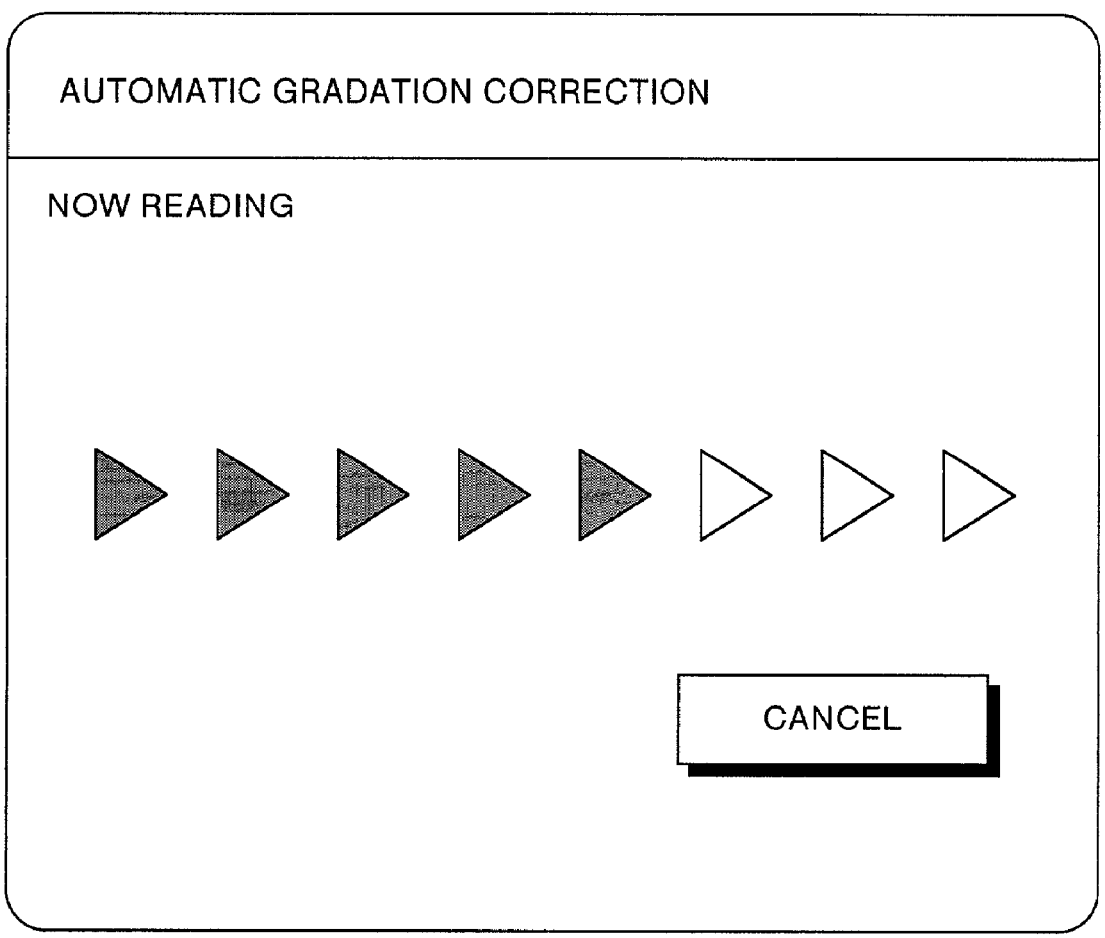
FIG. 26 is a diagram showing a display example of the liquid crystal screen of the console shown in FIG. 12.
Figure 27:
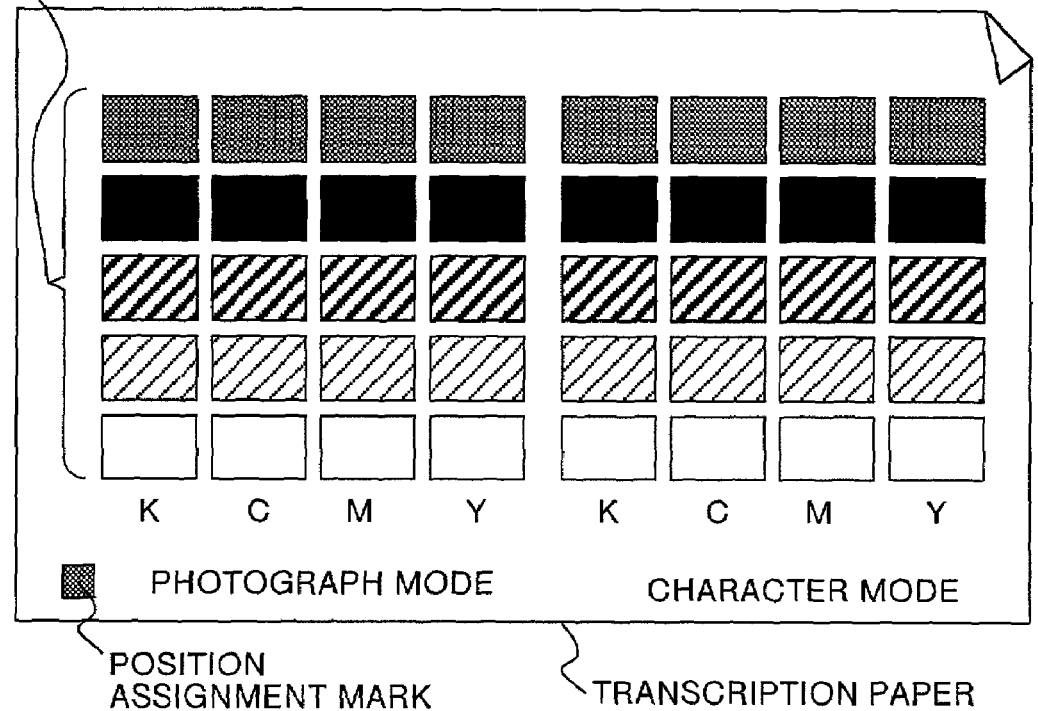
FIG. 27 is an explanatory diagram showing a plurality of density gradation patterns (calibration patterns) printed on a sheet of recording paper.

First, the operation of the automatic gradation correction (ACC: Auto Color Calibration) of image density (gradation) will be explained with reference to flowcharts shown in FIG. 18 and FIG. 19 and FIG. 20 to FIG. 33. FIG. 18 and FIG. 19 are flowcharts showing ACC operation of image density (gradation). FIG. 20 and FIG. 21 show schematic structures of a console 17a. FIG. 22 to FIG. 26, and FIG. 28 and FIG. 29 show display examples of a liquid crystal screen of the console 17a. FIG. 27 is an explanatory diagram showing a plurality of density gradation patterns (calibration patterns) printed on a sheet of recording paper.

Figure 22:
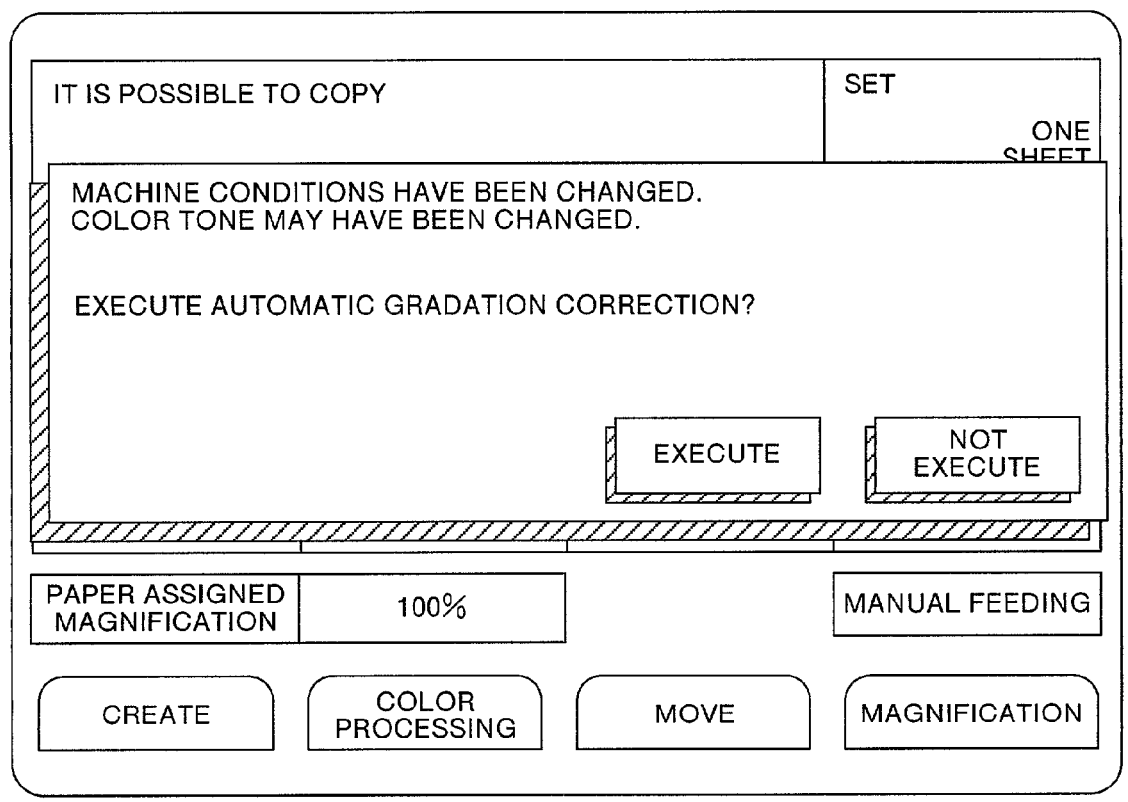
FIG. 22 is a diagram showing a display example of the liquid crystal screen of the console shown in FIG. 12.
Figure 23:
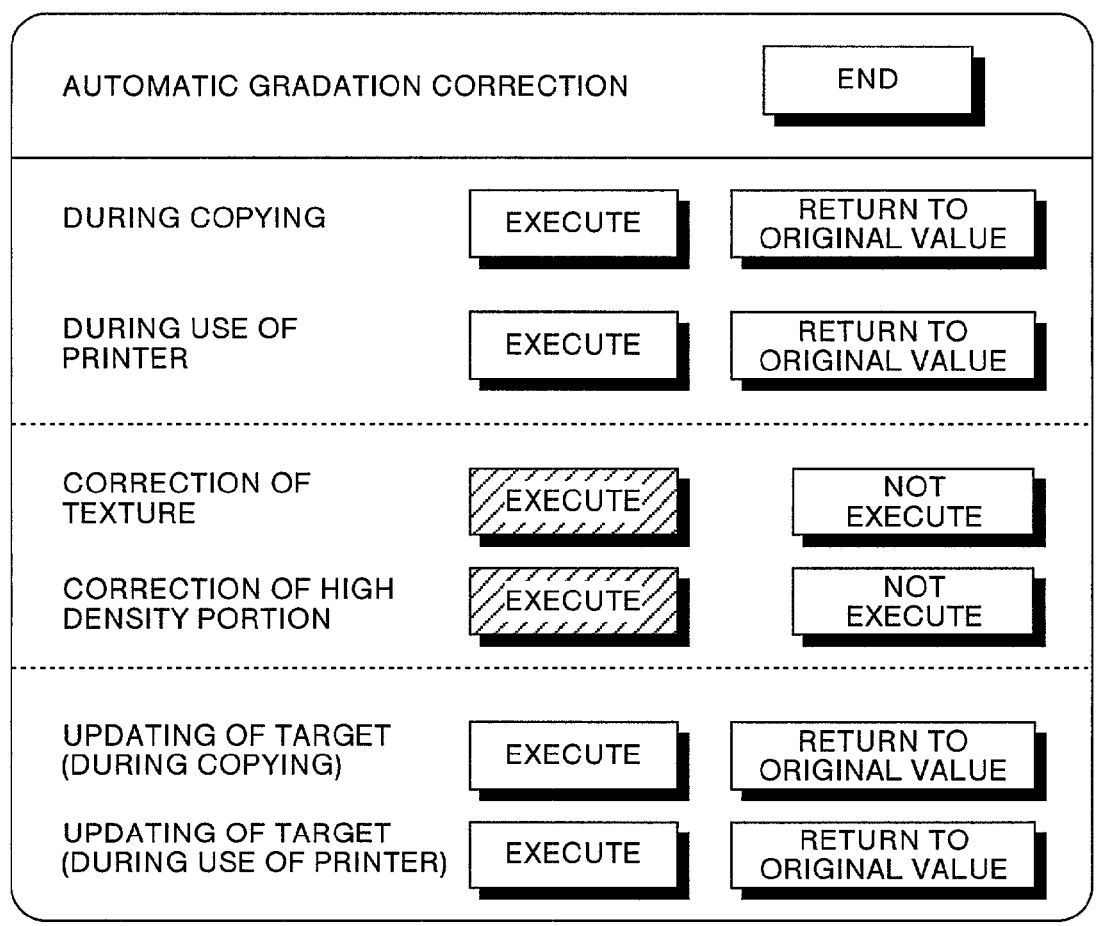
FIG. 23 is a diagram showing a display example of the liquid crystal screen of the console shown in FIG. 12.

A console screen for selecting a function of the automatic gradation correction (ACC: Auto Color Calibration) of image density (gradation) will be explained. FIG. 20 shows a schematic structure of the console 17a, and FIG. 21 shows one example of a liquid crystal screen of the console 17a. When an automatic gradation correction (ACC: Auto Color Calibration) menu is called on the liquid crystal display screen in FIG. 21, a display is made of a "message for urging a selection of the execution or non-execution of the automatic gradation correction" as shown in FIG. 22. When "execute" is selected on the screen shown in FIG. 22, an "automatic gradation correction (ACC) menu screen" as shown in FIG. 23 is displayed.

When the "execute" of the automatic gradation correction during a use of a copy or during a use of a printer as displayed like "during use of a copy" or "during use of a printer" has been selected, a screen as shown in FIG. 24 is displayed. When "during use of a copy" has been selected, a gradation conversion table that is to be used during the use of a copy is changed based on reference data in the subsequent processing. When "during use of a printer" has been selected, a gradation conversion table that is to be used during the use of a printer is altered based on reference data in the subsequent processing.

On the menu screen of the automatic gradation correction (ACC), a "return to the original value" key is provided, for selecting a YMCK gradation conversion table before the processing when a result of the image formation in the YMCK gradation conversion table after the alteration is not desirable.

Further, on the menu screen of the automatic gradation correction (ACC), it is possible to select "execute" or "not execute" for "correct the texture" or "correct the high-density portion". These selections are not always necessary. The selection may be always "select".

The automatic gradation correction (ACC: Auto Color Calibration) operation of image density (gradation) will be explained based on the flowcharts shown in FIG. 18 and FIG. 19. When the "execute" of the automatic gradation correction of "during use of a copy" or "during use of a printer" has been selected on the automatic gradation correction (ACC) menu screen shown in FIG. 23, a screen of "urging the print of a test pattern (calibration patterns=density gradation patterns)" as shown in FIG. 24 is displayed. When a "print start" key has been selected on the screen shown in FIG. 24, a plurality of density gradation patterns corresponding to each color of YMCK, characters and each image quality mode of a photograph are formed on the recording paper (step S1a in the flowchart shown in FIG. 18).

The density gradation patterns are stored and set in advance to the ROM of the IPU 12a.

The pattern write values are displayed in hexadecimal display, including sixteen patterns of 00h, 11h, 22h, - - - , EEh, and FFh. FIG. 27 displays patches of five gradations excluding the texture. It is possible to select an optional value within the eight-bit signals of 00h-FFh. In the character mode, a dither processing like a pattern processing is not used, and a pattern is formed using one dot and 256 gradations. In the photograph mode, a dither processing to be described later is carried out.

Figure 25:
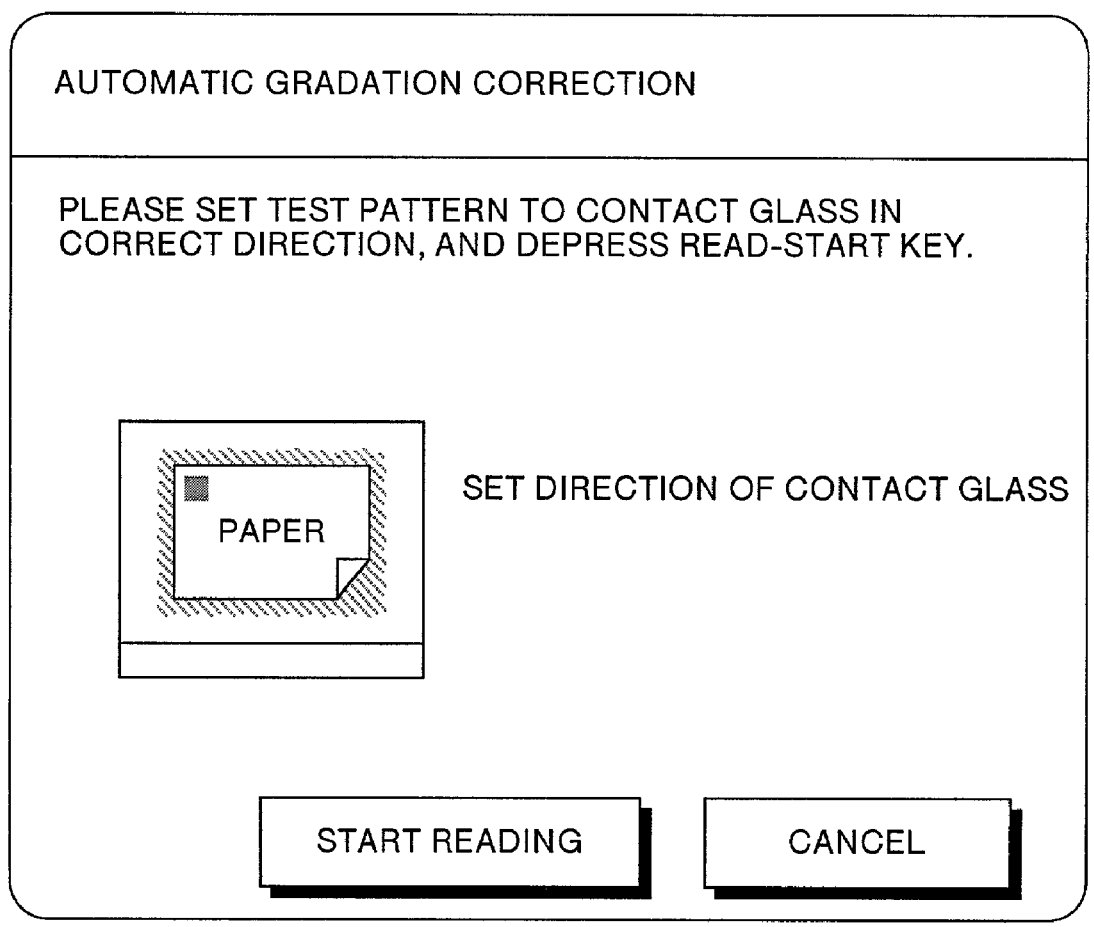
FIG. 25 is a diagram showing a display example of the liquid crystal screen of the console shown in FIG. 12.

After patterns have been output to the recording paper, the liquid crystal screen of the console 17a displays a message to urge the recording paper to be mounted on a draft table 118a as shown in FIG. 25.

A transfer material formed with the patterns is mounted on the draft table (step S2a), and a "start reading" key is selected on the screen shown in FIG. 25 (step S3a). Then, the scanner 11a runs, and reads the RFB data of the gradation density patterns (calibration patterns) (step S4a). At this time, the scanner 11a reads the data of the patterns and the data of the texture of the transfer material.

A decision is made about whether the data of the patterns has been read correctly or not (step S5a). When the data of the patterns has not been read correctly, the screen shown in FIG. 25 is displayed again. When the "start reading" key has been selected on this screen, the gradation density patterns are read again. When the data of the patterns has not been read correctly two times, the processing finishes (step S6a).

On the other hand, when a decision has been made at step S5a that the data of the patterns has been read correctly, a selection screen (not shown) for selecting an execution of the texture data processing or not is displayed on the liquid crystal display screen of the console 17a. When "execute" of the processing using the texture data has been selected (step S7a) on this selection screen, the texture data processing of the read data is carried out (step S8a).

Similarly, a selection screen (not shown) for selecting a correction of a high image-density portion of the reference data or not is displayed on the liquid crystal display screen of the console 17a. When the execution of the correction of the high image-density portion of the reference data has been selected on this selection screen (step S9a), the high image-density portion of the reference data is processed (step S10a). Thereafter, a YMCK gradation conversion table is prepared and selected (step S11a). A detailed method of preparing and selecting the YMCK gradation conversion table will be described later.

A decision is made about whether the above processing has been finished for each color of YMCK or not (step S12a). When the above processing has been finished for each color of YMCK, a decision is made about whether or not the above processing has been finished for each image quality mode of photograph and characters (step S13a). When the above processing has been finished, all the processing is finished. At step S4a to step S13a, a screen shown in FIG. 26 is displayed during the processing of the selected item on each selection screen.

When a result of the image formation in the YMCK gradation conversion table after the processing is not desirable, it is possible to select the YMCK gradation conversion table before the processing. For this purpose, the "return to the original value" key is displayed on the screen as shown in FIG. 23.

(3)-2 Correction of the Texture

The correction of the texture will be explained next. There are following two purposes of carrying out the correction of the texture.

A first object is to correct the white color degree of the recording paper to be used for the ACC. This is because, depending on the white degree of the recording paper used, a value read by the scanner 11a is different even when the same machine is used to form an image at the same time. A demerit of not correcting the white color degree of the recording paper is that, when a recycled paper with low white color degree is used for the ACC, for example, a yellow gradation conversion table prepared works to reduce the yellow component, as this recycled paper generally has much yellow color component. When an art paper with high white color degree is used to make a copy next in this status, a copied image obtained has little yellow component, and it is not possible to obtain desirable color reproducibility.

Second, when a recording paper used for the ACC has a small thickness (paper thickness), the colors of a pressing plate for pressing the recording paper is transparent, and these colors are also read by the scanner 11a. For example, when a draft automatic feeder called an ADF (Auto Document Feeder) is mounted instead of the pressing plate, a belt is used for carrying the draft. The material of a rubber system used for this belt has a low white color degree and has a slight gray color tone. Therefore, the image signal read out becomes a signal with a high gray color degree in total. As a result, a YMCK gradation conversion table prepared works to lower the gray color degree. When a recording paper having a large paper thickness with poor transparency is used next in this status, a copy of the draft obtained becomes an image with low density in total. Therefore, it is not possible to obtain a desirable image.

In order to avoid the above inconvenience, the read image signal of the patterns is corrected based on the image signal of the texture of the paper from the read image signal of the texture of the paper.

On the other hand, there is a merit of not carrying out the correction of the texture. When a recording paper with high yellow color component like recycled paper is always used, the color reproducibility may become better for colors including the yellow color component, when the texture is not corrected. When only a recording paper with a small paper thickness is always used, there is a merit that a gradation conversion table is prepared to match the status of the thin paper.

Therefore, whether the texture correction is carried out or not can be selected by ON/OFF selecting the correction of the texture on a predetermined selection screen (not shown) according to a status and a preference of the user.

(3)-3 Preparation of a Gradation Conversion Table

A method of selecting a gradation conversion table (LUT) by the gradation processing circuit 410a at the time of executing the ACC will be explained in detail. The write values of the gradation patterns (FIG. 27) formed on the recording paper are expressed as LD [i] (i=0, 1, - - - , 9). The values of the formed patterns read by the scanner 11a are expressed in a vector format as v [t] [i]≡(r [t] [i], g [t] [i], b [t] [i]) (t=Y, M, C, or K, i=0, 1, - - - , 9). Instead of (r, g, b), this may be expressed as lightness, chroma and hue angle (L*, c*, h*), or lightness, read degree and blue degree (L*, a*, b*). Standard read values of white recorded in advance in the ROM 131a or the RAM 132a are expressed as (r[W], g[W], b[W]).

In the read pattern values v [t] [i]≡(r [t] [i], g [t] [i], b [t] [i]), image signals of complementary colors of a WMC toner are b [t] [i], g [t] [i], r [t] [i] respectively. Therefore, only the image signals of the respective complementary colors are used. In order to simplify the description, these are expressed using a [t] [i] (i=0, 1, 2, - - - , 9, t=C, M, Y, or K). For black toner, it is possible to obtain sufficient precision using an image signal of any one of RGB. In this case, a G (green) component is used.

The reference data are target values of laser write values LD [i] (i=1, 2, - - - , m) corresponding to scanner read values v0 [t] [i] (r0 [t] [i], g0 [t] [i], b0 [t] [i]). Similarly, in order to simplify the description at a later stage, only complementary color image signals of YMC are used to express A [t] [n [i]] (0≦n [i]≦255; i=1, 2, - - - , m; t=Y, M, C, or K), where m represents a number of the reference data.

Table 1 shows one example of instrumental error correction values. The instrumental error correction values are set at a manufacturing stage, and are stored in the controller 15a.

TABLE 1

| HUE (hue) | INSTRUMENTAL ERROR CORRECTION VALUES RGB SIGNALS | | |
|---|---|---|---|
| | Red | Green | Blue |
| White | −16 | −28 | −27 |
| Black | 7 | 7 | 7 |
| Yellow | 0 | 0 | 46 |
| Red | −5 | 0 | 0 |
| Magenta | 0 | −26 | 0 |
| Blue | 0 | 0 | −46 |
| Cyan | 5 | 0 | 0 |
| Green | 0 | 26 | 0 |

The instrumental error correction values shown in Table 1 correspond to hues of White, Black, Yellow, Red, Magenta, Blue, Cyan, and Green respectively, and these show correction values of signals of Red (R), Green (G) and Blue (B) as hues of the CCD of the scanner 11a respectively. The reference data A [t] [n [i]] is corrected as shown in the following expression (Equation 3), where t represents any one of the YMC toners, k (c, ccd) represents instrumental error correction values, and values of reference data of ACC after the correction are A1[t] [n[i]] (t=C, M, Y, K, i=0, 1, 2, - - - , 1023).

$$A1\ [t]\ [n\ [i]] = A\ [t]\ [n\ [i]] + (k(t,\ r) - k(t,\ \text{White})) \times n[i]/1023 + k(t,\ \text{White}) \quad \text{(Equation 3)}$$

Figure 28:
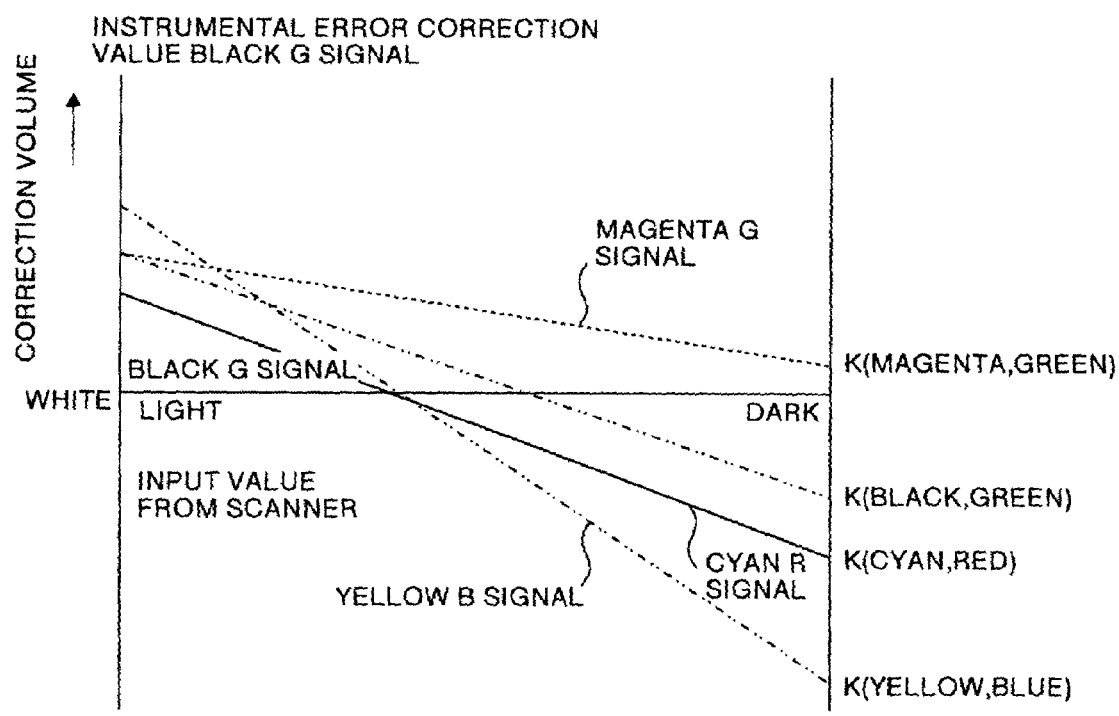
FIG. 28 is a diagram showing a relationship between instrumental error correction values and scanner input characteristics.

When t=Cyan, Magenta, and Yellow, r represents Red, Green, and Yellow that are complementary colors of these colors respectively. When t=Black, the r represents Green. FIG. 28 is a diagram showing a relationship between instrumental error correction values and values input from the scanner 11a. In FIG. 28, the horizontal axis represents input values of the scanner 11a, and the vertical axis represent instrumental error correction values. In the following explanation, A1 [t] [n [i]] of the Expression 3 is used as A [t] [n [i]].

It is also possible to set the instrumental error correction values by manipulating the console 17a. When the console 17a is manipulated, a set screen of the instrumental error correction values as shown in FIG. 29 is displayed. It is possible to set the instrumental error correction values on the set screen of instrumental error correction values. The set instrumental error correction values are stored in the PAM 132a.

It is possible to obtain a YMCK gradation conversion table based on a comparison between the a [LD] and the reference data A [n] stored in the ROM 131a. In this case, n represents an input value to the YMCK gradation conversion table. The reference data A [n] is a target value of a read image signal obtained by reading with the scanner the YMC toner patterns of output laser write values LD [i] after the input value n has been YMCK gradation-converted. The reference data consists of two kinds of values of a reference value A [n] that is corrected according to the image density that can be output from the printer, and a reference value A [n] that is not corrected.

A decision about whether the correction is carried out or not is made based on the decision data to be described later stored in advance in the ROM or the RAM. This correction will be explained later. Laser output values LD [n] corresponding to the input values n to the YMCK gradation conversion table are obtained by obtaining LD corresponding to A [n] from the above a [LD]. The laser output values LD [n] are obtained for the input values i=0, 1, - - - , 255 (in the case of the eight-bit signal). Thus, a gradation conversion table can be obtained.

In this case, instead of carrying out the above processing for all the values of the input values n=00h, 01h, - - - , FFh (hexadecimal) of the YMCK gradation conversion table, it is arranged as follows. The above processing is carried out for skipped values of ni=0, 11h, 22h, - - - , FFh, and the other points are interpolated by spline function. Otherwise, a closest table that passes a set of (0, LD [0]), (11h, LD [11h]), (22h, LD [22h], - - - , (FFh, LD [FFh]) obtained by the above processing is obtained from among the YMCK gradation conversion tables stored in advance in the ROM 131a (selection of a gradation conversion table).

Figure 30:
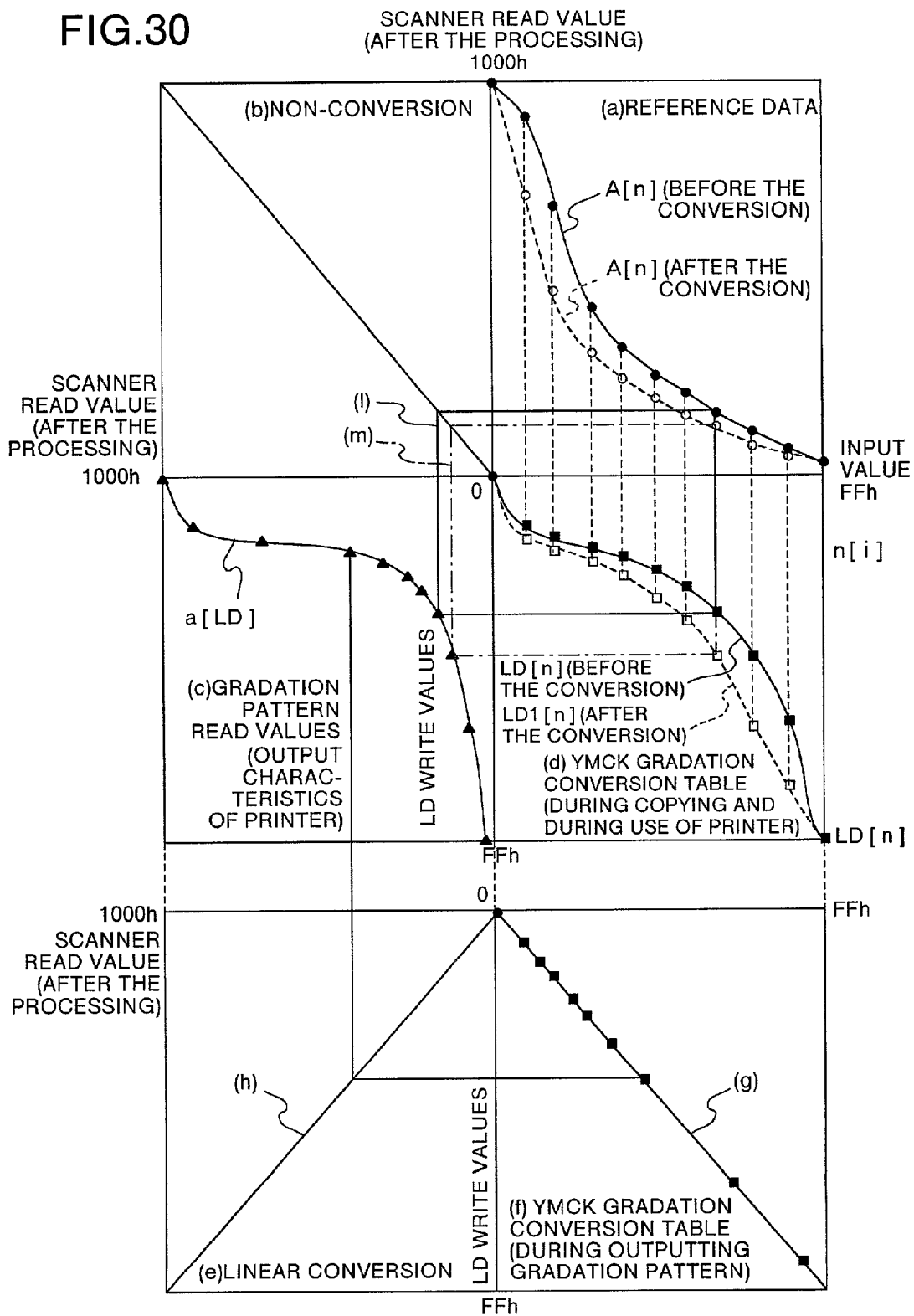
FIG. 30 is an explanatory diagram showing a method of generating a gradation conversion table (LUT) to be set to a gradation conversion circuit.

The above processing will be explained with reference to FIG. 30. In FIG. 30, the horizontal axis of the first quadrant (a) represents the input value n to the YMCK gradation conversion table, and the vertical axis represents the values read by the scanner 11a (after the processing), and this represents the reference data A [i]. The value read by the scanner 11a (after the processing) is a value after an RGB γ conversion (the conversion is not carried out in this case), an averaging processing of read data at a few points within the gradation patterns, and an addition processing, for the values obtained by reading the gradation patterns by the scanner. For the purpose of improving the processing precision, the data is processed as a twelve-bit data signal.

The horizontal axis of the second quadrant (b) represents the value read by the scanner 11a (after the processing), like the vertical axis.

The vertical axis of the third quadrant (c) represents a write value of the laser beam (LD). This dataa [LD] represents the characteristics of the printer. The LD write values of the patterns actually formed are the sixteen points of 00h (texture), 11h, 22h, - - - , 22h, - - - , EEh, and FFh. These represent skipped values. In this case, the detection points are interpolated, and are handled as a continuous graph.

The graph of the fourth quadrant (d) is for obtaining this table of YMCK gradation conversion table LD [i].

The vertical axis and the horizontal axis of a graph (f) are the same as the vertical axis and the horizontal axis of the graph (d). In the case of forming gradation patterns for the detection, a YMCK gradation conversion table (g) is used.

The horizontal axis of a graph (e) is the same as that of the third quadrant (c). This represents a linear conversion for the convenience of expressing a relationship between the LD write values at the time of preparing gradation patterns and the values of the gradation patterns read by the scanner 11a (after the processing).

For a certain input value n, the reference data A [n] is obtained. The LD output LD [n] for obtaining A [n] is obtained along an arrow mark (1) in the drawing, using the read value a [LD] of the gradation patterns.

The above processing procedure will be explained below with reference to the flowchart shown in FIG. 19. FIG. 19 is a flowchart showing a preparation procedure of a gradation conversion table at the time of carrying out ACC.

First, input values necessary for obtaining a YMCK gradation conversion table are determined (step S2/a). In this case, n [i]=11 [h]×i (i=0, 1, - - - , imax=15).

Next, the reference data A [n] is corrected using the instrumental error correction values k [s] [t] of the RGB signals in the above-described procedure (step S22a). The reference data A [n] is corrected according to the image density that can be output by the printer 413a (step S23a). It is assumed as follows. Laser write values from which a maximum image density that can be prepared by the printer 413a is obtained is FFh (a hexadecimal display). A read value m [FFh] of the patterns is expressed as mmax. Reference data that is not corrected for a low image-density side to an intermediate-image density side is A [i] (i=0, 1, - - - , il). Reference data that is not corrected for a high image-density side is A [i] (i=i2+1, - - - , imax−1) (i2≧i1, i2≦imax−1). Reference data that is corrected is A [i] (i=i0+ 1, - - - , i2).

A detailed calculation method will be explained next based on the assumption that an image signal is not RGB—γ converted and is proportional to the draft reflection factor. A data difference Δ ref is obtained from between the reference data A [i2+1] with a highest image density in the high image-density portion and the reference data A [i1] with a highest image density in the low image-density portion, out of the reference data that is not corrected. In other words, this data difference A ref is obtained as shown in the following (Equation 4). In the case of the reflection factor linear or the lightness linear when the RGB—γ conversion as the inversion processing is not carried out, Δref>0.

$$\Delta ref = A\ [i1] - A\ [i2+1] \quad \text{(Equation 4)}$$

In the mean time, a difference Δ det is obtained from the pattern read values mmax from which a maximum image density that can be prepared by the printer is obtained. This data difference Δ det is obtained from the following (Equation 5).

$$\Delta det = A\ [i1] - mmax \quad \text{(Equation 5)}$$

From the (Equation 4) and (Equation 5), the reference data A [i] (i=i1+1, - - - , i2) that has been corrected for the high density portion is expressed by the following (Equation 6).

$$A\ [i]=A\ [i1]+(A\ [i]-A\ [i1])\times(\Delta det/\Delta ref)\ (i=i1+1, i1+2, ---, i2-1, i2)$$ (Equation 6)

Next, a target value m [i] of the value read by the scanner 11a corresponding to n [i] obtained at step S21a is obtained from the reference data A [n] (step S24a). In actual practice, the reference data A [n [j]] (0≦[j]≦255, j=0, 1, - - - jmax, n [j]≦n [k] for j≦k) corresponding to the skipped n [j] is obtained as follows. In other words, j (0≦j≦255 jmax) is obtained to have a relationship of n [j]≦n [i]<n [j+1].

In the case of an eight-bit image signal, the calculation becomes simple when the reference data is obtained in advance as follows: n [0]=0, n [jmax]=255, n [jmax+1]=n [jmax]+1, A [jmax+1]=A [jmax].

From the j obtained in the above, m [i] is obtained from the following expression.

$$m\ [i]=A\ [j]+(A\ [j+1]-A\ [j])*(n\ [i]-n\ [j])/(n\ [j+1]-n\ [j])$$

When the interval of the reference data for n [j] is smaller, the precision of the gradation conversion table finally obtained becomes higher.

While the interpolation is carried out using a linear equation, it is also possible to carry out the equation using an equation of higher degree or the spline function. In this case, m [i]=f (n [i]). In the case of an equation of k degree, the following expression is used, for example.

$$f(x) = \sum_{i=0}^{k} b i x i$$ [Expression 3]

Next, the LD write value LD [i] for obtaining the target value m [i] obtained at step S24a is obtained from the pattern read value a [i] in a procedure similar to that of step S24a (step S25a). For example, in the case of processing an image signal that has not been RGB—γ converted, a [LD] becomes smaller when the value of LD becomes larger. In other words, a [LD [k]]≧a [LD [k+1]] against LD [k]]<LD [k+1].

In this case, the values at the time of forming patterns are set to ten values of LD [k]=00h, 11h, 22h, - - - , 66h, 88h, AAh, FFh, (k=0, 1, - - - , 9). In the image density with a small volume of toner adhesion, there is a large change in the read values of the toner adhesion volume read by the scanner 11a. Therefore, in this case, the interval of the pattern write value LD [k] is made dense. In the image density with a large volume of toner adhesion, there is a small change in the read values of the toner adhesion volume read by the scanner 11a. Therefore, in this case, the interval of the pattern write value LD [k] is made larger.

The merit of the above arrangement is that it is possible to restrict the toner consumption as compared with the case of increasing the number of patterns like LD [k]=00h, 11h, 22h, - - - , EEh, FFh (total sixteen points). Further, in the high image-density area, there is a small change in the LD write values. The read values are easily reversed due to the influence of the potential unevenness on the photo conductor, toner adhesion unevenness, fixing unevenness, and potential unevenness. Therefore, even if the interval of the LD write values is narrowed, this is not always effective in improving the precision. Because of the above reasons, the patterns are formed in the above LD write values.

For LD [k] having the relationship of a [LD [k]]≧m [i]>a [LD [k+1]], the following is set.

$$LD\ [i]=LD\ [k]+(LD\ [k+1]-LD\ [k])*(m\ [i]-a\ [LD\ [k]])/(a\ [LD\ [k+1]]-a\ [LD\ [k]])$$

In the case of a [LD [kmax]]>m [i] (the image density of the target value obtained from the reference data is high) when 0≦k≦kmax (kmax>0), a forecasting is carried out by a linear extrapolation based on the setting of LD [i]=LD [k]+(LD [kmax]-LD [kmax-1])*(m [i]-a[LD [kmax-1]]/a [LD [kmax]]-[LD [kmax-1]]). Instead of the linear equation, it is also possible to extrapolate based on other method like logarithm.

From the above, it is possible to obtain a set (n [i] LD [i]) (i=0, 1, - - - , 5) of the input value n [i] to the YMCK gradation conversion table and the output value LD [i].

Next, an interpolation is carried out using the spline function based on (n [i], LD [i]) (i=0, 1, - - - , 15) obtained at step S25a, or a gradation conversion table held in the ROM is selected (step S26a).

(4) Print Operation in the Image Formation System

Figure 31:
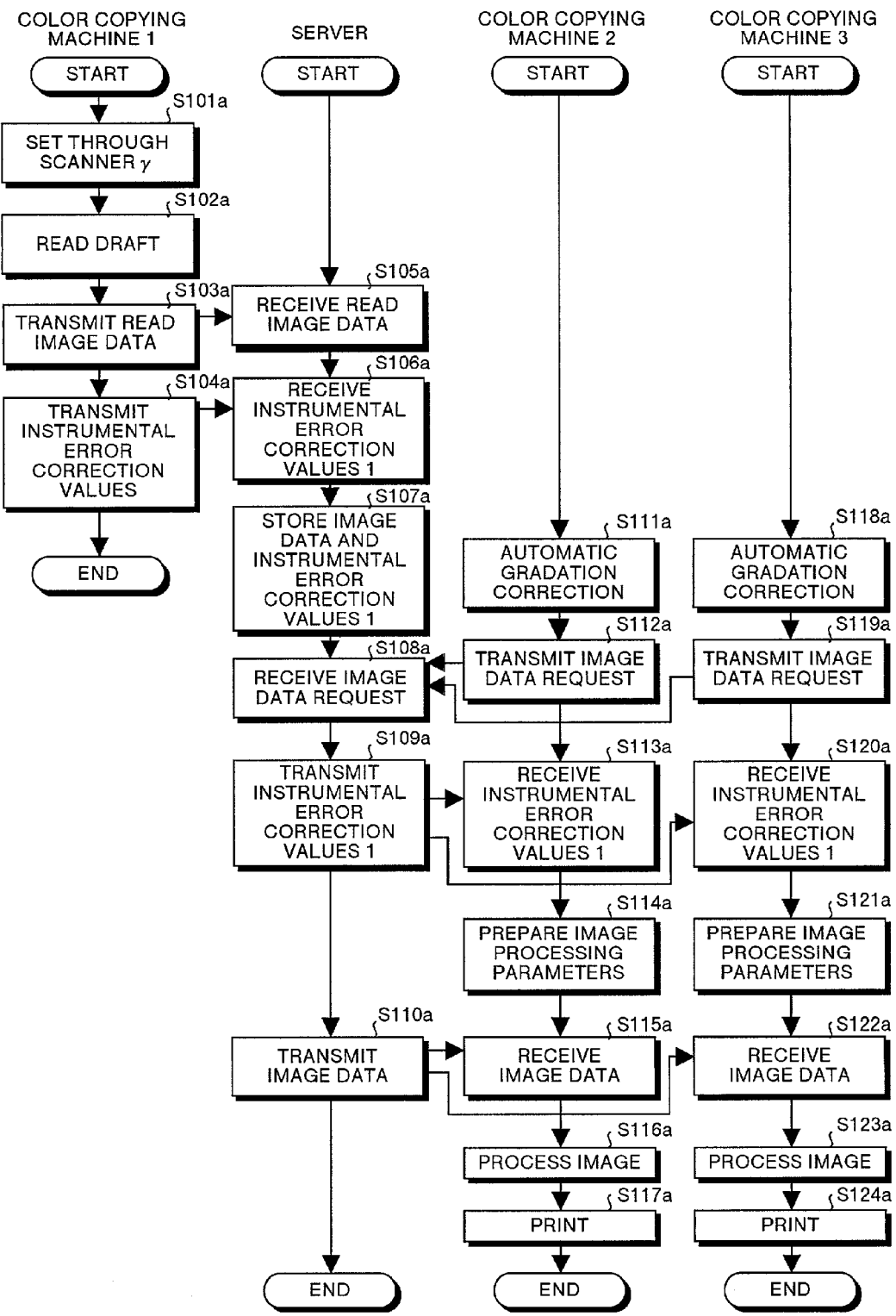
FIG. 31 is a flowchart for explaining a print operation of an image formation system relating to the fourth embodiment of the present invention.

The print operation in the image formation system relating to the fourth embodiment will be explained with reference to a flowchart shown in FIG. 31. FIG. 31 is a flowchart for explaining the print operation of the image formation system. This flowchart explains a case where the scanner of the color copying machine 1a reads the draft to obtain image data, stores this image data in the server 41a, and the color copying machine 2a and the color copying machine 3a output this image data.

First, the color copying machine 1a sets a through (before the correction) table as a scanner γ table (a scanner gradation conversion table) (step S101a). The color copying machine 1a reads the draft image data (step S102a), and transmits the read image data of the draft and instrumental error correction values 1 to the server 41a (steps S103a and S104a).

The server 41a receives the image data and the instrumental error correction values 1 transmitted from the color copying machine 1a (steps S105a and S106a), and stores the received image data and instrumental error correction values 1 in the memory by relating the image data to the instrumental error correction values 1 (step S107a).

In the mean time, the color copying machine 2a and the color copying machine 3a carry out the automatic gradation correction respectively (steps S111a and S118a). Specifically, the color copying machine 2a and the color copying machine 3a output the density gradation patterns (calibration patterns) 21 and 31 respectively, mount the output density gradation patterns (calibration patterns) 21 and 31 on the scanners 11a. The respective scanners 11a read these calibration patterns. The respective parameter processors 14a prepare the image processing parameters (gradation conversion tables) based on the read image data, and store the prepared image processing parameters (gradation conversion tables) in the controllers 15a.

The color copying machine 2a and the color copying machine 3a request respectively the server 41a to transmit the image data of the color copying machine 1a (steps S112a and S119a). The server 41a receives the image data transmission requests from the color copying machine 2a and the color copying machine 3a respectively (step S108a). The server 41a first transmits the instrumental error correction values 1 of the color copying machine 1a to the color copying machine 2a and the color copying machine 3a respectively (step S109a). Then, the color copying machine 2a and the color copying machine 3a receive respectively the instrumental error correction values 1 of the color copying machine 1a transmitted from the server 41a (steps S113a and S120a).

The color copying machine 2a and the color copying machine 3a prepare and alter respectively the image processing parameters for the color copying machine 1a, based on the respective differences between the instrumental error correction values 2 and 3 of the own apparatuses and the instrumental error correction values 1 of the color copying machine 1a (steps S114a and S121a).

The method of preparing the image processing parameters will be explained next. When the instrumental error correction values of a color copying machine m (m=1, 2, 3) are expressed as k0 [m] (hue, rgb) (where hue represents the hue, and rgb represents the color components of the CCD of the scanner), and the instrumental error correction values after the correction are expressed as k1 [j] (hue, rgb), then the instrumental error correction values k1 [j] (hue, rgb) after the correction can be expressed by the following expression.

$$k1\ [m](hue,\ rgb) = k0\ [1](hue,\ rgb) - k0\ [m](hue,\ rgb)$$

where m represents "the color copying machine 2a" or the "color copying machine 3a".

Next, the scanner γ table (the scanner gradation conversion table) before the correction based on the instrumental error correction values is expressed as s0 [m] [hue, rgb] [i] (where m represents the "color copying machine 2a" or the "color copying machine 3a", hue represents the hue of the draft, rgb represents the color components of the CCD of the scanner 11a, and i=0, 1, 2, - - - , 255; i is an integer) The scanner γ table after the correction is expressed as s1 [m] [hue, rgb] [i] (where m represents the "color copying machine 2a" or the "color copying machine 3a", and i=0, 1, 2, - - - , 255; i is an integer). Then, the scanner γ table (the scanner gradation conversion table) after the correction s1 [m] [hue, rgb] [i] can be expressed by the (Equation 8) as follows.

$$s1\ [m]\ [hue,\ rgb]\ [i] = s0\ [m]\ [hue,\ rgb]\ [i] + (k1\ [m](hue,\ rgb)) - k1\ [m](White,\ rgb)) \times i/255 + k1\ [m](White,\ rgb) \equiv s1(hue,\ rgb)$$

Further, when $$s1\ [m]\ [hue,\ rgb]\ [i] < 0,\ s1\ [m]\ [hue,\ rgb]\ [i] = 0 \quad \text{(Equation 8)}$$

where m represents the "color copying machine 2a" or the "color copying machine 3a", i=0, 1, 2, - - - , 255; i is an integer, hue represents the hue, and rgb represents the RBG signals.

Parameters obtained by correcting the YMC of the (Equation 1) based on the instrumental error correction values are expressed by the following expression when p1 [hue, cmyk] (hue=Black, Yellow, Red, Magenta, Blue, Cyan, Green, cmyk=C, M, Y, K).

$$\begin{pmatrix} p1(hue,\ Y) \\ p1(hue,\ M) \\ p1(hue,\ C) \end{pmatrix} = \begin{pmatrix} a11(hue) & a12(hue) & a14(hue) \\ a21(hue) & a22(hue) & a24(hue) \\ a31(hue) & a32(hue) & a34(hue) \end{pmatrix} \begin{pmatrix} s1(hue,\ B) \\ s1(hue,\ G) \\ s1(hue,\ R) \end{pmatrix}$$

[Expression 4]

where aij (hue) represents the matrix coefficient given to each hue.

Then, the server 41a transmits the image data of the color copying machine 1a to the color copying machine 2a and the color copying machine 3a respectively (step S110a). The color copying machine 2a and the color copying machine 3a receive respectively the image data of the color copying machine 1a transmitted from the server 41a (steps S115a and S122a). In the color copying machine 2a and the color copying machine 3a, the respective IPUs 12a carry out the image processing to the image data of the color copying machine 1 based on the image processing parameters prepared at steps S114a and S115a respectively (steps S116a and S123a). Then, the respective printers 13a print the image data of the color copying machine 1a (steps S117a and S124a).

As explained above, according to the fourth embodiment, the color copying machine 1a transmits the read image data and the instrumental error correction values of the color copying machine 1a to the server 41a. The server 41a stores the image data and the instrumental error correction values of the color copying machine 1a. When the server 41a has received requests from the color copying machine 2a and the color copying machine 3a for transmitting the image data of the color copying machine 1a, the server 41a transmits the image data and the instrumental error correction values of the color copying machine 1a to the color copying machine 2a and the color copying machine 3a respectively. The color copying machine 2a and the color copying machine 3a prepare the image processing parameters based on the instrumental error correction values 1 of the color copying machine 1a and the instrumental error correction values 2 and 3 of the respective own apparatuses, image-process the image data of the color copying machine 1a based on the image processing parameters, and print out the image data respectively. Therefore, it is possible to decrease unevenness in the result of the color adjustments. The color copying machine 2a and the color copying machine 3a can output the printed materials having uniform color reproducibility with colors similar to those of the printed material at the side of the color copying machine 1a that has input the draft image. As a result, in the case of producing a large volume of copies from only one existing draft in a short time, it is possible to improve the color reproducibility of the printed materials.

(Fifth Embodiment)

In the fourth embodiment, the image data read by the color copying machine 1a and the instrumental error correction values of the color copying machine 1a are stored in the server 41a, and the image data and the instrumental error correction values are transmitted from the server 41a to the color copying machine 2a and the color copying machine 3a respectively. The present invention is not limited to this structure. It is also possible to arrange such that the color copying machine 1a stores the image data read by the color copying machine 1a and the instrumental error correction values 1 of the color copying machine 1a, and transmits the image data and the instrumental error correction values 1 to the color copying machine 2a and the color copying machine 3a without passing through the server 41a. In the fifth embodiment, description will be made of the case where the color copying machine 1a stores the image data read by the color copying machine 1a and the instrumental error correction values 1 of the color copying machine 1a, and transmits the image data and the instrumental error correction values 1 to the color copying machine 2a and the color copying machine 3a without passing through the server 41a. In the following description, portions having functions similar to those of the portions shown in the fourth embodiment are attached with like reference symbols, and detailed explanation of these portions will be omitted.

Figure 32:
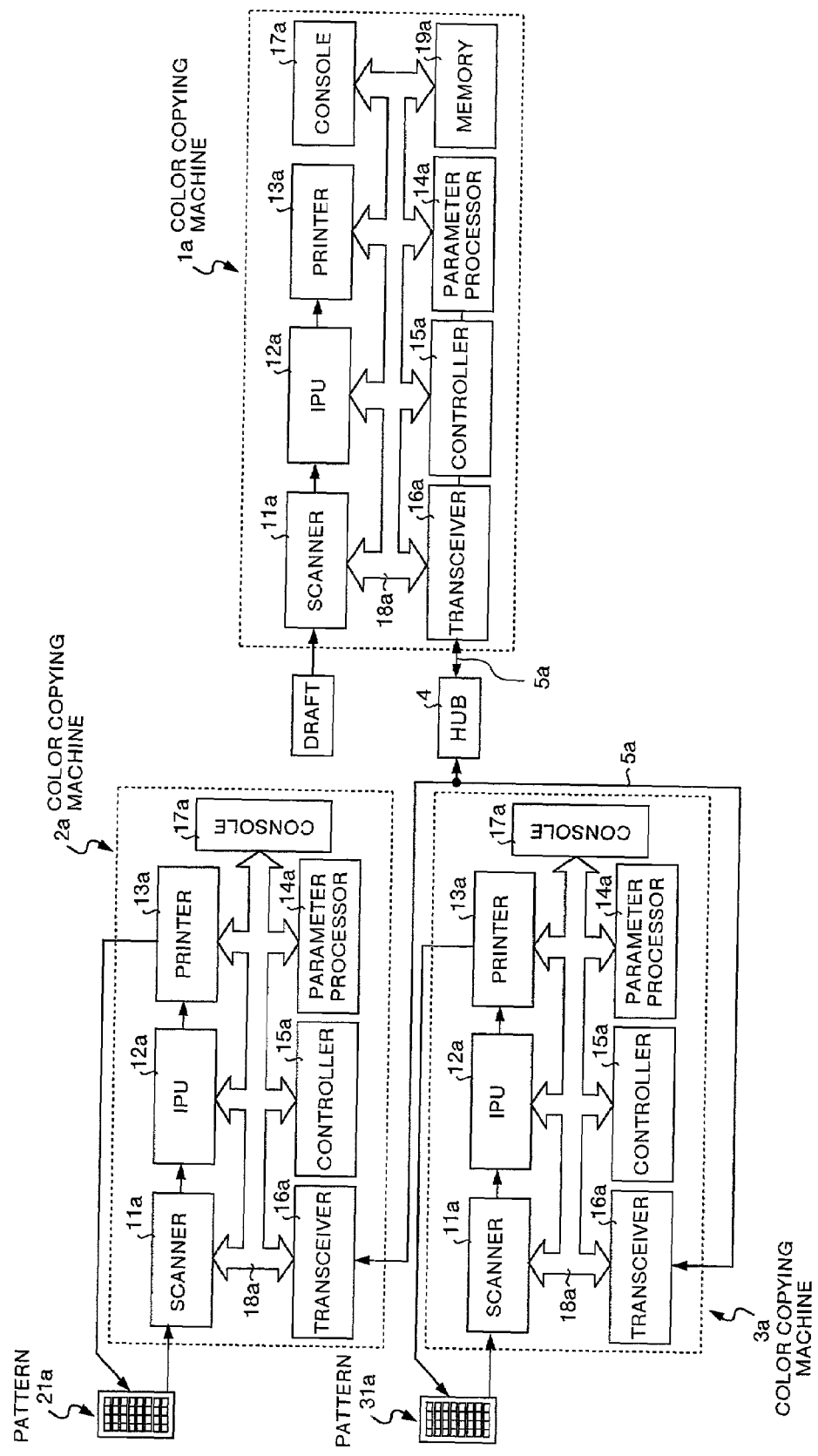
FIG. 32 is a flock diagram of an image formation system relating to a fifth embodiment of the present invention.

FIG. 32 is a block diagram showing a structure of an image formation system relating to the fifth embodiment of the present invention. As shown in FIG. 32, the image formation system relating to the fifth embodiment consists of a color copying machine 1a, a color copying machine 2a, and a color copying machine 3a that are connected together via an Internet cable 5a and a HUB 4a so that these color copying machines can transmit/receive data to and from each other.

The color copying machine 1a of the fifth embodiment is different from the color copying machine of the fourth embodiment in that the color copying machine 1a has a memory 19a for storing the image data read by the color copying machine 11a. The structures of the color copying machine 2a and the color copying machine 3a are similar to those of the color copying machines in the fourth embodiment.

Figure 33:
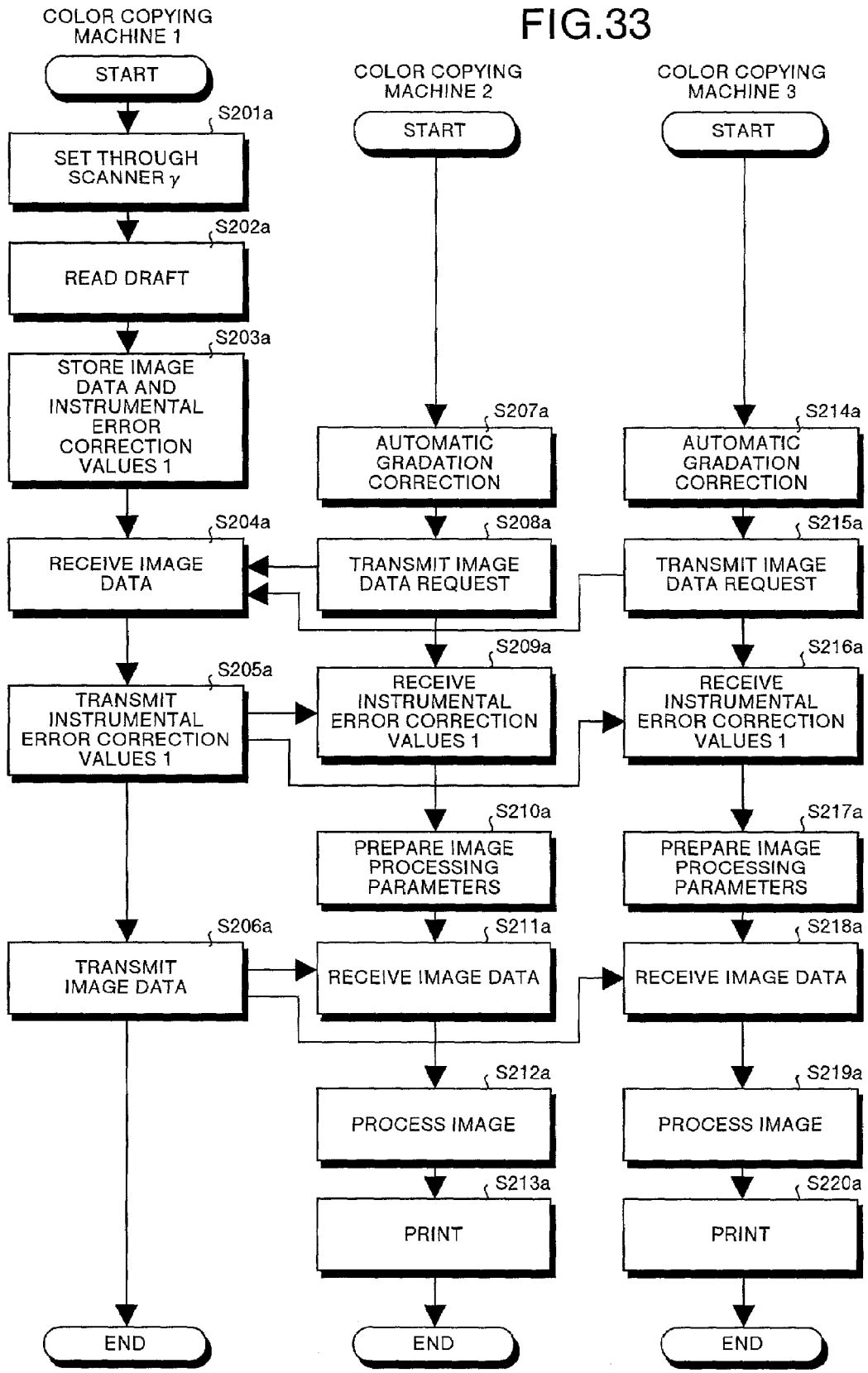
FIG. 33 is a flowchart for explaining a print operation of the image formation system relating to the fifth embodiment.

The printing operation of the image formation system relating to the fifth embodiment will be explained with reference to a flowchart shown in FIG. 33. FIG. 33 is a flowchart for explaining the print operation of the image formation system. This flowchart explains a case where the scanner of the color copying machine 1a reads the draft to obtain image data, stores this image data in the own memory 19a, and the color copying machine 2a and the color copying machine 3a output this image data.

In FIG. 33, first, the color copying machine 1a sets a through (before the correction) table as a scanner γ table (a scanner gradation conversion table) (step S201a). The color copying machine 1a reads the draft image data (step S202a), and stores the read image data of the draft in the memory 19a by relating this image data to the instrumental error correction values 1 (step S203a).

In the mean time, the color copying machine 2a and the color copying machine 3a carry out the automatic gradation correction respectively (steps S207a and S214a). Specifically, the color copying machine 2a and the color copying machine 3a output the density gradation patterns (calibration patterns) 21 and 31 respectively, mount the output density gradation patterns (calibration patterns) 21 and 31 on the scanners 11a. The respective scanners 11a read these calibration patterns. The respective parameter processors 14a prepare the image processing parameters (gradation conversion tables) based on the read image data, and store the prepared image processing parameters (gradation conversion tables) in the controllers 15a.

The color copying machine 2a and the color copying machine 3a request respectively the color copying machine 1a to transmit the image data of the color copying machine 1a (steps S208a and S215a). The color copying machine 1a receives the request for transmitting the image data of the color copying machine 1a from the color copying machine 2a and the color copying machine 3a respectively (step S204a). The color copying machine 1a first transmits the instrumental error correction values 1 of the color copying machine 1a to the color copying machine 2a and the color copying machine 3a respectively (step S205a). Then, the color copying machine 2a and the color copying machine 3a receive respectively the instrumental error correction values 1 of the color copying machine 1a transmitted from the color copying machine 1a (steps S209a and S216a).

The color copying machine 2a and the color copying machine 3a prepare and alter respectively the image processing parameters for the color copying machine 1a, based on the respective differences between the instrumental error correction values 2 and 3 of the own apparatuses and the instrumental error correction values 1 of the color copying machine 1a (steps S210a and S217a). As the method of preparing the image processing parameters is similar to that of the fourth embodiment, the explanation of this method will be omitted.

Then, the color copying machine 1a transmits the image data of the color copying machine 1a to the color copying machine 2a and the color copying machine 3a respectively (step S206a). The color copying machine 2a and the color copying machine 3a receive respectively the image data of the color copying machine 1a transmitted from the color copying machine 1a (steps S211a and S218a). In the color copying machine 2a and the color copying machine 3a, the respective IPUs 12a carry out the image processing to the image data of the color copying machine 1a based on the image processing parameters prepared at steps S210a and S217a respectively (steps S212a and S219a). Then, the respective printers 13a print the image data of the color copying machine 1a (steps S213a and S220a).

As explained above, according to the fifth embodiment, the color copying machine 1a stores the read image data and the instrumental error correction values of the color copying machine 1a. When the color copying machine 1a has received requests from the color copying machine 2a and the color copying machine 3a for transmitting the image data of the color copying machine 1a, the color copying machine 1a transmits the image data and the instrumental error correction values of the color copying machine 1a to the color copying machine 2a and the color copying machine 3a respectively. The color copying machine 2a and the color copying machine 3a prepare the image processing parameters based on the instrumental error correction values 1 of the color copying machine 1a and the instrumental error correction values of the respective own apparatuses, image-process the image data of the color copying machine 1a based on the image processing parameters, and print out the image data respectively. Therefore, the color copying machine 2a and the color copying machine 3a can output the printed materials having uniform color reproducibility with colors similar to those of the printed material at the side of the color copying machine 1a that has input the draft image. As a result, in the case of producing a large volume of copies from only one existing draft in a short time, it is possible to improve the color reproducibility of the printed materials.

According to the image formation systems relating to the fourth embodiment and the fifth embodiments, it is permitted that there is time and space difference between the color copying machine 1a that reads outputs the draft and the color copying machines 2a and 3a that print out the draft image of the color copying machine 1a. In other words, the color copying machine 1a that reads the draft and the color copying machines 2a and 3a may be located on different floors within the same building or located within different buildings. The time of reading the draft may be the day before the print out or one month before the print out. During this period, it is possible to store the image data within a local storage like the hard disk or the image memory held in the server 41a or the color copying machine 1a, and call the image data when it is necessary to print this image data.

(Sixth Embodiment)

In the fourth and fifth embodiments, description has been made of the case where the image data read by the color copying machine 1a is printed out by the color copying machine 2a and the color copying machine 3a respectively. The present invention is not limited to this structure. It is also possible to arrange such that the image data read by the color copying machine 1a and the color copying machine 2a are printed out by the color copying machine 3a. In the sixth embodiment, description will be made of the case where the color copying machine 1a and the color copying machine 2a store the image data read by the color copying machine 1a and the color copying machine 2a together with the instrumental error correction values respectively, and transmit the image data and the instrumental error correction values to the color copying machine 3a. In the sixth embodiment, portions having functions similar to those of the portions shown in the fourth embodiment are attached with like reference symbols, and detailed explanation of these portions will be omitted.

FIG. 34 is a block diagram showing a structure of an image formation system relating to the sixth embodiment of the present invention. As shown in FIG. 34, the image formation system relating to the sixth embodiment consists of a color copying machine 1a, a color copying machine 2a, and a color copying machine 3a that are connected together via an Internet cable 5a and a HUB 4a so that these color copying machines can transmit/receive data to and from each other.

The color copying machine 1a and the color copying machine 2a of the sixth embodiment are different from the color copying machines of the fourth embodiment in that the color copying machine 1a and the color copying machine 2a have memories 19a for storing the image data read by the color copying machine 11a respectively. The structure of the color copying machine color copying machine 3a is similar to that of the color copying machine in the fourth embodiment.

The printing operation of the image formation system relating to the sixth embodiment will be explained with reference to a flowchart shown in FIG. 35. FIG. 35 is a flowchart for explaining the print operation of the image formation system. This flowchart explains a case where the scanners 11a of the color copying machine 1a and the color copying machine 2a read the drafts to obtain image data, store these image data in their own memories respectively, and the color copying machine 3a pints out these image data of the color copying machine 1a and the color copying machine 2a respectively in sequence.

In FIG. 35, first, the color copying machine 1a sets a through (before the correction) table as a scanner γ table (a scanner gradation conversion table) (step S301a). The color copying machine 1a reads the draft image data (step S302a), and stores the read image data of the draft in the memory 19a by relating this image data to the instrumental error correction values 1 (step S303a).

Similarly, the color copying machine 2a sets a through (before the correction) table as a scanner γ table (a scanner gradation conversion table) (step S307a). The color copying machine 2a reads the draft image data (step S308a), and stores the read image data of the draft in the memory 19a by relating this image data to the instrumental error correction values 1 (step S309a).

In the mean time, the color copying machine 3a carries out the automatic gradation correction (step S313a). Specifically, the color copying machine 3a outputs the density gradation patterns (calibration patterns) 31, mounts the output density gradation patterns (calibration patterns) 31 on the scanner 11a as explained above. The scanner 11a reads the calibration patterns. The parameter processor 14a prepares the image processing parameters (gradation conversion tables) based on the read image data, and stores the prepared image processing parameters (gradation conversion tables) in the controller 15a.

The color copying machine 3a requests the color copying machine 1a to transmit the image data of the color copying machine 1a (step S314a). The color copying machine 1a receives the request for transmitting the image data of the color copying machine 1a from the color copying machine 3a (step S304a). The color copying machine 1a first transmits the instrumental error correction values 1 of the color copying machine 1a to the color copying machine 3a (step S305a). Then, the color copying machine 3a receives the instrumental error correction values 1 of the color copying machine 1a transmitted from the color copying machine 1a (step S315a).

The color copying machine 3a prepares and alters the image processing parameters for the color copying machine 1a, based on the difference between the instrumental error correction values 3 of the own apparatus and the instrumental error correction values 1 of the color copying machine 1a (step S316a). As the method of preparing the image processing parameters is similar to that of the fourth embodiment, the explanation of this method will be omitted.

Then, the color copying machine 1a transmits the image data 1 of the color copying machine 1a to the color copying machine 3a (step S306a). The color copying machine 3a receives the image data 1 of the color copying machine 1a transmitted from the color copying machine 1a (step S317a). In the color copying machine 3a, the IPU 12a carries out the image processing to the image data of the color copying machine 1a based on the image processing parameters prepared at step S316a (step S318a). Then, the printer 13a prints the image data of the color copying machine 1a (step S319a).

Similarly, the color copying machine 3a requests the color copying machine 2a to transmit the image data of the color copying machine 2a (step S320a). The color copying machine 2a receives the request for transmitting the image data of the color copying machine 2a from the color copying machine 3a (step S310a). The color copying machine 2a first transmits the instrumental error correction values 2 of the color copying machine 2a to the color copying machine 3a (step S311a). Then, the color copying machine 3a receives the instrumental error correction values 2 of the color copying machine 2a transmitted from the color copying machine 2a (step S321a).

The color copying machine 3a prepares and alters the image processing parameters for the color copying machine 2a, based on the difference between the instrumental error correction values 3 of the own apparatus and the instrumental error correction values 2 of the color copying machine 2a (step S22a). As the method of preparing the image processing parameters is similar to that of the fourth embodiment, the explanation of this method will be omitted.

Then, the color copying machine 2a transmits the image data 2 of the color copying machine 2a to the color copying machine 3a (step S312a). The color copying machine 3a receives the image data 2 of the color copying machine 2a transmitted from the color copying machine 2a (step S323a). In the color copying machine 3a, the IPU 12a carries out the image processing to the image data of the color copying machine 2a based on the image processing parameters prepared at step S322a (step S324a). Then, the printer 13a prints the image data of the color copying machine 2a (step S325a).

As explained above, according to the sixth embodiment, the color copying machine 1a and the color copying machine 2a store the read image data and the instrumental error correction values of the color copying machine 1a and the color copying machine 2a respectively. When each of the color copying machine 1a and the color copying machine 2a has received a request from the color copying machine 3a for transmitting the image data of the own apparatus, the color copying machine transmits the image data and the instrumental error correction values of the own apparatus to the color copying machine 3a. The color copying machine 3a prepares the image processing parameters for the color copying machine 1a and the color copying machine 2a respectively, based on the instrumental error correction values 1 of the color copying machine 1a, the instrumental error correction values of the color copying machine 2a and the instrumental error correction values of the own apparatus. The color copying machine 3a image-processes the image data of the color copying machine 1a and the image data of the color copying machine 2a, based on the image processing parameters for the color copying machine 1a and the color copying machine 2a respectively, and prints out the image data respectively. Therefore, the color copying machine 3a can output the printed materials having uniform color reproducibility with colors similar to those of the printed materials at the side of the color copying machine 1a and the color copying machine 2a that have input the draft images respectively. As a result, in the case of outputting image data based on the image data that has been input to a plurality of input units, it is possible to obtain the output with small variations in the color reproducibility having small instrumental errors of read characteristics.

In the image formation systems of the fourth to sixth embodiments, description has been made of the case where three color copying machines (the color copying machine 1a to the color copying machine 3a) are connected. However, the number of color copying machines connected to the image formation system is not limited to this number, and it is also possible to connect four or more color copying machines. Further, in the first to the fifth embodiments, description has been made of the case where the draft image read by the color copying machine 1a is printed out by the color copying machine 2a and the color copying machine 3a (a relationship of one to many) Also, in the third embodiment, description has been made of the case where the draft images read by the color copying machine 1a and the color copying machine 2a are printed out by the color copying machine 3a (a relationship of many to one). However, the present invention is not limited to these cases. It is also possible to arrange a one-to-one relationship. For example, the draft image read by the color copying machine 1a may be printed out by the color copying machine 2a. It is also possible to arrange a many-to-many relationship. For example, the draft images read by the color copying machine 1a and the color copying machine 2a may be printed out by the color copying machine 3a and a color copying machine 4a (a new addition).

The image formation methods explained in the fourth to sixth embodiments can be realized based on the arrangement that a computer like a personal computer or a workstation computer executes a program prepared in advance. This program is recorded on a computer readable recording medium like a hard disk, a floppy disk, a CD-ROM, an MO, or a DVD. The computer executes this program by reading the program from the recording medium. It is also possible to distribute this program via the above recording medium or via the network like the Internet.

The present invention is not limited to the above embodiments, and it is also possible to suitably modify the invention within a range not deviating from the gist of the invention.

As explained above, according to the image formation system relating to the present invention, in one or a plurality of image formation apparatuses, each apparatus outputs to the outside the draft image read at the image input section of the own apparatus and the first instrumental error correction values corresponding to the read characteristics of the image input section of the own apparatus stored in the first memory. In the other one or a plurality of image formation apparatuses, the image processing parameter preparing unit changes the image processing parameters corresponding to the read characteristics of the image input section of the own apparatus, based on the first instrumental error correction values output from the one or each of the plurality of image formation apparatuses and the second instrumental error correction values corresponding to the read characteristics of the image input section of the own apparatus stored in the second memory. Then, the image processing parameter preparing unit prepares the image processing parameters corresponding to the read characteristics of the image input section of the corresponding one or each of the plurality of image formation apparatuses. The correcting unit corrects the draft image read at the image input section of the corresponding one or each of the plurality of image formation apparatuses. With this arrangement, it is possible to decrease the influence of instrumental errors of the read characteristics between the image input section of the image formation apparatus that reads the draft image and the image input section of the image formation apparatus that prints out the draft image. As a result, in the case where a plurality of image formation apparatuses are connected together, and an image formation apparatus (one or a plurality of image formation apparatuses) inputs a draft image and a separate image formation apparatus (one or a plurality of image formation apparatuses) prints out the draft image, there is an effect that it is possible to provide an image formation system capable of realizing color reproducibility of printed materials equivalent to that of the case where one single image formation apparatus inputs and outputs the draft image.

Further, according to the image formation system relating to the present invention, in the above invention, the image processing parameter preparing unit includes an own-apparatus parameter preparing unit for preparing image processing parameters corresponding to the read characteristics of the image input section of the own apparatus, by comparing a target value with calibration data obtained by reading at the image input section of the own apparatus calibration patterns printed out from the image output section of the own apparatus. Further, the image processing parameter preparing unit includes another-apparatus parameter preparing unit for preparing image processing parameters corresponding to the read characteristics of an image input section of the one or the plurality of image formation apparatuses by changing the image processing parameters corresponding to the read characteristics of the image input section of the own apparatus prepared by the own-apparatus parameter preparing unit, based on the first instrumental error correction values output from the one or the plurality of image formation apparatuses and the second instrumental error correction values corresponding to the read characteristics of the image input section of the own apparatus. Therefore, in addition to the above-described effect, in the case where an image formation apparatus inputs a draft image and a separate image formation apparatus prints out the draft image, there is an effect that in one image formation apparatus it is possible to decrease variations in a result of color adjustments between input and output of a draft image. As a result, in the case where an image formation apparatus inputs a draft image and a separate image formation apparatus prints out the draft image, it becomes possible to further improve the color reproducibility of the printed materials.

Further, according to the image formation system relating to the present invention, in the above invention, the correcting unit corrects the draft image read at the image input section of the one or each of the plurality of image formation apparatuses, based on the image processing parameters prepared by the other-apparatus parameter preparing unit. In the mean time, the correcting unit corrects the draft image read at the image input section of the own apparatus, based on the image processing parameters prepared by the own-apparatus parameter preparing unit. Therefore, in addition to the above-described effect of the invention, in the case of printing out an draft image read at the image input section of the own apparatus and an draft image read at the image input section of the other image formation apparatus, it becomes possible to obtain equivalent color reproducibility of the printed materials. Further, it is possible to decrease variations in the color reproducibility of the printed materials due to instrumental errors.

Further, according to the image formation system relating to the present invention, in the above invention, a server stores a draft image output from the one or each of the plurality of image formation apparatuses and the first instrumental error correction values corresponding to the read characteristics of the image input section of the own apparatus, by relating the draft image to the first instrumental error correction values, and transmits the stored draft image and the corresponding instrumental error correction values to the other one or the plurality of image formation apparatuses, according to a transmission request from the other one or the plurality of image formation apparatuses. Therefore, in addition to the above-described effect of the invention, the server can store a draft image and the first instrumental error correction values corresponding to the read characteristics of the image input section of the image formation apparatus that has output the draft image, by relating the draft image to the first instrumental error correction values. As a result, it becomes easy to access a draft image read by the other image formation apparatus, when it is desired to make output of this draft image.

Further, according to the image formation system relating to the present invention, in the above invention, the image input section is a scanner, and the image output section is a color printer. Therefore, in addition to the above-described effect of the invention, it becomes easy to improve the color reproducibility in a simple system.

Further, according to the image formation system relating to the present invention, in the above invention, a plurality of image formation apparatuses are connected via a network, each image formation apparatus having an image input section for inputting the draft image and an image output section for outputting the draft image. Therefore, in addition to the above-described effect of the invention, when the image formation apparatuses are located at far separate positions, it becomes possible to mutually input draft images at image input sections of image formation apparatuses and to mutually output these draft images at image output sections of other image formation apparatuses.

Further, according to the image formation apparatus relating to the present invention, the image input section reads the draft image, the memory stores the first instrumental error correction values corresponding to the read characteristics of the image input section, and the transmitting unit transmits to the other image formation apparatus the draft image read at the image input section and the first instrumental error correction values corresponding to the read characteristics of the image input section stored in the memory. Therefore, when the own image formation apparatus (transmitter) reads a draft image at the own image input section, and the other image formation apparatus prints out this read draft image, the other image formation apparatus can correct the draft image based on the instrumental error correction values corresponding to the read characteristics of the image input section of the own apparatus. As a result, when the other image formation apparatus prints out the draft image read at the image input section of the own apparatus, it becomes possible to improve the color reproducibility.

Further, according to the image formation apparatus relating to the present invention, the memory stores second instrumental error correction values corresponding to the read characteristics of the image input section, and the receiving unit receives a draft image read at the image input section of the other image formation apparatus and the first instrumental error correction values corresponding to the read characteristics of the image input section of the other image formation apparatus. The image processing parameter preparing unit prepares image processing parameters corresponding to the read characteristics of the image input section of the other image formation apparatus received by the receiving unit by changing the image processing parameters of the own apparatus, based on the first instrumental error correction values received by the receiving unit and the second instrumental error correction values stored in the memory. The correcting unit corrects the draft image read at the image input section of the other image formation apparatus received by the receiving unit, based on the image processing parameters prepared by the image processing parameter preparing unit. Therefore, it becomes possible to decrease the influence of instrumental errors of the read characteristics between the image input section of the image formation apparatus that reads the draft image and the image input sectionof the image formation apparatus that prints out the draft image. As a result, it the case of printing out the image data read at the image input section of the other image formation apparatus, it becomes possible to improve the color reproducibility.

Further, according to the image formation apparatus relating to the present invention, in the above invention, the image processing parameter preparing unit includes an own-apparatus parameter preparing unit for preparing image processing parameters corresponding to the read characteristics of the image input section of the own apparatus, by comparing a target value with calibration data obtained by reading at the image input section of the own apparatus calibration patterns printed out from the image output section of the own apparatus. Further, the image processing parameter preparing unit includes another-apparatus parameter preparing unit for preparing image processing parameters corresponding to the read characteristics of an image input section of the other image formation apparatus received by the receiving unit by changing the image processing parameters corresponding to the read characteristics of the image input section of the own apparatus prepared by the own-apparatus parameter preparing unit, based on the first instrumental error correction values received by the receiving unit and the second instrumental error correction values stored in the memory. Therefore, in addition to the above-described effect, in the case where an image formation apparatus inputs a draft image and a separate image formation apparatus prints out the draft image, there is an effect that in one image formation apparatus it is possible to decrease variations in a result of color adjustments between input and output of a draft image. As a result, in the case where an image formation apparatus inputs a draft image and a separate image formation apparatus prints out the draft image, it becomes possible to further improve the color reproducibility of the printed materials.

Further, according to the image formation apparatus relating to the present invention, in the above invention, the correcting unit corrects the draft image read at the image input section of the other image formation apparatus, based on the image processing parameters prepared by the other-apparatus parameter preparing unit. In the mean time, the correcting unit corrects the draft image read at the image input section of the own apparatus, based on the image processing parameters prepared by the own-apparatus parameter preparing unit. Therefore, in addition to the above-described effect of the invention, in the case of printing out an draft image read at the image input section of the own apparatus and an draft image read at the image input section of the other image formation apparatus, it becomes possible to obtain equivalent color reproducibility of the printed materials. Further, it is possible to decrease variations in the color reproducibility of the printed materials due to instrumental errors.

Further, according to the image formation apparatus relating to the present invention, in the above invention, the image input section is a scanner, and the image output section is a color printer. Therefore, in addition to the above-described effect of the invention, it becomes easy to improve the color reproducibility in a simple system.

Further, according to the image formation apparatus relating to the present invention, in the above invention, the image formation apparatus is connected with the other image formation apparatus via a network. Therefore, in addition to the above-described effect of the invention, when the image formation apparatuses are located at far separate positions, it becomes possible to mutually input draft images at image input sections of image formation apparatuses and to mutually output these draft images at image output sections of other image formation apparatuses.

Further, according to the image formation method relating to the present invention, the image input section reads the draft image, and the draft image read at the image input section and the first instrumental error correction values corresponding to the read characteristics of the image input section stored in the memory are transmitted to the other image formation apparatus connected. Therefore, when the own image formation apparatus (transmitter) reads a draft image at the own image input section, and the other image formation apparatus prints out this read draft image, the other image formation apparatus can correct the draft image based on the instrumental error correction values corresponding to the read characteristics of the image input section of the own apparatus. As a result, when the other image formation apparatus prints out the draft image read at the image input section of the own apparatus, it becomes possible to improve the color reproducibility.

Further, according to the image formation method relating to the present invention, a draft image read at the image input section of the other image formation apparatus connected and the first instrumental error correction values corresponding to the read characteristics of the image input section of the other image formation apparatus connected are read. The image processing parameters corresponding to the read characteristics of the image input section of the other image formation apparatus are prepared by changing the image processing parameters of the own apparatus, based on the first instrumental error correction values received and the second instrumental error correction values corresponding to the read characteristics of the image input section of the own apparatus stored in the memory. The draft image read at the image input section of the other image formation apparatus received is corrected, based on the image processing parameters prepared, and the corrected draft image is printed out by the image output section. Therefore, it becomes possible to decrease the influence of instrumental errors of the read characteristics between the image input section of the image formation apparatus that reads the draft image and the image input section of the image formation apparatus that prints out the draft image. As a result, it the case of printing out the image data read at the image input section of the other image formation apparatus, it becomes possible to improve the color reproducibility.

Further, according to the image formation method relating to the present invention, in the above invention, image processing parameters corresponding to the read characteristics of the image input section of the own apparatus are prepared, by comparing a target value with calibration data obtained by reading at the image input section of the own apparatus calibration patterns printed out from the image output section of the own apparatus. Further, image processing parameters corresponding to the read characteristics of an image input section of the other image formation apparatus are prepared, by changing the image processing parameters corresponding to the read characteristics of the image input section of the own apparatus prepared, based on the first instrumental error correction values received and the second instrumental error correction values corresponding to the read characteristics of the image input section of the own apparatus stored in the memory. Therefore, in addition to the above-described effect, in the case where an image formation apparatus inputs a draft image and a separate image formation apparatus prints out the draft image, there is an effect that in one image formation apparatus it is possible to decrease variations in a result of color adjustments between input and output of a draft image. As a result, in the case where an image formation apparatus inputs a draft image and a separate image formation apparatus prints out the draft image, it becomes possible to further improve the color reproducibility of the printed materials.

Further, according to the image formation method relating to the present invention, in the above invention, the draft image read at the image input section of the other image formation apparatus is corrected based on the image processing parameters prepared at the other-apparatus parameter preparing step. In the mean time, the draft image read at the image input section of the own apparatus is corrected based on the image processing parameters prepared at the own-apparatus parameter preparing step. Therefore, in addition to the above-described effect of the invention, in the case of printing out an draft image read at the image input section of the own apparatus and an draft image read at the image input section of the other image formation apparatus, it becomes possible to obtain equivalent color reproducibility of the printed materials. Further, it is possible to decrease variations in the color reproducibility of the printed materials due to instrumental errors.

Further, according to the image formation method relating to the present invention, in the above invention, the image input section is a scanner, and the image output section is a color printer. Therefore, in addition to the above-described effect of the invention, it becomes easy to improve the color reproducibility in a simple system.

Further, according to the image formation method relating to the present invention, in the above invention, a plurality of image formation apparatuses are connected via a network, each image formation apparatus having an image input section for inputting the draft image and an image output section for outputting the draft image. Therefore, in addition to the above-described effect of the invention, when the image formation apparatuses are located at far separate positions, it becomes possible to mutually input draft images at image input sections of image formation apparatuses and to mutually output these draft images at image output sections of other image formation apparatuses.

Further, according to the program relating to the present invention, each step of the present invention is executed through the execution of the program by the computer. Therefore, based on the arrangement that the computer executes the program, it becomes possible to improve the color reproducibility, in the case of printing out image data read at the image input section of the other image formation apparatus.

The present documents incorporates by reference the entire contents of Japanese priority document, 2000-193004 filed in Japan on Jun. 27, 2000 and 2001-031569 filed in Japan on Feb. 7, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation system comprising:
a plurality of image formation apparatuses connected together, each image of the formation apparatuses having an image input section for inputting a draft image and an image output section for outputting the draft image, a predetermined one of the plurality of the image formation apparatuses reading the draft image at the image input section of the predetermined image formation apparatus, and the plurality of the image formation apparatuses receiving outputs of the draft image at their image output sections;
a preparing unit which prepares calibration data containing calibration patterns being collected at the image input section of the predetermined image formation apparatus to be received at the image output section of each of the image formation apparatus; and
a correcting unit which corrects the draft image input from the image output section of the predetermined image formation apparatus based on the calibration data prepared by the preparing unit.

2. The image formation system according to claim 1, wherein the correcting unit further comprises:
a parameter calculating unit which calculates image processing parameters relating to read characteristics of the image input section of the predetermined image formation apparatus and print characteristics of the image output sections of the plurality of the image formation apparatuses, based on the calibration data prepared by the preparing unit; and
a converting unit which converts the draft image input from the image input section of the predetermined image formation apparatus using the image processing parameters calculated by the parameter calculating unit.

3. The image formation system according to claim 2, wherein the parameter calculating unit calculates image processing parameters to be used for a gradation conversion by comparing the calibration data with predetermined target data.

4. The image formation system according to claim 2, further comprising a parameter memory for storing image processing parameters calculated by the parameter calculating unit, wherein the converting unit converts the draft image input from the image input section of the predetermined image formation apparatus using the image processing parameters stored in the parameter memory only when the draft image input by the image input section of the predetermined image formation apparatus is to be output from the image output section of another one on the image formation apparatus among the plurality of the image formation apparatuses.

5. The image formation system according to claim 1, wherein the preparing unit resides in the predetermined image formation apparatus, and each of the plurality of the image formation apparatuses comprises the correcting unit.

6. The image formation system according to claim 1, wherein the image input section is a color scanner, and the image output section is a color printer.

7. An image formation system comprising:
a plurality of image formation apparatuses connected together, each of the image formation apparatuses having an image input section for inputting a draft image and an image output section for outputting the draft image, each of the image formation apparatuses reading a draft image at its image input section, and a predetermined one of the plurality of image formation apparatuses receiving an output of the draft images at the image output section of the predetermined image formation apparatus;
a preparing unit which prepares calibration data containing calibration patterns being collected at the image input section of each of the image formation apparatuses to be received at the image output section of the predetermined image formation apparatus; and
a correcting unit which corrects the draft images input from the image output sections of the plurality of image formation apparatuses based on the calibration data prepared by the preparing unit.

8. The image formation system according to claim 7, wherein the correcting unit comprises:
a parameter calculating unit which calculates image processing parameters relating to read characteristics of the image input sections of the plurality of image formation apparatuses and print characteristics of the image output section of the predetermined image formation apparatus, based on the calibration data prepared by the preparing unit; and
a converting unit which converts the draft images input from the image input sections of the plurality of the image formation apparatuses, using the image processing parameters calculated by the parameter calculating unit.

9. The image formation system according to claim 8, wherein the parameter calculating unit calculates image processing parameters to be used for a gradation conversion, by comparing the calibration data with predetermined target data.

10. The image formation system according to claim 8, further comprising:
a parameter memory which stores the image processing parameters calculated by the parameter calculating unit, wherein the converting unit converts the draft image input from the image input section of each of the image formation apparatuses using the image processing parameters stored in the parameter memory, only when the draft image input by the image input section of each of the image formation apparatuses is to be output from the image output section of the predetermined image formation apparatus.

11. The image formation system according to claim 7, wherein each of the plurality of the image formation apparatuses comprises the preparing unit, and the correcting unit resides in the predetermined image formation apparatus.

12. The image formation system according to claim 7, wherein the image input section is a color scanner, and the image output section is a color printer.

13. An image formation method using a plurality of image formation apparatuses connected together, each image formation apparatus having an image input section for inputting a draft image and an image output section for outputting the draft image, comprising the steps of:
  (a) reading a draft image at the image input section of a predetermined one of the plurality of the image formation apparatuses;
  (b) transmitting, outputs of the draft image to the image output sections of the plurality of the image formation apparatuses;
  (c) preparing calibration data containing calibration patterns being collected at the image input section of the predetermined image formation apparatus to be output to the image output section of each of the image formation apparatuses; and
  (d) correcting the draft image input from the image input section of the predetermined image formation apparatus based on the calibration data prepared at the step (c).

14. The image formation method according to claim 13, wherein the step (b) further comprises the steps of:
  (e) calculating image processing parameters relating to read characteristics of the image input section of the predetermined image formation apparatus and print characteristics of the image output sections of the plurality of the image formation apparatuses based on the calibration data prepared at the step (c); and
  (f) converting the draft image input from the image input section of the predetermined image formation apparatus using the image processing parameters calculated at the step (e).

15. The image formation method according to claim 14, wherein the image processing parameters are used for a gradation conversion, and wherein the image processing parameters are calculated by comparing the calibration data with predetermined target data.

16. The image formation method according to claim 14, further comprising the step of:
  (g) storing the image processing parameters in a parameter memory after the step (e), wherein the step (f) is carried out after the step (g) only when the draft image input from the image input section of the predetermined image formation apparatus is to be output from the image output section of the image formation apparatuses.

17. The image formation method according to claim 13, wherein the step (c) is carried out in the predetermined image formation apparatus and wherein the step (d) is carried out in each of the plurality of the image formation apparatuses.

18. The image formation method according to claim 13, wherein the image input section is a color scanner, and the image output section is a color printer.

19. An image formation method using a plurality of image formation apparatuses connected together, each of the image formation apparatuses having an image input section for inputting a draft image and an image output section for outputting the draft image, comprising the steps of:
  (a) reading a draft image at the image input section of each of the plurality of image formation apparatuses;
  (b) transmitting outputs of the draft images to the image output section of a predetermined one of the plurality of the image formation apparatuses;
  (c) preparing calibration data containing calibration patterns collected at the image input section of each of the image formation apparatuses to be output from the image output section of the predetermined image formation apparatus; and
  (d) correcting the draft images input from the image input sections of the plurality of the image formation apparatuses based on the calibration data prepared at the preparing the step (c).

20. The image formation method according to claim 19, wherein the step (d) further comprises:
  (e) calculating image processing parameters relating to read characteristics of the image input sections of the plurality of the image formation apparatuses and print characteristics of the image output section of the predetermined image formation apparatus based on the calibration data prepared at the preparing step; and
  (f) converting the draft images input from the image input sections of the plurality of the image formation apparatuses, using the image processing parameters calculated at the step (e).

21. The image formation method according to claim 20, wherein the image processing parameters are used for a gradation conversion, and wherein the image processing parameters are calculated by comparing the calibration data with predetermined target data.

22. The image formation method according to claim 20, further comprising the step of:
  (g) storing the image processing parameters in a parameter memory, wherein the step (f) is carried out after the step (g), and wherein the step (f) is carried out only when the draft image input by the image input section of each the image formation apparatus is to be output from the image output section of the predetermined image formation apparatus.

23. The image formation method according to claim 19, wherein the step (c) is carried out in each of the plurality of the image formation apparatuses, and wherein the step (d) is carried out in the predetermined image formation apparatus.

24. The image formation method according to claim 19, wherein the image input section is a color scanner, and the image output section is a color printer.

25. A computer-readable recording medium that stores a computer program encoding an image formation method, which employs a plurality of image formation apparatuses connected together, each of the image formation apparatuses having an image input section for inputting a draft image and an image output section for outputting the draft image, wherein the computer-readable recording medium storing the image formation method comprising the steps:
  (a) reading a draft image at the image input section of a predetermined one of the plurality of image formation apparatuses;

(b) transmitting outputs of the draft image to the image output sections of the plurality of the image formation apparatuses;

(c) preparing calibration data containing calibration patterns being collected at the image input section of the predetermined image formation apparatus to be output from the image output section of each image formation apparatus; and (d) correcting the draft image input from the image input section of the predetermined image formation apparatus based on the calibration data prepared at the preparing step (c).

26. A computer-readable recording medium that stores a computer program encoding an image formation method, which employs a plurality of image formation apparatuses connected together, each of the image formation apparatuses having an image input section for inputting a draft image and an image output section for outputting the draft image, wherein the image formation method comprises the steps of:

(a) reading a draft image at the image input section of each of the image formation apparatuses;

(b) transmitting outputs of the draft images to its image output section of a predetermined one of the image formation apparatuses, (c) preparing calibration data containing calibration patterns being collected at the image input section of each of the image formation apparatuses to be output from the image output section of the predetermined image formation apparatus; and (d) correcting the draft image input from the image input section of each of the plurality of the image formation apparatuses based on the calibration data prepared at the preparing step.

27. An image formation system comprising:

a plurality of image formation apparatuses connected together, each of the image formation apparatuses having an image input section for inputting a draft image and an image output section for outputting the draft image, at least a first one of the image formation apparatuses reading a draft image at the input section, and a second one of the image formation apparatuses producing an output of the draft image from the image output section, wherein the first one of the image formation apparatuses further comprises:

a first memory which stores first instrumental error correction values corresponding to read characteristics of the image input section of the first image formation apparatus; and an output unit which outputs the second image formation apparatus the draft image read at the image input section of the first image formation apparatus and the first instrumental error correction values stored in the first memory, and the second image formation apparatuses further comprises:

a second memory which stores second instrumental error correction values corresponding to read characteristics of the image input section of the second image formation apparatus;

an image processing parameter preparing unit which prepares image processing parameters corresponding to the read characteristics of the image input section of the first image formation apparatus by changing the image processing parameters of the second image formation apparatus based on the first instrumental error correction values output from the first image formation apparatuses and the second instrumental error correction values stored in the second memory; and a correcting unit which corrects the draft image read at the image input section of the first image formation apparatus, based on the image processing parameters prepared by the image processing parameter preparing unit.

28. The image formation system according to claim 27, wherein the image processing parameter preparing unit further comprises:

an intra-apparatus parameter preparing unit which prepares image processing parameters corresponding to the read characteristics of the image input section of the second image formation apparatus by comparing a target value containing calibration data obtained by reading at the image input section of the second image formation apparatus with calibration patterns printed out from the image output section of the second image formation apparatus; and an inter-apparatus parameter preparing unit which prepares image processing parameters corresponding to the read characteristics of an image input section of the first image formation apparatuses by changing the image processing parameters corresponding to the read characteristics of the image input section of the second image formation prepared by the intra-apparatus parameter preparing unit based on the first instrumental error correction values output from the first image formation apparatus and the second instrumental error correction values corresponding to the read characteristics of the image input section of the second image formation apparatus.

29. The image formation system according to claim 28, wherein the correcting unit corrects the draft image read at the image input section of the first image formation apparatus based on the image processing parameters prepared by the inter-apparatus parameter preparing unit, and also corrects the draft image read at the image input section of the second image formation apparatus based on the image processing parameters prepared by the intra-apparatus parameter preparing unit.

30. The image formation system according to claim 27, further comprising:

a server for storing a draft image output from the first image formation apparatuses and the first instrumental error correction values corresponding to the read characteristics of the image input section of the first apparatus by relating the draft image to the first instrumental error correction values, and transmitting the stored draft image and the corresponding instrumental error correction values to the second image formation apparatus according to a transmission request from the second one or few image formation apparatuses.

31. The image formation system according to claim 27, wherein the image input section is a scanner, and the image output section is a color printer.

32. The image formation system according to claim 27, wherein the plurality of the image formation apparatuses are connected via a network.

33. A first image formation apparatus connected with a second image formation apparatus to carry out data communications with each other, comprising:

an image input section which reads a draft image and converts the draft image into image data;

an image output section which prints out the image data that is read at the image input section;

a memory which stores first instrumental error correction values corresponding to read characteristics of the image input section; and a transmitting unit which transmits to the second image formation apparatus the draft image read at the image input section and the first instrumental error correction values corresponding to the read characteristics of the image input section stored in the memory.

34. The first image formation apparatus according to claim 33, wherein the image input section is a scanner, and the image output section is a color printer.

35. The first image formation apparatus according to claim 33, wherein the first image formation apparatus is connected with the second image formation apparatus via a network.

36. A first image formation apparatus connected with a second image formation apparatus to carry out data communications with each other, the first image formation apparatus and the second image formation apparatus each comprising:
- an image input section which reads a draft image and converts the draft image into image data;
- an image output section which prints out the image data that is read at the image input section;
- a memory which stores second instrumental error correction values corresponding to read characteristics of the image input section;
- a receiving unit which receives a draft image that is read at the image input section of the second image formation apparatus and first instrumental error correction values corresponding to read characteristics of the image input section of the second image formation apparatus;
- an image processing parameter preparing unit which prepares image processing parameters corresponding to the read characteristics of the image input section of the second image formation apparatus received by the receiving unit by changing the image processing parameters of the first image formation apparatus based on the first instrumental error correction values received by the receiving unit and the second instrumental error correction values stored in the memory; and
- a correcting unit which corrects the draft image read at the image input section of the second image formation apparatus received by the receiving unit based on the image processing parameters prepared by the image processing parameter preparing unit.

37. The first image formation apparatus according to claim 36, wherein the image processing parameter preparing unit further comprises:
- an intraapparatus parameter preparing unit which prepares image processing parameters corresponding to the read characteristics of the image input section of the first apparatus by comparing a target value with calibration data obtained by reading at the image input section of the first apparatus calibration patterns printed out from the image output section of the first apparatus; and
- an inter-apparatus parameter preparing unit which prepares image processing parameters corresponding to the read characteristics of an image input section of the second image formation apparatus received by the receiving unit by changing the image processing parameters corresponding to the read characteristics of the image input section of the first apparatus prepared by the intra-apparatus parameter preparing unit based on the first instrumental error correction values received by the receiving unit and the second instrumental error correction values stored in the memory.

38. The image formation apparatus according to claim 37, wherein the correcting unit corrects the draft image read at the image input section of the second image formation apparatus based on the image processing parameters prepared by the inter-apparatus parameter preparing unit, and the correcting unit also corrects the draft image read at the image input section of the first apparatus based on the image processing parameters prepared by the intra-apparatus parameter preparing unit.

39. The first image formation apparatus according to claim 36, wherein the image input section is a scanner, and the image output section is a color printer.

40. The first image formation apparatus according to claim 36, wherein the first image formation apparatus is connected with the second image formation apparatus via a network.

41. An image formation method comprising the steps of:
- (a) reading an image of a draft at an image input section of a first image formation apparatus; and
- (b) transmitting the draft image read at the image input section of the first image formation apparatus and first instrumental error correction values corresponding to read characteristics of the image input section of the first image formation apparatus from a memory to an image output section of a second image formation apparatus connected to the first image formation apparatus.

42. The image formation method according to claim 41, wherein the image input section is a scanner, and the image output section is a color printer.

43. The image formation method according to claim 41, wherein the first image formation apparatus is connected with the second image formation apparatus via a network.

44. An image formation method comprising:
- (a) receiving a draft image at an image input section of a second image formation apparatus and first instrumental error correction values corresponding to read characteristics of the image input section of the second image formation apparatus;
- (b) preparing image processing parameters corresponding to the read characteristics of the image input section of the second image formation apparatus by changing the image processing parameters of a first image formation apparatus connected to the second image formation apparatus based on the first instrumental error correction values and second instrumental error correction values corresponding to the read characteristics of an image input section of the first apparatus stored in a memory;
- (c) correcting the draft image read at the image input section of the second image formation apparatus based on the image processing parameters prepared in the step (b); and
- (d) printing out the draft image corrected in the step (c) at an image output section of the first image formation apparatus.

45. The image formation method according to claim 44, wherein the step (b) further comprises:
- (e) preparing image processing parameters corresponding to the read characteristics of the image input section of the first image formation apparatus by comparing a target value with calibration data obtained by reading at the image input section of the first image formation apparatus with calibration patterns printed out from the image output section of the first image formation apparatus; and (f) preparing image processing parameters corresponding to the read characteristics of the image input section of the second image formation apparatus, by changing the image processing parameters corresponding to the read characteristics of the image input section of the first image formation apparatus prepared, based on the first instrumental error correction values received and the second instrumental error correction values corresponding to the read characteristics of the image input section of the first image formation apparatus stored in the memory.

46. The image formation method according to claim 45, wherein in the step (c), the draft image read at the image input section of the second image formation apparatus is corrected based on the image processing parameters prepared at the step (f), and the draft image read at the image input section of the first the formation apparatus is corrected based on the image processing parameters prepared at the step (e).

47. The image formation method according to claim 44, wherein the image input section is a scanner, and the image output section is a color printer.

48. The image formation method according to claim 44, wherein the first image formation apparatus is connected with the second image formation apparatus via a network.

49. A computer program stored on a computereadable medium for performing the tasks of:
(a) reading a draft image at an image input section of a first image formation apparatus;
(b) transmitting the draft image read at the image input section and first instrumental error correction values corresponding to read characteristics of the image input section stored in a memory to a second image formation apparatus connected to the first image formation apparatus; and
(c) correcting the received draft image read at the image input section of the first image formation apparatus based upon the first instrumental error correction values.

50. A computer program stored on a computereadable medium for performing the tasks of:
(a) receiving a draft image read at an image input section of a second image formation apparatus and first instrumental error correction values corresponding to read characteristics of the image input section of the second image formation apparatus;
(b) preparing image processing parameters corresponding to the read characteristics of the image input section of the second image formation apparatus by changing the image processing parameters of a first image formation apparatus based on the first instrumental error correction values received and second instrumental error correction values corresponding to read characteristics of an image input section of the first image formation apparatus stored in a memory;
(c) correcting the received draft image read at the image input section of the second image formation apparatus based on the image processing parameters prepared at the step (b); and
(d) printing out the draft image corrected at the step (c) at an image output section of the first image formation apparatus.

* * * * *